(12) United States Patent
Shatzki et al.

(10) Patent No.: US 10,586,514 B2
(45) Date of Patent: Mar. 10, 2020

(54) HEAD MOUNTED DISPLAY DEVICE, SYSTEM AND METHOD

(71) Applicant: ELBIT SYSTEMS LTD, Haifa (IL)

(72) Inventors: Roy Shatzki, Haifa (IL); Omer Briller, Haifa (IL); Omer Hasharoni, Haifa (IL)

(73) Assignee: ELBIT SYSTEMS LTD, Haifa (IL)

( * ) Notice: Subject to any disclaimer, the term of this patent is extended or adjusted under 35 U.S.C. 154(b) by 0 days.

(21) Appl. No.: 16/038,336

(22) Filed: Jul. 18, 2018

(65) Prior Publication Data

US 2018/0366090 A1 Dec. 20, 2018

Related U.S. Application Data

(63) Continuation of application No. PCT/IL2018/050337, filed on Mar. 24, 2018.

(30) Foreign Application Priority Data

May 1, 2017 (IL) .......................................... 252056

(51) Int. Cl.
*G06F 3/01* (2006.01)
*G09G 5/37* (2006.01)
(Continued)

(52) U.S. Cl.
CPC ............... *G09G 5/37* (2013.01); *B64D 43/00* (2013.01); *G01C 23/005* (2013.01); *G02B 27/00* (2013.01);
(Continued)

(58) Field of Classification Search
CPC ........ G09G 5/37; G09G 5/38; G09G 2354/00; G09G 2380/12; G09G 2340/0464;
(Continued)

(56) References Cited

U.S. PATENT DOCUMENTS 4,305,057 A 12/1981 Rolston
7,180,476 B1 2/2007 Guell et al.
(Continued)

FOREIGN PATENT DOCUMENTS

FR 3003049 A1 9/2014
WO 2015165837 A1 11/2015
(Continued)

OTHER PUBLICATIONS

Wickens and Ververs, "Allocation of Attention with Head-Up Displays" Office of Aviation Medicine Washington D.C. 20951, Aviation Research Laboratory University of Illinois, Savoy, Illinois 61874, Nov. 1998, pp. 1-15.
(Continued)

*Primary Examiner* — Richard J Hong
(74) *Attorney, Agent, or Firm* — The Roy Gross Law Firm, LLC; Roy Gross

(57) ABSTRACT

Embodiments concern a method for providing information to a user of a vehicle via a display device that is worn by the user. The method comprises providing a principle axes rotation coordinate system ($V_{xyz}$) that defines a vehicle orientation relative to a world coordinate system ($W_{xyz}$) of a reference world space; providing at least one display device coordinate system ($D_{xyz}$) that defines a display device orientation relative to the vehicle coordinate system; and providing a symbol coordinate system ($S_{xyz}$) that is spatially fixed with at least one first symbol to be displayed on the display device and that defines three symbol rotation axes that are orthogonal to each other; and spatially fixing at least one of the symbol rotation axes ($S_\alpha$) to a vehicle principal axis of rotation descriptive of an orientation of the vehicle.

26 Claims, 30 Drawing Sheets

(51) Int. Cl.

| | | |
|---|---|---|
| *G06T 11/60* | (2006.01) | |
| *G09G 5/38* | (2006.01) | |
| *B64D 43/00* | (2006.01) | |
| *G01C 23/00* | (2006.01) | |
| *G02B 27/00* | (2006.01) | |
| *G02B 27/01* | (2006.01) | |
| *G06F 3/0484* | (2013.01) | |
| *B60K 35/00* | (2006.01) | |

(52) U.S. Cl.
CPC ............ *G02B 27/017* (2013.01); *G06F 3/011* (2013.01); *G06F 3/013* (2013.01); *G06T 11/60* (2013.01); *G09G 5/38* (2013.01); *B60K 35/00* (2013.01); *B60K 2370/334* (2019.05); *G02B 27/0172* (2013.01); *G02B 2027/014* (2013.01); *G02B 2027/0141* (2013.01); *G02B 2027/0187* (2013.01); *G06F 3/04842* (2013.01); *G06T 2200/24* (2013.01); *G09G 2340/0464* (2013.01); *G09G 2340/0492* (2013.01); *G09G 2340/14* (2013.01); *G09G 2354/00* (2013.01); *G09G 2380/12* (2013.01)

(58) Field of Classification Search
CPC ....... G09G 2340/14; G09G 2340/0492; B64D 43/00; G06F 3/013; G06F 3/0304; G06F 3/011; G06F 3/04842; G06T 11/60; G06T 2200/24; A61M 21/00; G02B 27/0172; G02B 27/017; G02B 2027/0141; G02B 2027/0187; G02B 27/00; G02B 2027/014; G01C 23/005; B60K 35/00; B60K 2370/0334
See application file for complete search history.

(56) References Cited

U.S. PATENT DOCUMENTS

| | | | |
|---|---|---|---|
| 7,383,129 B1 | 6/2008 | Baillot et al. | |
| 8,362,973 B2 | 1/2013 | Cernasov et al. | |
| 9,035,878 B1 | 5/2015 | Wheeler | |
| 9,244,280 B1* | 1/2016 | Tiana ................. | G02B 27/0172 |
| 2002/0039073 A1 | 4/2002 | Ben-Ari et al. | |
| 2002/0099257 A1 | 7/2002 | Parket et al. | |
| 2004/0102676 A1* | 5/2004 | Brendley ............. | A61M 21/00 600/27 |
| 2006/0015000 A1* | 1/2006 | Kim ...................... | A61M 21/00 600/27 |
| 2009/0309812 A1 | 12/2009 | Larson et al. | |
| 2010/0091377 A1 | 4/2010 | Hedges et al. | |
| 2011/0193725 A1 | 8/2011 | Wise et al. | |
| 2011/0282130 A1 | 11/2011 | Krueger | |
| 2012/0019645 A1 | 1/2012 | Maltz | |
| 2012/0293395 A1 | 11/2012 | Williams | |
| 2013/0007668 A1 | 1/2013 | Liu et al. | |
| 2013/0147687 A1 | 6/2013 | Small et al. | |
| 2013/0169560 A1 | 7/2013 | Cederlund et al. | |
| 2013/0187835 A1 | 7/2013 | Vaught et al. | |
| 2013/0293577 A1 | 11/2013 | Perez et al. | |
| 2013/0342571 A1 | 12/2013 | Kinnebrew et al. | |
| 2014/0097291 A1 | 4/2014 | Aymeric et al. | |
| 2014/0132511 A1 | 5/2014 | Ahn | |
| 2014/0160129 A1 | 6/2014 | Sako et al. | |
| 2014/0237366 A1 | 8/2014 | Poulos et al. | |
| 2014/0313189 A1 | 10/2014 | Dominici et al. | |
| 2014/0372944 A1 | 12/2014 | Mulcahy et al. | |
| 2015/0054743 A1 | 2/2015 | Orhand et al. | |
| 2015/0193018 A1 | 7/2015 | Venable et al. | |
| 2015/0205494 A1 | 7/2015 | Scott et al. | |
| 2015/0213778 A1 | 7/2015 | Moravetz | |
| 2015/0268821 A1 | 9/2015 | Ramsby et al. | |
| 2016/0035135 A1 | 2/2016 | Park et al. | |
| 2016/0048964 A1 | 2/2016 | Kruglick | |
| 2016/0116747 A1 | 4/2016 | Malka | |
| 2016/0195924 A1* | 7/2016 | Weber .................. | G06F 3/0304 345/156 |

FOREIGN PATENT DOCUMENTS

| | | |
|---|---|---|
| WO | 2016017062 A1 | 2/2016 |
| WO | 2016030671 A1 | 3/2016 |
| WO | 2017004580 A1 | 1/2017 |

OTHER PUBLICATIONS

Garmin head-up display (HUD) interface and new K2 demo at 2014 CES, https://www.rushlane.com/garmin-head-up-display-hud-interface-and-new-k2-demo-at-2014-ces-12101136.html, Published Jan. 8, 2014.
Garmin Interactive HUD Keeps Your Eyes on the Road Ahead, http://www.laptopmag.com/articles/garmin-interactive-hud, Published Jan. 7, 2014.
Garmin® Showcases New Infotainment Technology for Automakers Designed to Minimize Driver Distraction, http://newsroom.garmin.com/press-release/automotive/garmin-showcases-new-infotainment-technology-automakers-designed-minimize-d, Pubished Jan. 7, 2014.
An idea to Mr. Wimbledon from the GOAT, http:/pseudofedblog.com/2015/07/01/an-idea-to-mr-wimbledon-from-the-goat/, Published Jul. 1, 2015.
Looking ahead: solution for connected in-car safety and entertainment, https://news.harman.com/blog/looking-ahead:-solution-for-connected-in-car-safety-and-entertainment, Published Feb. 5, 2013.
European Search Report for App. No. 18737795.7-1216 / 3414616, 4 pages, completed Jan. 21, 2019; dated Jan. 29, 2019.
European Search Report for App. No. 18737795.7-1216, 8 pages, dated Feb. 25, 2019.
European Article 94(3) Report for Application No. 18 737 795.7 01216 mailed Oct. 29, 2019 6 pages.
International Search Report and Written Opinion, International Application No. PCT/IL2018/050337, dated Jul. 2, 2018.
International Preliminary Report on Patentability, International Application No. PCT/IL2018/050337, dated Nov. 5, 2019.
International Search Strategy, International Application No. PCT/IL2018/050337, dated Jun. 24, 2018.
European Office Action, European Application No. 18737795.7, dated Feb. 25, 2019.
Israeli Search Report, Israeli Application No. 252056, dated Nov. 8, 2017.
Israeli Office Action, Israeli Application No. 252056, dated Nov. 14, 2017.

* cited by examiner

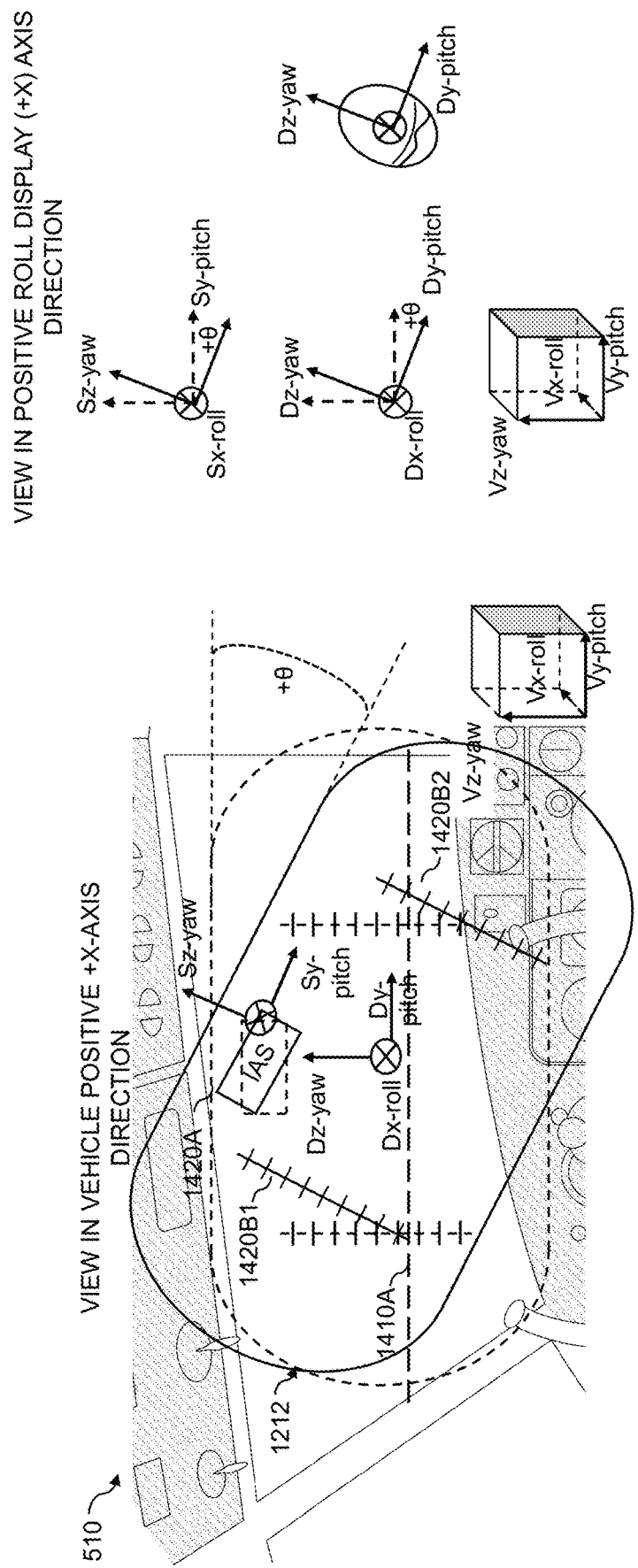

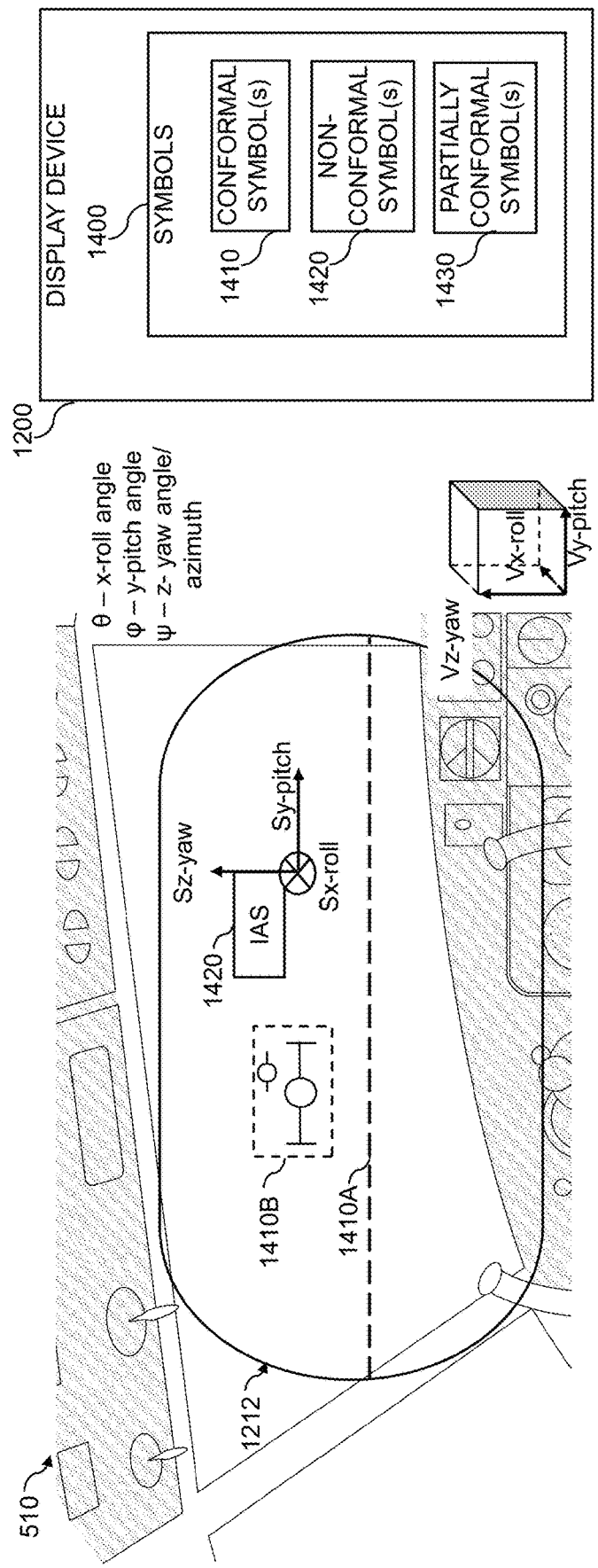

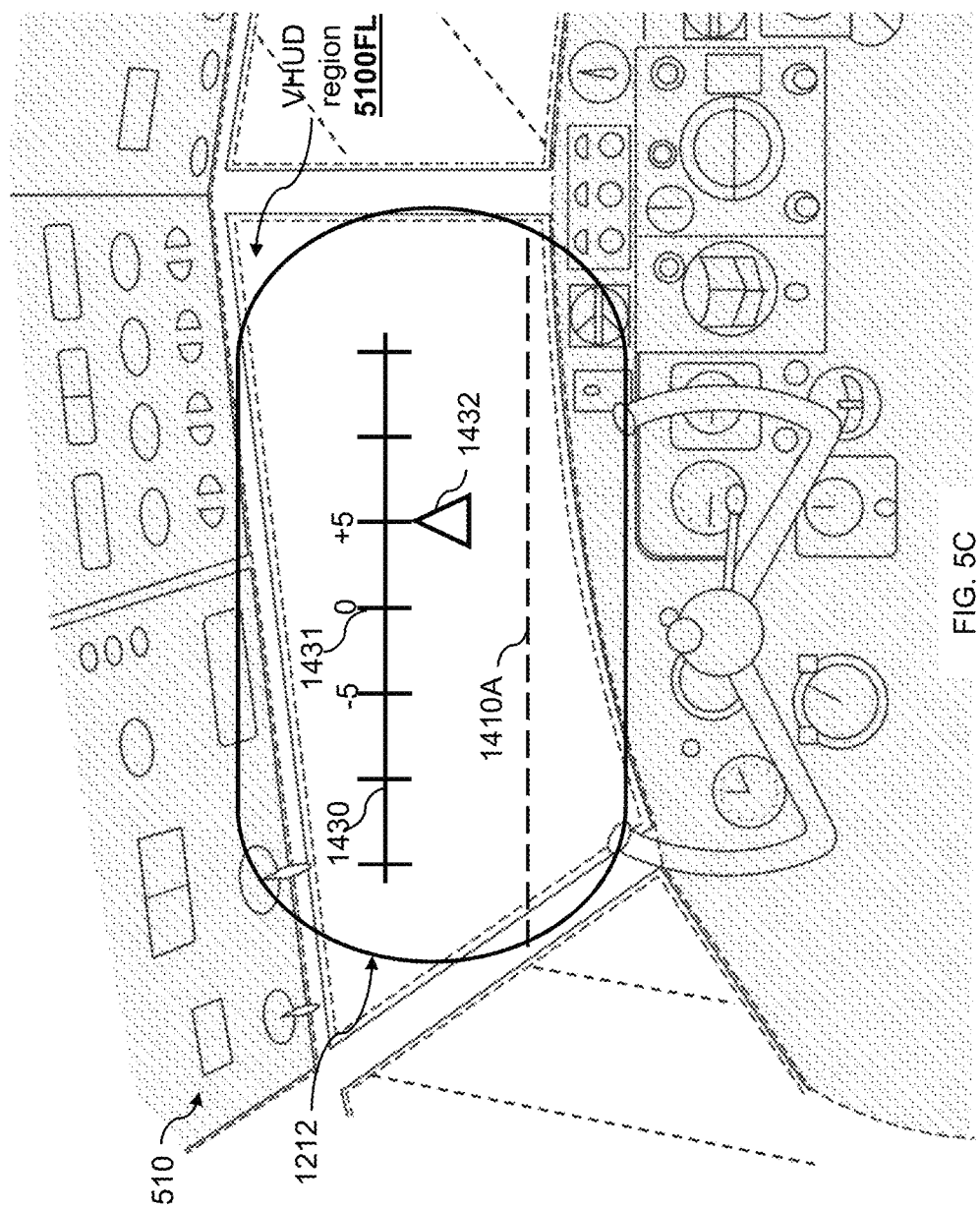

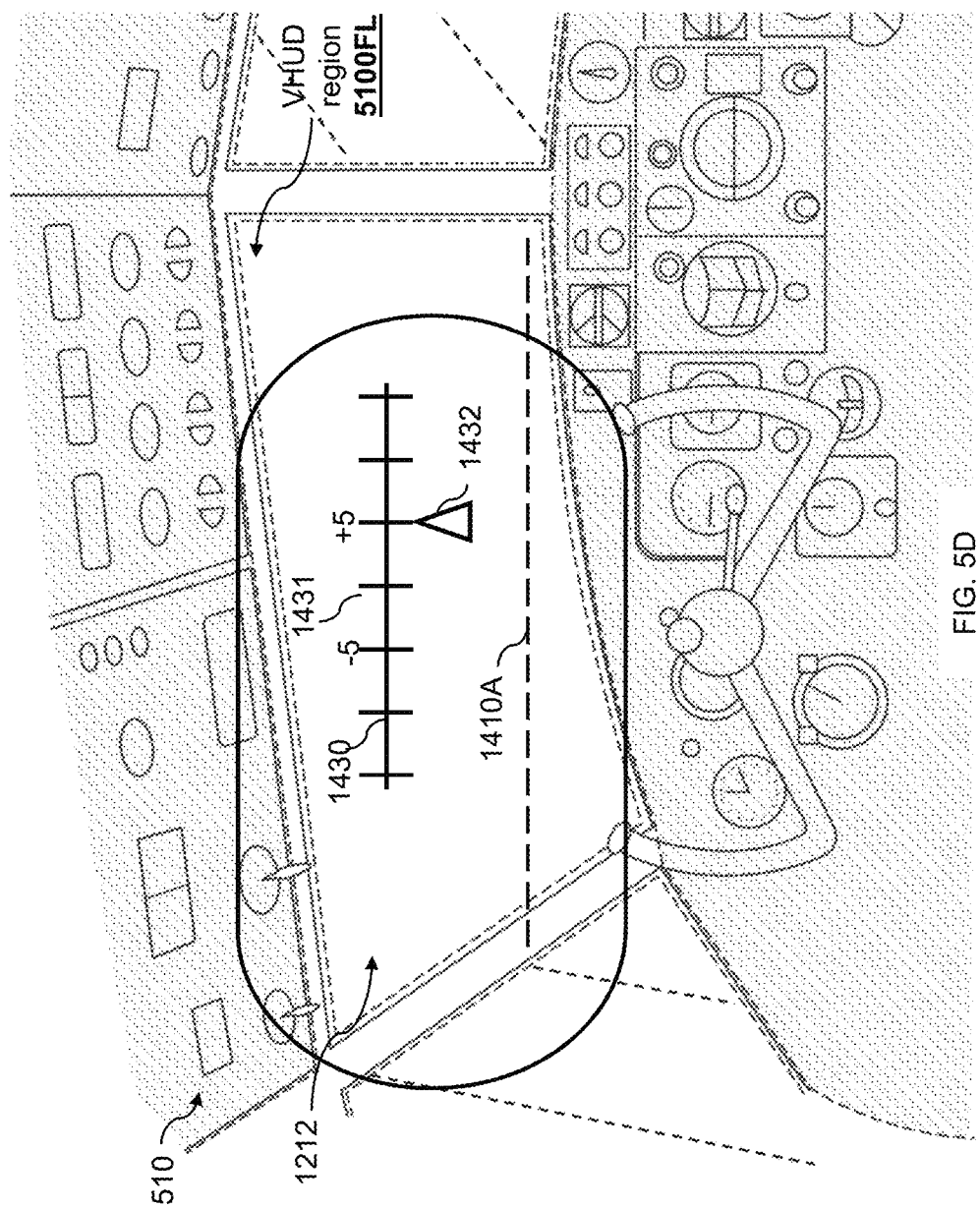

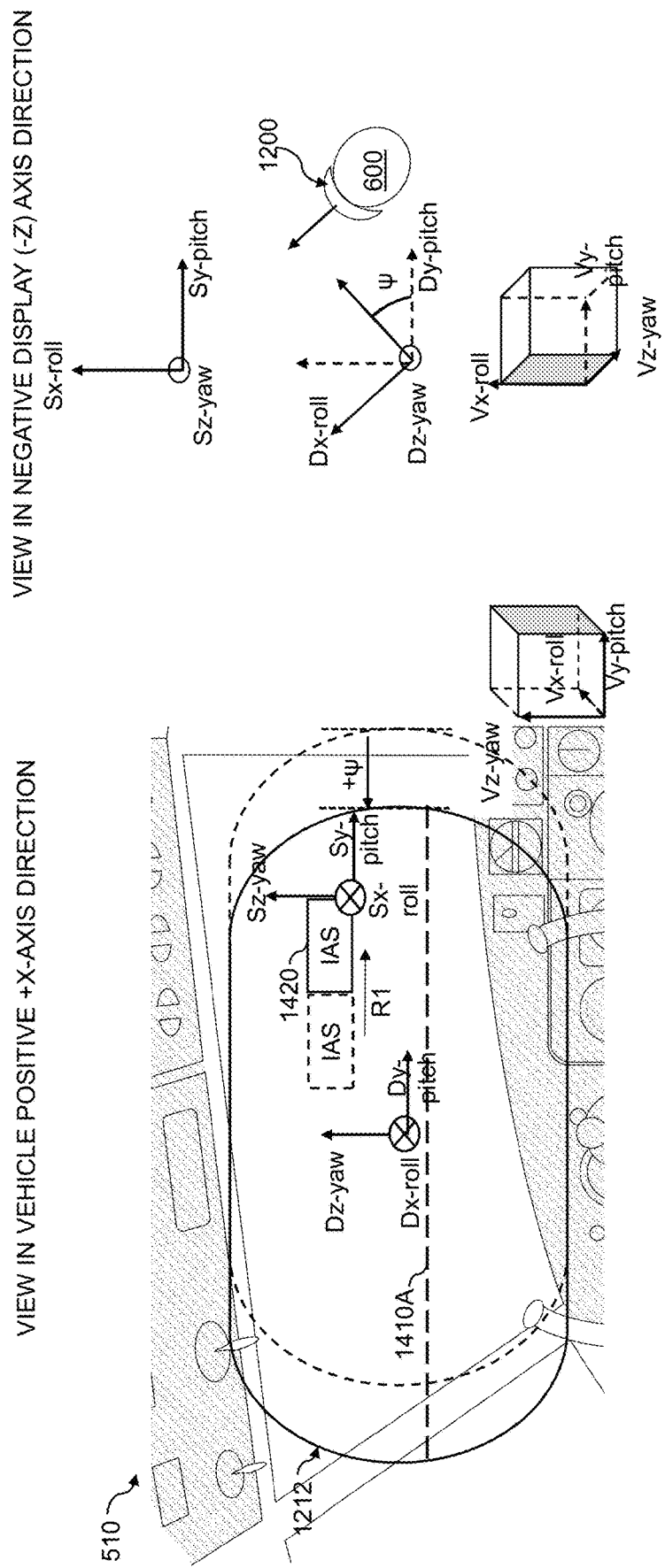

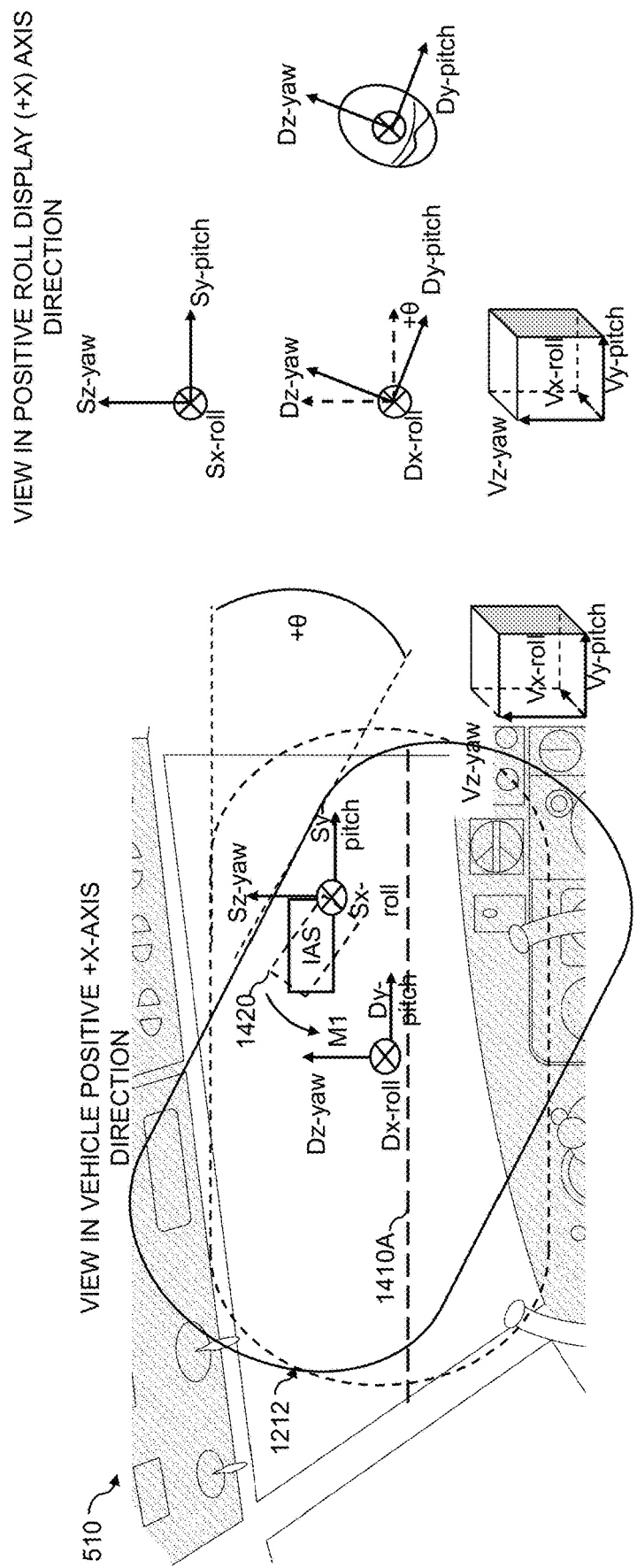

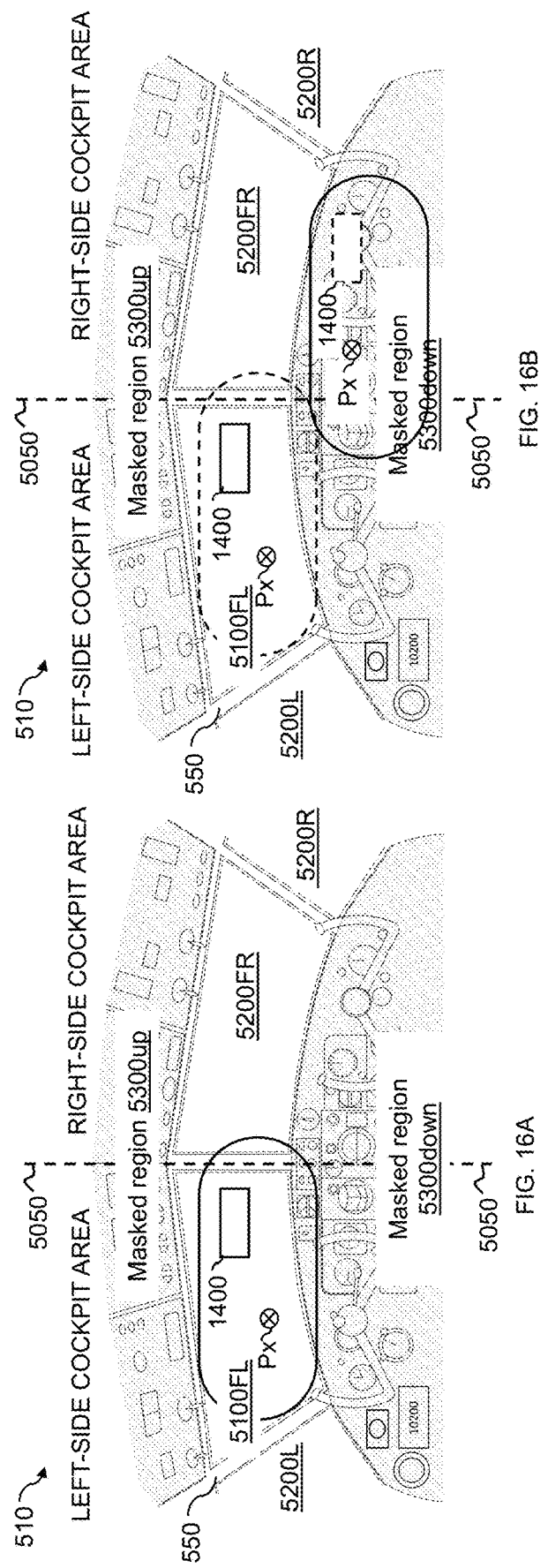

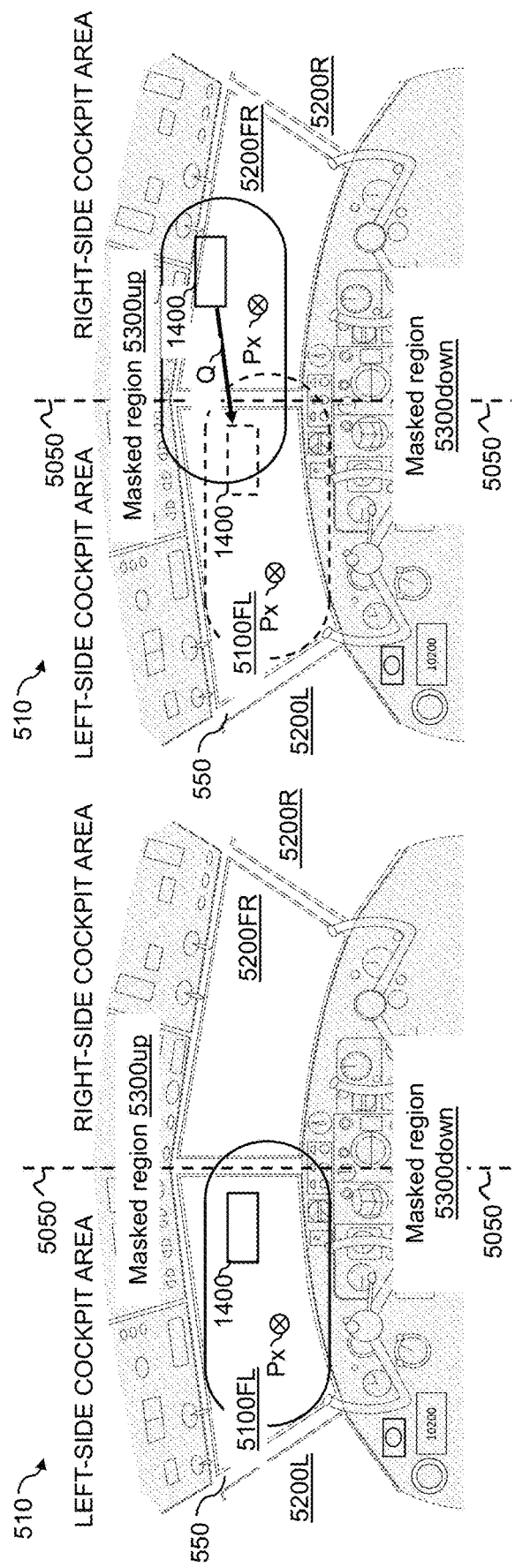

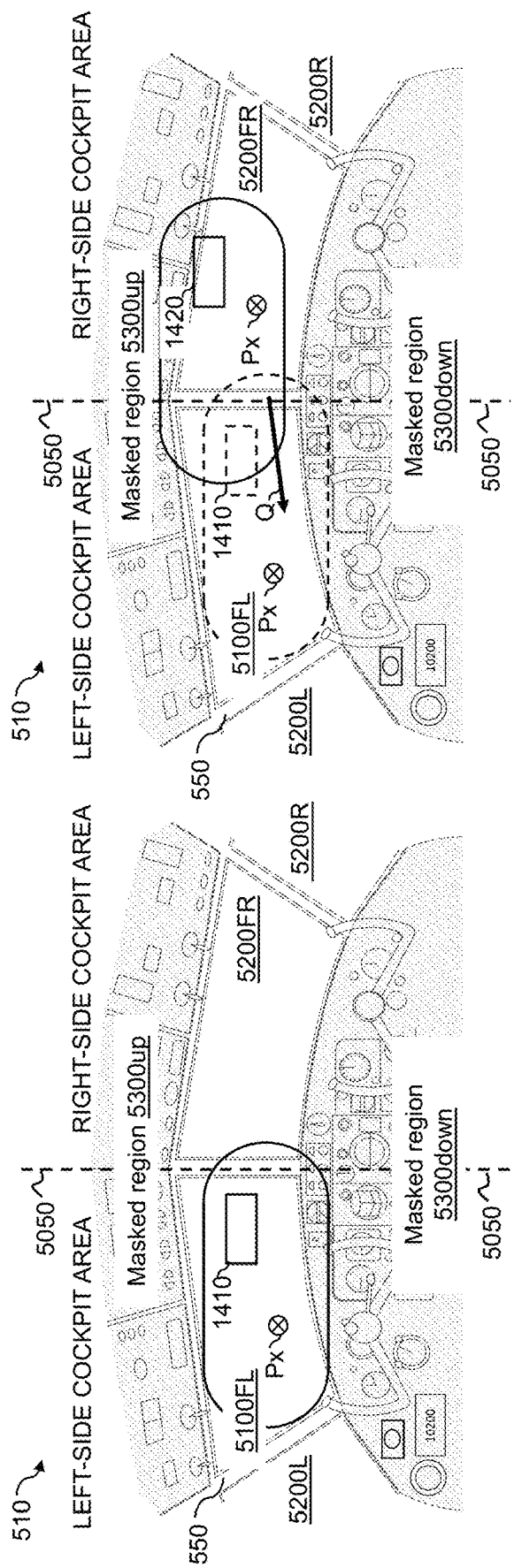

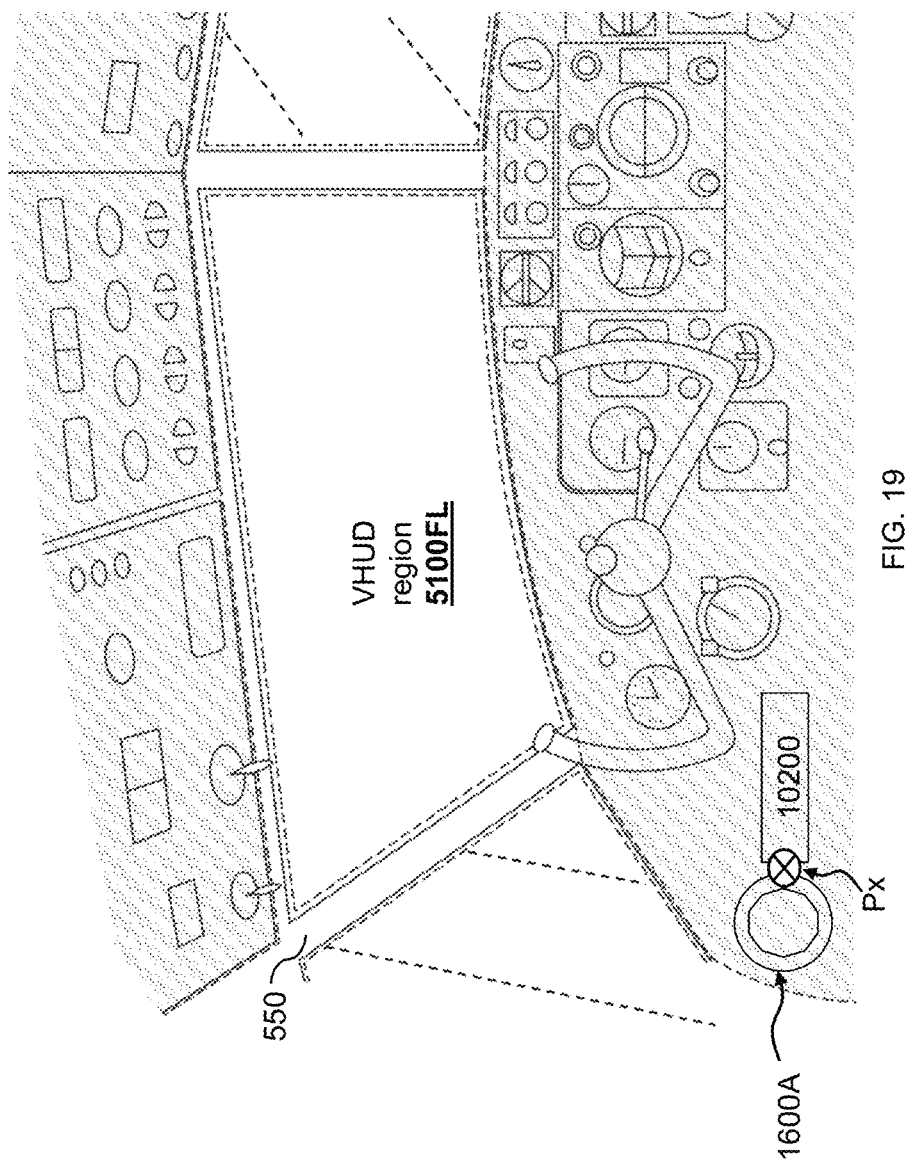

HEAD MOUNTED DISPLAY DEVICE, SYSTEM AND METHOD

RELATED APPLICATIONS

This application is a Track One Continuation of PCT Patent Application No. PCT/IL2018/050337 having International filing date of Mar. 24, 2018, which claims the benefit of priority of IL Application No. 252056 filed May 1, 2017. The contents of the above applications are all incorporated by reference as if fully set forth herein in their entirety.

TECHNICAL FIELD

The present disclosure relates in general to display devices, systems and methods and, more particularly, to head-mounted display devices, systems and methods

BACKGROUND

Head-mounted displays (HMDs), which also include Helmet-mounted displays are, inter alia, employed for conveying information to a user controlling a vehicle and/or for monitoring parameters relating to the vehicle's operation. HMDs can be configured to display a computer-generated symbol while at same time allowing the user to see through the HMD's visor. Exemplarily, HMDs can facilitate the piloting of an aircraft by displaying to the user (also: pilot) a variety of information including, for example, the aircraft's pitch (also: elevation), yaw (also: azimuth), roll, velocity relative to ground, height and drift.

Under certain circumstances, the user's ability to control a vehicle may become compromised due to sensory mismatch between the sensations felt in the inner ear vestibular system and those experienced through other senses, such as the user's visual perceptions. Examples of sensory mismatch include motion sickness and spatial disorientation such as vertigo.

The description above is presented as a general overview of related art in this field and should not be construed as an admission that any of the information it contains constitutes prior art against the present patent application.

BRIEF DESCRIPTION OF THE FIGURES

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The figures are listed below.

FIGS. 2A and 2B are schematic illustrations of symbol orientation relative to the orientation of the display device and control station of the aircraft;

FIG. 5A is a schematic illustration of a non-conformal symbol and of a symbol representing a vehicle state vector as viewed on a display area of the display device, according to some embodiments;

FIG. 5B is a block diagram illustration of the type or classes of symbols that are displayable using the display device;

FIGS. 5C and 5D schematically illustrate an example of a partially conformal symbol and a partially conformal change in the display thereof, according to some embodiments;

FIGS. 7A and 7B schematically illustrate a position of the symbol after traversing the display device in a positive yaw direction relative to the situation shown in FIGS. 6A and 6B, according to some embodiments;

FIGS. 9A and 9B schematically illustrate a position of the symbol after traversing the display device in a positive roll direction relative to the situation shown in FIGS. 8A and 8B, according to some embodiments;

FIGS. 16A to 16B and 17A to 17D are schematic illustrations of the display of a symbol to the pilot when gazing towards one of the various viewing regions, according to some embodiments;

FIGS. 19 to 22 are schematic illustrations of actionably acquiring and engaging real-world objects, according to some embodiments;

DETAILED DESCRIPTION

Embodiments disclosed herein relate to devices, systems and methods for displaying information to a user and which may be configured to facilitate the monitoring and/or controlling of a vehicle, for example, by alleviating or preventing sensory mismatch between the sensations felt in the inner ear vestibular system and those experienced through other senses, and/or by improving ergonomics.

The following description of the display devices, systems and methods is given with reference to particular examples, with the understanding that such devices, systems and methods are not limited to these examples.

Figure 1B:
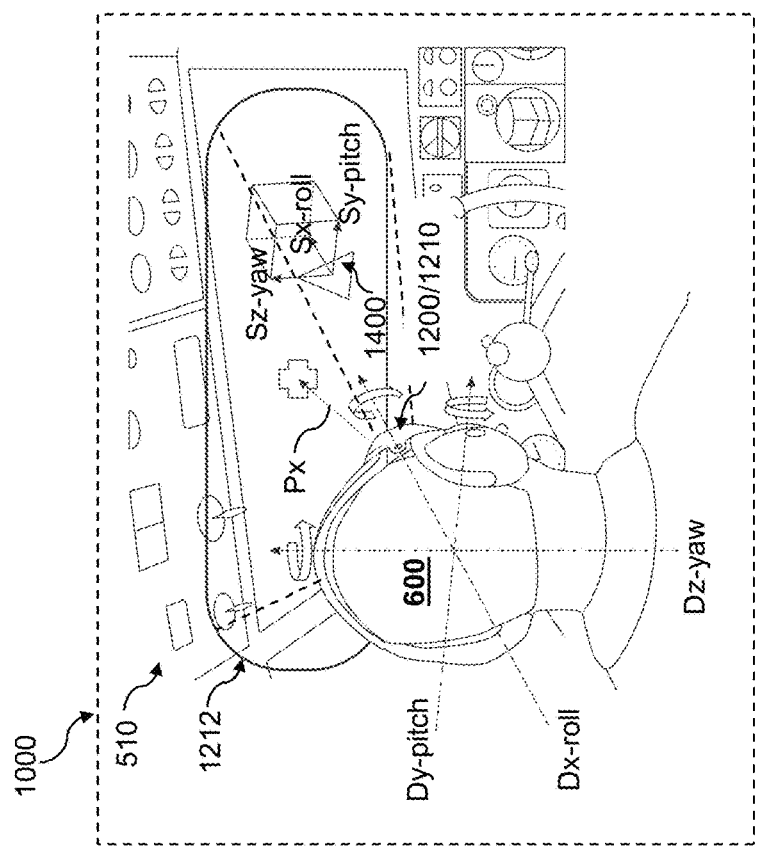
FIG. 1B is a schematic illustration of the axes of rotation of a pilot's head or of a display device while worn by the pilot, and of a symbol displayed to the pilot using the display device, according to some embodiments.
Figure 1A:
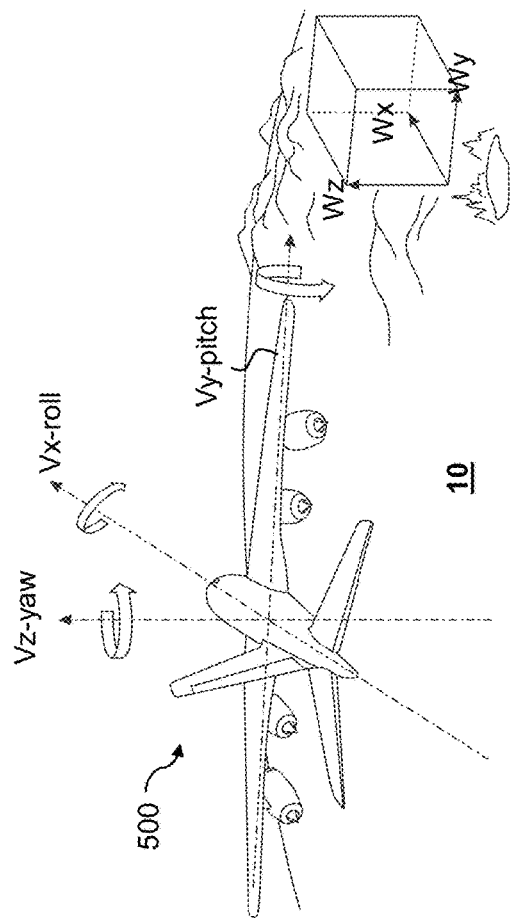
FIG. 1A is a schematic illustration of the principal axes of rotation of an aircraft.

Referring now to FIGS. 1A and 1B, a current or present orientation of an object (e.g., a rigid body and/or of a graphical symbol) with respect to a fixed or reference coordinate system (CS) may be expressed by attitude or orientation angles formed by the object's principal axes of rotation (also: principal axes) relative to the reference coordinate system. In order to determine the orientation of an object relative to a reference coordinate system, the object's principal axes are transformed into the reference coordinate system by using the Euler angles. The Euler angles are thus the angles through which the object's coordinate system must be rotated to bring its axes to coincidence with the reference coordinate system. Accordingly, the Euler angles describe the object's roll (also: bank), pitch (also: elevation), and azimuth (also: heading) orientation with respect to the reference coordinate system. Hence, one can define the orientation of an object relative to a reference coordinate system by the amount of rotation of the parts of the object about these principal axes.

Optionally, yaw, pitch and roll may refer to deviations from a nominal attitude or orientation.

In the accompanying figures, principal axes of rotation may be schematically illustrated as broken arrows.

In the discussion herein, the following conventions are used: the X-axis is defined as the roll axis; the Y-axis is defined as the pitch axis; and the Z-axis is defined as the yaw axis. A positive rotation direction is defined by the so-called "right-hand rule" and $\theta$:=x-roll angle; $\varphi$:=y-pitch angle; and $\Psi$:=z-yaw angle/azimuth.

The terms "Euler angle", "orientation", "attitude", "angular orientation", "angle", as well as grammatical variations thereof and/or analogous expressions, may herein be used interchangeably.

It should be noted that while the rotation coordinate systems are herein exemplified as Cartesian coordinate systems in which the axes are perpendicular to each other, this should by no means be construed as limiting.

Vehicle CS $V_{xyz}$ shown in FIG. 1A is a Cartesian representation of the principal axes of rotation of a vehicle 500 (herein exemplified by an aircraft) that is located in a reference world space 10, which can be a physical or real reference world space, or a virtual (e.g., computer-generated) reference world space. A physical reference world space is different from a virtual reference world space in that the physical reference world space actually comprises a control station 510, whereas the virtual reference world space may be used in a simulation environment and simulates or emulates that control station 510 is located within a selected reference world space. The virtual reference world space can be different from the physical space in which control station 510 is located in reality. In either case, $V_{xyz}$ is spatially fixed to vehicle 500, so that an attitude of vehicle 500 may be expressed by the angles of the vehicle CS $V_{xyz}$ relative to a world coordinate system (Wxyz) of reference world space 10.

Non-limiting examples of control station 510 can include a cockpit (e.g., of a passenger plane, a combat aircraft, a vertical takeoff and landing (VTOL) aircraft, a tiltrotor aircraft, a transport aircraft, a fixed-wing aircraft, a rotary-wing aircraft, and/or a combined fixed/rotary-wing aircraft); a bridge of a watercraft (e.g., a passenger ship, a frigate, an aircraft carrier, a freighter); a driver cabin (e.g., of a car, bus, truck and/or armored fighting vehicle); a submarine control/command room; a vehicle control simulator (e.g., a flight simulator, a passenger car driving simulator); and/or any other vehicle command or control room, e.g., including for remote controlling of a vehicle, as outlined herein below in more detail.

While the embodiments disclosed herein may relate to aircrafts, this should by no means be construed limiting. Accordingly, embodiments disclosed herein may additionally or alternatively be employed in conjunction with vehicles including, for example, land-based vehicles such as, for instance, a passenger car, a motorcycle, a bicycle, a transport vehicle (e.g., a bus, truck, a rail-based transport vehicle, etc.), a watercraft, a submarine, a spaceship, a multipurpose vehicle such as a hovercraft, and/or the like.

To simplify the discussion that follows, without be construed limiting, "vehicle 500" may herein be referred to as aircraft 500, and "control station 510" may herein be referred to as "cockpit 510". Accordingly, where reference is made to an "aircraft", the corresponding description may be analogously or equally applicable to "vehicles" in general. In some embodiments, a control station may embody a remote control station for remotely controlling (e.g., piloting) a vehicle.

As shown schematically in FIG. 1B, a display device 1200 such as an HMD may be worn by a user (e.g., pilot) 600. Without be construed limiting, a "user" may herein also be referred to as a "pilot" of aircraft 500; and a "display device" may herein also be referred to as "HMD". Optionally, an HMD may be embodied by glasses and/or goggles (e.g., including night vision goggles) which are mounted on a helmet. Optionally, an HMD may comprise glasses and/or goggles.

Display device 1200 is configured to display information to pilot 600 to facilitate the piloting of aircraft 500. An orientation of display device 1200 relative to the vehicle coordinate system Vxyz is herein exemplarily expressed by a display device or HMD coordinate system $D_{x\text{-}roll,\ y\text{-}pitch,\ z\text{-}yaw}$ ($D_{xyz}$) that is defined as being spatially fixed to display device 1200. Optionally, display device coordinate system $D_{xyz}$ may be the principal axes of display device 1200.

In an embodiment, both display device 1200 and user 600 can be carried by vehicle 500 and may be, for example, located in cockpit 510. Optionally, display device 1200 may move freely within vehicle 500 and still be operationally usable by user 600. Display device 1200 may for example move freely in cockpit 510, a freight space, a deck of a ship and/or in any area or location of vehicle 500 while, at the same time, be operationally usable by user 600 wearing display device 1200 as exemplified herein.

Display device 1200 is configured to display one or more symbols 1400 conveying information to user 600. For example, display device 1200 may project symbols 1400 onto a symbology display area 1212 of a display component 1210 (e.g., a "see-through combiner" or a visor) which are then reflected towards user 600. At the same time, display device 1200 may allow user 600 to see through display device 1200 so that the one or more symbols 1400 are superimposed with the pilot's current field of view (CFOV) of the outside world. Additional or alternative display technologies may be employed including, for example, a flat substrate as a display, or a night vision goggles (NVG), while allowing the user to "see-through" the display.

The one or more symbols 1400 may be automatically and continuously displayed through placement and replacement.

To simplify the discussion that follows, the one or more symbols 1400 may hereinafter be referred to in the singular as "symbol 1400" or the plural as "symbols 1400", depending on the context.

Since display device 1200 is a see-through device, different positions on the display surface can represent different angles. Milliradians (mRAD) may for example be used as angular measurement units to indicate different positions on display device 1200.

An orientation of symbol 1400 relative to the display device coordinate system $D_{xyz}$ (and therefore relative to display device 1200 or the orientation of the user's head) is herein exemplarily expressed by a symbol coordinate system $S_{x\text{-}roll,y\text{-}pitch,z\text{-}yaw}$ or $S_{xyz}$ that is spatially fixed with symbol 1400 to be displayed by display device 1200.

Optionally, symbol coordinate system $S_{xyz}$ can define three symbol principal axes of rotations that are orthogonal to each other.

Optionally, origin O of $S_{xyz}$ can be outside symbology display area 1212.

Aspects of embodiments are directed to the display of symbols 1400 relative to the user's or HMD wearer's 600 total field of view (TFOV). As used herein, "TFOV" refers to the HMD wearer's view for a complete range of rotation and translation of the wearer's head, whereas the user's CFOV refers to what the HMD wearer or user can see at a given moment.

As already indicated herein, a pilot's ability to control a vehicle may become compromised due to sensory mismatch, which may include motion sickness and spatial disorientation such as vertigo and, therefore, adversely affect the pilot's situational awareness.

Reference is made to FIGS. 2A and 2B, which schematically shows a scenario that may cause sensory mismatch. Normally, the orientation of a non-conformal symbols 1420, herein exemplified as "IAS" (indicated airspeed), vertical altitude and speed scales 1420A-C, respectively, are fixed with respect to display device 1200. Further examples of non-conformal symbols may pertain to vital signs of user 600, outside temperature; outside humidity; outside pressure; cabin pressure; fuel reserves; battery power; engine thrust; instrument functionality; and/or G-force on an aircraft.

Display device 1200 is shown to roll through angle $+\theta$ relative to the vehicle's roll axis $V_{x\text{-}roll}$, and non-conformal symbol 1420 rolls along with display device 1200 to the same extent, namely through angle $+\theta$. The dashed lines indicate the initial position of display device 1200 and non-conformal symbol 1420 before rotation, and the continuous lines show final orientation after rotation. Accordingly, orientation of non-conformal symbol IAS is altered by angle $+\theta$ relative to $V_{x\text{-}roll}$ of cockpit 510, possibly causing sensory mismatch. Roll orientation of the pilot's head relative to cockpit 510 may change many times during a comparatively short period of time, causing orientation of non-conformal symbol IAS to change relative to cockpit 510 equally often. Frequent and/or extensive changes in the orientation of non-conformal symbols such as, for example, IAS 1420A, vertical altitude scale 1420B1 and speed scale 1420B2, respectively, relative to cockpit 510 may increase the likelihood of sensory mismatch and/or adversely affect the pilot's situational awareness. In the FIGS. 2A and 2B, continuous lines of IAS 1420A, vertical altitude scale 1420B1 and speed scale 1420B2 schematically illustrate a "current" orientation, whereas broken lines indicate a previous orientation of IAS 1420A, vertical altitude scale 1420B1 and speed scale 1420B2 before a change of display device 1200 to the "current" orientation.

Figures 3A, 3B:
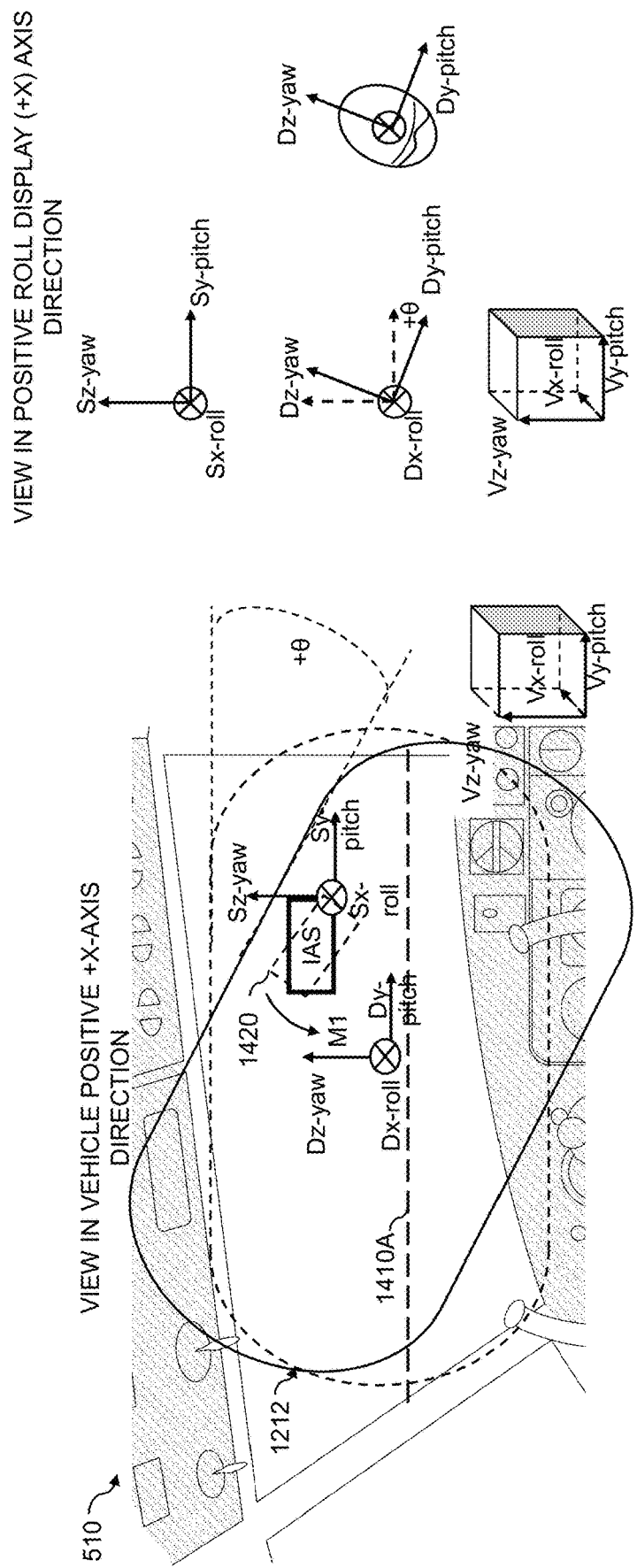
FIGS. 3A and 3B are schematic illustrations of symbol orientation relative to the orientation of display device and the aircraft, according to some embodiments.

FIGS. 3A and 3B schematically exemplify how the likelihood of sensory mismatch occurrences may be reduced, according to some embodiments. Merely for the sake of clarity and to simplify the discussion that follows, without be construed limiting, vertical altitude and speed scales 1420B1 and 1420B2 are not illustrated starting from FIGS. 3A and 3B, and the description below may refer to non-conformal IAS and/or any other non-formal symbol using alphanumeric designation "1420".

In the embodiment shown in FIGS. 3A and 3B, the roll orientation $S_{x\text{-}roll}$ of non-conformal symbol IAS is orientationally fixed with respect to the vehicle's roll axis $V_{x\text{-}roll}$. Hence, while display device 1200 rolls through angle $+\theta$ relative to the vehicle's roll axis $V_{x\text{-}roll}$, the orientation of non-conformal symbol IAS remains unchanged with respect to the vehicle's roll axis $V_{x\text{-}roll}$, thereby possibly reducing the likelihood of sensory mismatch.

Figure 4:
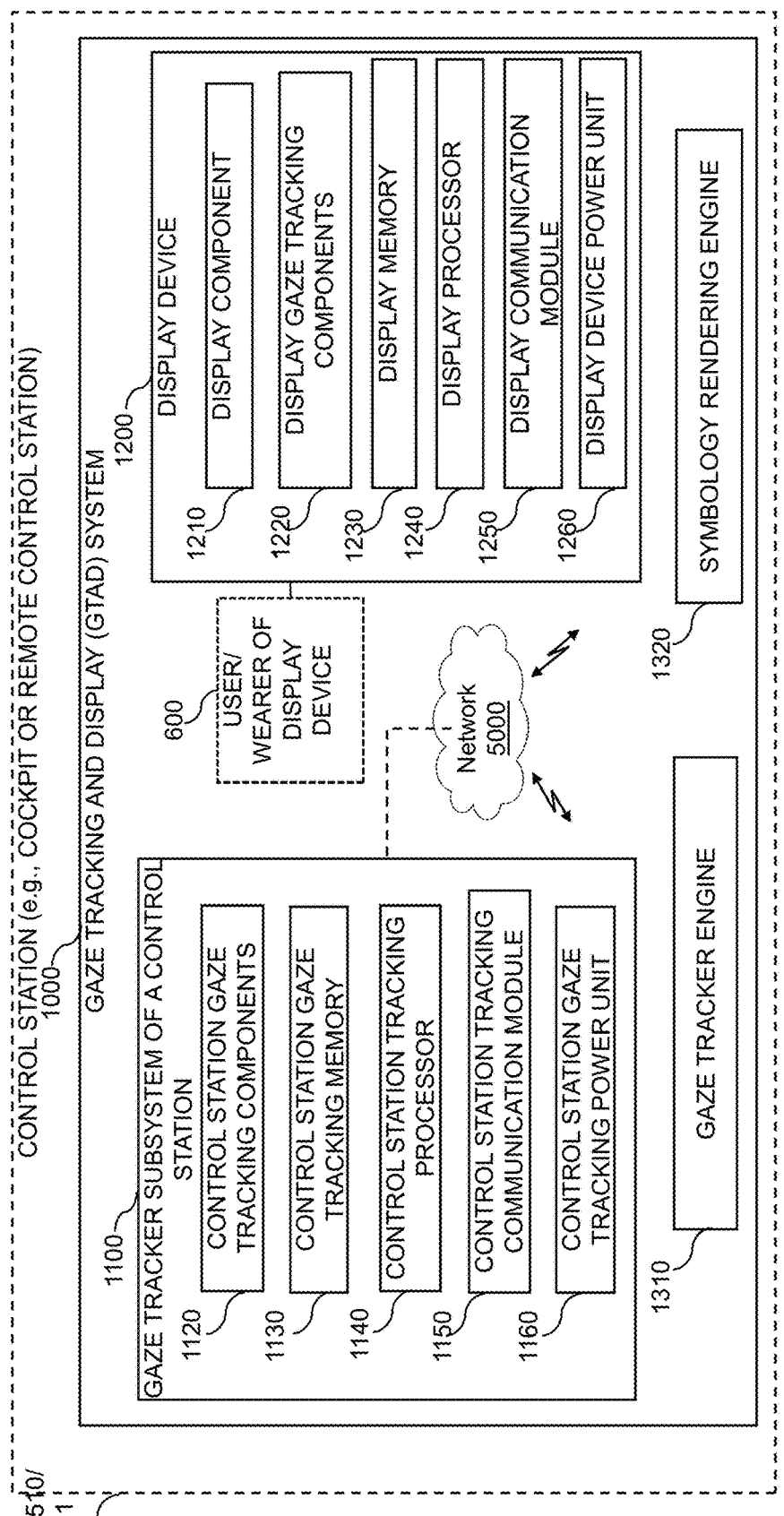
FIG. 4 is a block diagram illustration of a gaze tracking and display (GTAD) system, according to some embodiments.

Further referring to FIG. 4, a gaze tracking and display (GTAD) system 1000 is operable to determine an orientation and translational position of display device 1200 relative to control station (also: cockpit) 510, first remote control station 9510 and/or second remote control station 9511. Alphanumeric designations "9510" and "9511" concern remote control stations, which are discussed herein in more detail in conjunction with FIGS. 11-13.

Based on the determined orientation and position of display device 1200 relative to cockpit 510, GTAD system 1000 can determine the CFOV that can be seen by pilot 600 through display component 1210.

The pilot's CFOV of the outside world can include, for example, a view of the aircraft's cockpit and/or a view of the exterior of the aircraft. Optionally, a current view of the aircraft's exterior can be conveyed by displaying user 600 an image (or sequence of images) emulating a view of the exterior. Hence, in addition or as alternative of viewing the exterior of the aircraft through a window, the pilot may view an exterior of the aircraft via a stationary display device (not shown) that is positionally fixed with respect to cockpit 510 or a remote control station. Embodiments pertaining to remote controlling a vehicle from a remote control station will be outlined further below in more detail. Optionally, symbol(s) 1400 can convey to user 600 a variety of information including, for example, the aircraft's pitch, azimuth, roll, velocity relative to ground, height, and flight direction.

In an embodiment, GTAD system 1000 comprises components and/or modules which are operable to implement a gaze tracker engine 1310 and a symbology rendering engine 1320, e.g., as outlined herein. Generally, gaze tracker engine 1310 and symbology rendering engine 1320 are operable to implement methods, processes and/or procedures relating to the display of one or more symbols 1400 to user 600.

The term "engine" as used herein in the context of computerized functionalities may comprise one or more computer modules. Exemplarily, a module may be a self-contained hardware and/or software component that interfaces with a larger system. A module may comprise a machine or machines executable instructions. A module may be embodied by a circuit and/or a controller programmed to cause the system to implement the method, process and/or operation as disclosed herein. For example, a module may be implemented as a hardware circuit comprising, e.g., custom Very Large Scale Integrated (VLSI) circuits or gate arrays, an Application-specific integrated circuit (ASIC), off-the-shelf semiconductors such as logic chips, transistors, and/or other discrete components. A module may also be implemented in programmable hardware devices such as field programmable gate arrays, programmable array logic, programmable logic devices and/or the like.

Gaze tracker engine 1310 may be operable to determine an estimate relating to a current position and orientation of display device 1200 relative to the cockpit of aircraft 500. Symbology rendering engine 1320 may be operable to cause display component 1210 to provide a video output of a symbol 1400 depending on the determined current position and orientation of display device 1200. More specifically, a type and/or orientation and/or position of a display symbol 1400 displayed by display component 1210 at any given moment may depend on a current orientation and/or position of display device 1200 relative to the cockpit of aircraft 500 as determined, e.g., by gaze tracker engine 1310.

In an embodiment, GTAD system 1000 comprises a gaze tracker subsystem 1100 that is, e.g., embedded in vehicle 500 or in a remote control station. Gaze tracker subsystem 1100 may comprise control station gaze tracking components 1120. Control station gaze tracking components 1120 can be operatively coupled with display gaze tracking components 1220 of display device 1200 such to allow determining an estimate of a position and/or orientation of display device 1200 relative to control station 510. Gaze tracker subsystem 1100 may be operable to determine the user's gaze based on a head pose of the user and/or based on the user's eye-gaze direction.

Various gaze tracking technologies may be implemented by control station gaze tracking components 1120 and display gaze tracking components 1220 for determining a head pose including, for example, optical, electromagnetic, inertial sensors (e.g., one or more accelerometers and/or gyroscopes), and/or sonic-based technologies. When employing for instance electromagnetic-based technologies for gaze tracking, control station gaze tracking components 1120 may for example comprise alternating electric field generators (not shown) that are operable to produce an alternating electric field in the cockpit of aircraft 500. Display gaze tracking components 1220 may for example include conductive coils (not shown) that are comprised in display device 1200. Such conductive coils (not shown) are configured to produce different voltages based on a current position and orientation of display device 1200 in the cockpit of aircraft 500. Based on the produced voltage, gaze tracker engine 1310 can determine an estimate of the position and orientation of display device 1200 relative to the cockpit of aircraft 500, and symbology rendering engine 1320 may cause display component 1210 to provide a video output of a symbol 1400 according to the determined instant current position and orientation estimate.

In some embodiments, various technologies may be employed by gaze tracker subsystem 1100 for determining the user's eye-gaze direction or point of gaze Px including, for example, camera-based and/or reflection-based eye-movement tracking. Devices and/or systems (not shown) employed for tracking the user's eye-gaze direction may be head- and/or vehicle-mounted.

Clearly, same or analogous technologies may be employed for tracking gaze of a user piloting a vehicle from a remote control station.

It is noted that a position of symbology display area 1212 (FIG. 2A) changes according to a change in position of the head of pilot 600. Moreover, a point of intersection of (an optionally tracked) eye-gaze direction Px with display component 1210 may change relative to the frame that defines the boundaries of symbology display area 1212.

Gaze tracker subsystem 1100 may comprise, in addition to control station gaze tracking components 1120, a control station gaze tracking processor 1140, a control station gaze tracking memory 1130, a control station gaze tracking communication module 1150, and a control station gaze tracking power unit 1160 for powering the various components and/or modules of control station gaze tracker subsystem 1100.

In an embodiment, display device 1200 may comprise display gaze tracking components 1220, display memory 1230, display processor 1240, display communication module 1250, and display device power unit 1260 for powering the various components of display device 1200. As for example schematically illustrated in FIGS. 1A, 1B and FIG. 4, in an operable configuration, HMD wearer 600 may be located in vehicle 500. It should be noted that separate hardware components such as processors and/or memories may be allocated for each component and/or module in GTAD system 1000. For instance, separate processors and memories may be allocated to implement gaze tracker engine 1310 and symbology rendering engine 1320. However, for simplicity, the following description may herein for instance generically refer to control station gaze tracking memory 1130 and to control station gaze tracking processor 1140, and to display memory 1230 and display processor 1240 for implementing gaze tracker engine 1310, symbology rendering engine 1320, and/or other functions of GTAD system 1000, e.g., as outlined herein.

The various components and/or modules of GTAD system 1000 may communicate with each other over one or more communication buses (not shown), signal lines (not shown) and/or a network infrastructure 5000.

In embodiments, control station gaze tracking memory 1130 and/or display memory 1230 may include one or more types of computer-readable storage media including, for example, transactional memory and/or long-term storage memory facilities and may function as file storage, document storage, program storage, and/or as a working memory. As working memory, control station gaze tracking memory 1130 and/or display memory 1230 may for example be in the form of a static random access memory (SRAM), dynamic random access memory (DRAM), read-only memory (ROM), cache and/or flash memory and include, for instance, temporally-based and/or non-temporally based instructions. As long-term memory, control station gaze tracking memory 1130 and/or display memory 1230 may for example include a volatile or non-volatile computer storage medium, a hard disk drive, a solid state drive, a magnetic storage medium, a flash memory and/or other storage facility. A hardware memory facility may for example store a fixed information set (e.g., software code) including, but not limited to, a file, program, application, source code, object code, data, and/or the like.

The term "processor", as used herein, may encompass a controller. A processor such as, for example, control station gaze tracking processor 1140 and/or display processor 1240 may be implemented by various types of processor devices and/or processor architectures including, for example, embedded processors, communication processors, graphics processing unit (GPU)-accelerated computing, soft-core processors and/or general purpose processors.

Control station gaze tracking communication module 1150 and/or display communication module 1250 may, for example, include I/O device drivers (not shown) and network interface drivers (not shown) for enabling the transmission and/or reception of data over network infrastructure 5000, e.g., from gaze tracker subsystem 1100 to display device 1200 and vice versa. With respect to in-aircraft communication, network infrastructure 5000 may, for example, operate on and/or implement various avionics Local Area Network (LAN) communication standards including, for example, Aeronautical Radio INC. (ARINC) 429, ARINC 629, MUX Bus 1553, Controller Area Network (CAN) BUS, and/or Avionics Full-Duplex Switched Ethernet (AFDX).

Subsystem power unit 1160 and display device power unit 1260 may comprise an internal power supply. Optionally, display device power unit 1260 may comprise an interface for allowing connection to an external power supply (e.g., from aircraft 500).

Gaze tracker engine 1310 and/or symbology rendering engine 1320 may be implemented by any suitable device, fully or partially. For example, implementations and/or processes and/or elements and/or functions of gaze tracker engine 1310 and/or symbology rendering engine 1320 may be implemented by control station gaze tracker subsystem 1100, and/or by display device 1200. For instance, control station gaze tracking memory 1130 and/or display memory 1230 may include instructions which, when executed e.g. by the control station gaze tracking processor 1140 and/or display processor 1240, may cause the execution of a methods, processes and/or operations as disclosed herein. To simplify the discussion that follows, methods and processes disclosed herein may herein be discussed in conjunction with gaze tracker engine 1310 and/or symbology rendering engine 1320. One or more hardware, software, and/or hybrid hardware/software modules may realize gaze tracker engine 1310 and/or symbology rendering engine 1320. Gaze tracker engine 1310 and/or symbology rendering engine 1320 may operatively interface with vehicle instruments and process data relating to the vehicle instruments for generating the corresponding symbology to be displayed by display device 1200. In some embodiments, at least some or all symbology may be generated external to display device 1200. For the symbology that is generated external to display device 1200, communication between symbology rendering engine 1320 and display device 1200 may be mainly video.

In an embodiment, GTAD system 1000 is operable to allow selectively (also: controllably) spatially fixing the orientation of at least one symbol rotation axis (Sα) of symbol coordinate system $S_{xyz}$ with a principal axis descriptive of an orientation of vehicle 500. For example, $S_\alpha$ may be the symbol rotation axis $S_{x\text{-}roll}$, which may be orientationally fixed with at least one principal axis (e.g., $V_{x\text{-}roll}$) of the vehicle coordinate system $V_{xyz}$.

In an embodiment, at least one further principal symbol axis ($S_\beta$) is correspondingly selectively spatially fixable either to at least one other principal axis of vehicle 500 or of the display device coordinate system $D_{xyz}$.

In an embodiment, the orientational fixation of symbol rotation axes $S_\alpha$ and $S_\beta$ may be predetermined in GTAD system 1000 and/or occur "on-the-fly", e.g., during the piloting of aircraft 500.

Optionally, a symbol may be descriptive of, or represent, a vehicle state vector. Such symbol may herein be referred to as "vehicle state vector symbol". Generally, a vehicle state vector symbol represents a state of the vehicle at a particular time instance. A vehicle state vector symbol can for example represent values of aircraft flight parameters such as the aircraft's flight path vector (FPV); and/or engine thrust direction and/or magnitude. Optionally, a translational position of a vehicle state vector symbol may be adjusted in accordance with the values pertaining to the vehicle state vector. To simplify the discussion that follows, without be construed limiting, embodiments and examples pertaining to a vehicle state vector may be outlined with respect to an aircraft's FPV.

In some embodiments, a translational position of a symbol 1400 (e.g., translational position of non-conformal symbol 1420) may be adjusted (e.g., translationally fixed) in accordance with a position of vehicle state vector on display device 1200. Optionally, the symbol's rotational orientation may not be adjusted in accordance in accordance with the position of the vehicle state vector (e.g., the FPV).

In an embodiment, the translational adjustment of symbol 1400, which can represent a vehicle state vector, may be predetermined in GTAD system 1000 and/or occur "on-the-fly", e.g., during the piloting of aircraft 500. Optionally, GTAD system 1000 may be operable to adjust the translational position of a vehicle state vector symbol in accordance with a change of translational position of display device 1200 in vehicle 500 and/or in accordance with a change in a parameter value described by the vehicle state vector.

Various scenarios will be exemplified and listed below in more detail.

Further reference is now made to FIG. 5A, which schematically illustrates a pilot's CFOV. Symbology display area 1212 shown in FIG. 5A exemplarily delineates the imaginary boundaries of a region in which computer-rendered symbols 1400 can be displayed to pilot 600 by display component 1210. It is noted that symbology display area 1212 may encompass only a part or the entire area of display component 1210.

Further referring to FIG. 5B, symbols 1400 may be classified to belong to one of the following categories: conformal symbols 1410, non-conformal symbols 1420, or partially conformal symbols 1430.

A symbol is considered to be "conformal" if the information that it conveys preserves a scale and/or orientation with respect to World Coordinate System Wxyz. Non-limiting examples of conformal symbols 1410 can include a display of an artificial or synthetic horizon 1410A, flight path vector (FPV) 1410B, symbol descriptive of an acquired target; symbol pointing on an incoming missing and/or the like.

and/or the like. Correspondingly, a symbol can be considered to be "non-conformal" if the information that it conveys does not or only partially preserves a scale and/or orientation with respect to Wxyz. Non-limiting examples of non-conformal symbols 1420 can include a display of the aircraft's fuel level and/or status, cockpit pressure, indicated air speed (IAS), and/or any other type of information describable by a scalar; ordinal; categorical; and/or interval parameter.

Additional reference is made to FIGS. 5C and 5D to elaborate on the differences between conformal and partial-conformal display of symbols.

FIG. 5C schematically exemplifies a scenario in which azimuth bar 1430 is displayed in a conformal manner in a virtual HUD (VHUD) region 5100FL whose boundary is schematically delineated by broken lines and herein exemplified as matching the area of a front left (FL) window of control station 510. The azimuth angle is measured in a straight virtual surface which is "tangential" to the earth's surface, optionally with the north pole as Zero azimuth, increasing clockwise relative thereto.

In the scenario exemplified in FIG. 5C, azimuth bar 1430 comprises ticks or markers 1431, and a pointer 1432. Markers 1431 indicate the azimuth angle, and pointer 1432 is fixed to the aircraft's nose, so that azimuth bar 1430 virtually "slides" relative to pointer 1432 responsive to a change in the vehicle's azimuth angle. The distance between each two neighboring markers 1431 may indicate a change in predetermined azimuth angle (e.g., 5 degrees). Azimuth bar 1430 is schematically illustrated in FIG. 5C as being displayed in a conformal manner such that angular displacement is identical to displacement of the external visual scene.

FIG. 5D schematically shows a scenario in which symbology display area 1212 is displaced (e.g., turned to the left), compared to the situation shown in FIG. 5C. To convey the same amount of information in less space, the distance between markers 1431 is condensed. Accordingly, in FIG. 5D, azimuth markers 1431 and pointer 1432 are shown in partial conformity with respect to the external visual scene. In some embodiments, the distance between markers may be condensed to convey more information in the same amount of space (not shown). In either case, change in azimuth angle is reduced or scaled down compared to displacements of the external visual scene. While partial conformity is herein only exemplified with respect to azimuth angle, this should by no means be construed in a limiting manner. Accordingly, additional or alternative attitude symbology may be displayed to the user in a partially conformal manner including, for example, the vehicle's pitch ladder. Additional examples of partially conformal symbols 1430 can include roll (also: bank) indication.

In some embodiments, as will be outlined further below, a FPV may also be categorized as a partially conformal symbol.

Figures 6A, 6B:
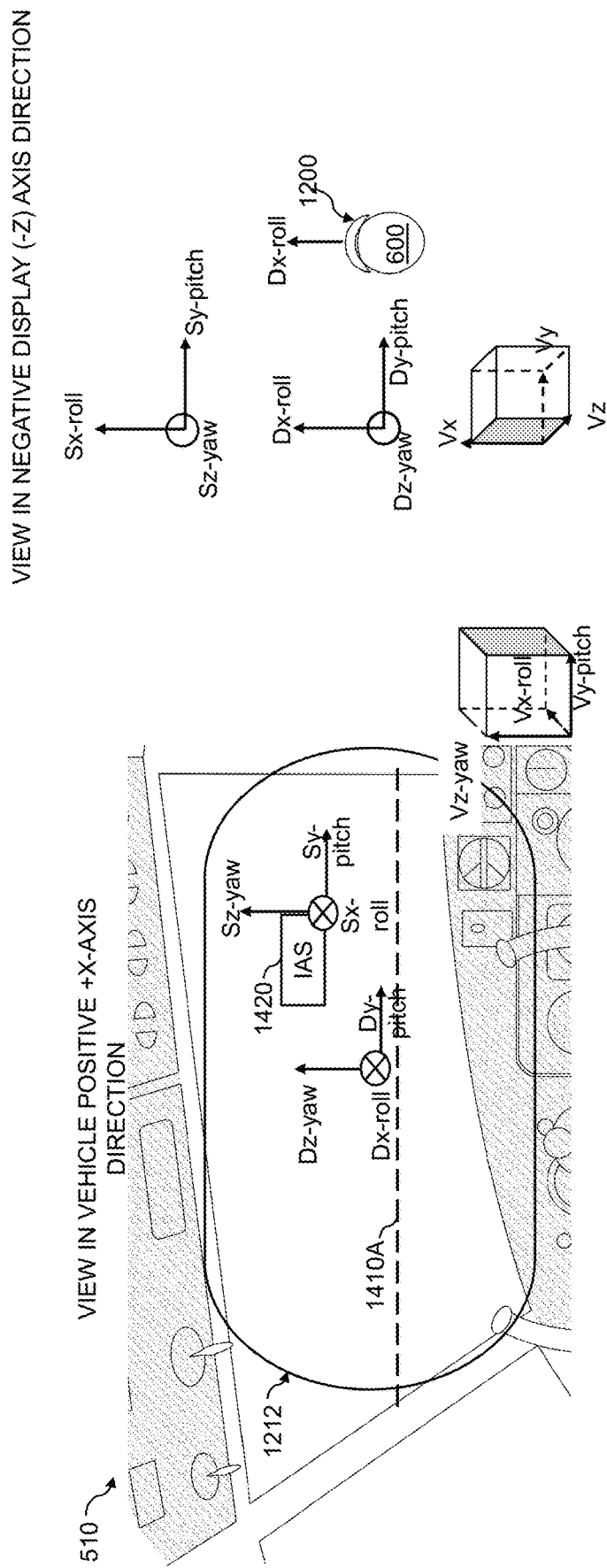
FIGS. 6A and 6B schematically illustrate a symbol orientation relative to the display device and the aircraft when all rotation axes are aligned with each other.

Further reference is made to FIGS. 6A and 6B, schematically showing a scenario in which, initially, the orientation of both display device rotation axes $D_{xyz}$ and Symbol rotation axes $S_{xyz}$ are aligned with the vehicle principal axes $V_{xyz}$ for all rotation axes x-roll, y-pitch and z-yaw. It is noted that display device rotation axes $D_{xyz}$ may in some embodiments be considered to be principal axes of display device 1200. Analogously, symbol rotation axes $S_{xyz}$ may in some embodiments be considered to be principal axes of symbol 1400, as if symbol 1400 was a rigid body.

To simplify the discussion that follows, the conformal symbol for FPV 1410B has been removed so that only artificial horizon 1410A is shown alongside non-conformal symbol 1420, which is exemplified herein to show "IAS". The rectangle of non-conformal symbol 1420 may be a real or imaginary rectangle and is shown in FIG. 6A to facilitate illustrating a roll angle or orientation of non-conformal symbol 1420 relative to vehicle CS V$xyz$. Exemplarily, the rectangular's long edge of IAS 1420, which in the current orientation shown in FIG. 6A is illustrated to be parallel to principal axis with $V_{y-pitch}$, is considered to coincide with the principal axis $S_{y-pitch}$. The rectangle's short edge of non-conformal symbol 1420 is considered to coincide with the principal axis $S_{z-yaw}$; and a direction which is normal to the rectangle and pointing in distal direction away from user 600 wearing display device 1200 and, hence, pointing in direction of the user's CFOV, is considered to coincide with $S_{x-roll}$.

It is noted that for the sake of clarity and to simplify illustrations, any change in pitch and yaw orientation of display device 1200 relative to Vxyz is shown in the accompanying figures as a change in the display's translational position, without showing changes in a perspective view of symbology display area 1212. Additional reference is made to FIGS. 7A and 7B. In an embodiment, GTAD system 1000 may be configured so that a change in azimuth angle of display device 1200 relative to Vxyz does not cause a change in the display of yaw orientation of non-conformal symbol 1420. FIGS. 7A and 7B exemplify a scenario in which at least $S_{z-yaw}$ (Sα) is spatially fixed with respect to $V_{z-yaw}$. At least one further symbol rotation axis (S$_\beta$) (e.g., $S_{x-roll}$) may be spatially fixed to either $D_{x-roll}$ or $V_{x-roll}$, and principal axis $S_{y-pitch}$ may be spatially fixed to either $D_{y-pitch}$ or $V_{y-pitch}$. A relative displacement of non-conformal symbol 1420 with respect to symbology display area 1212 due to the spatial fixing of $S_{z-yaw}$ (Sα) with respect to $V_{z-yaw}$ is schematically illustrated by arrow R1. A position in which non-conformal symbol 1420 would be if $S_{z-yaw}$ (Sα) was not fixed with respect to $V_{z-yaw}$ is schematically illustrated in FIG. 5A by the broken lines of rectangle 1420. A positive yaw rotation is herein expressed by angle +ψ. Optionally, principal axis $S_{x-roll}$ may be spatially fixed to either $D_{x-roll}$ or $V_{x-roll}$, and principal axis $S_{y-pitch}$ may be spatially fixed to either $D_{y-pitch}$ or $V_{y-pitch}$.

Figure 8B:
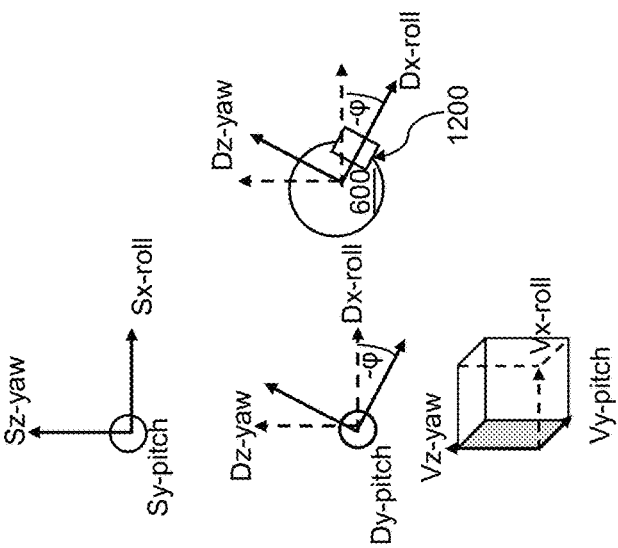
FIGS. 8A and 8B schematically illustrate a position of the symbol after traversing the display device in a negative pitch direction relative to the situation shown in FIGS. 6A and 6B, according to some embodiments.
Figure 8A:
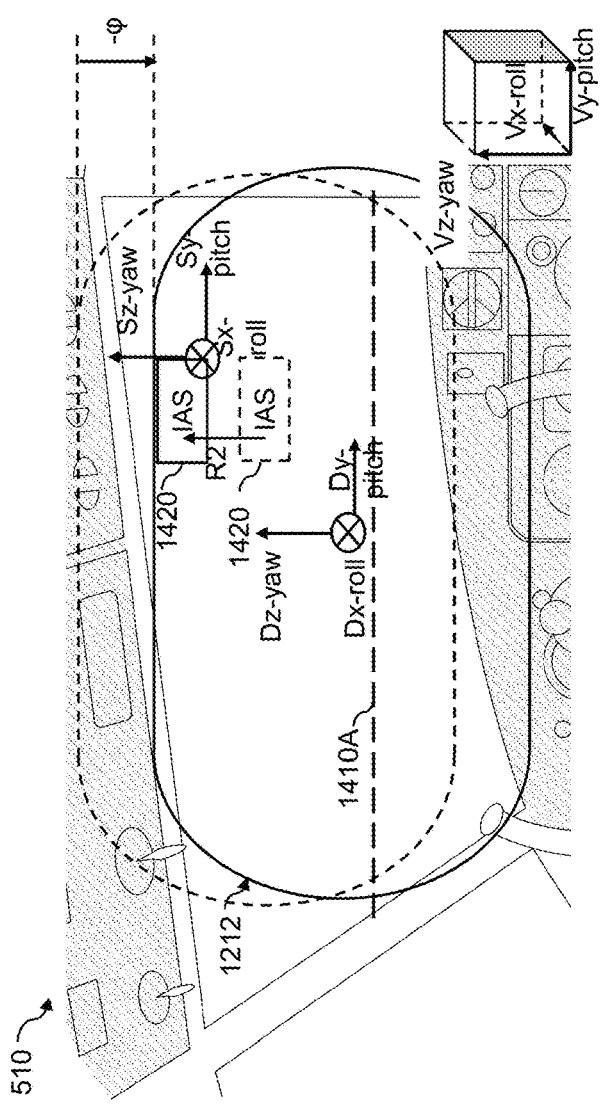

Further reference is made to FIGS. 8A and 8B. In some embodiments, GTAD system 1000 may be configured so that at least a change in pitch orientation of display device 1200 does not cause a change in the display of pitch orientation of non-conformal symbol 1420. FIGS. 8A and 8B exemplify such scenario in which at least $S_{y-pitch}$ (Sα) is spatially fixed with respect to $V_{y-pitch}$. Optionally, at least one further symbol rotation axis (S$_\beta$) (e.g., symbol rotation axis $S_{x-roll}$) may be spatially fixed either with $D_{x-roll}$ or with $V_{x-roll}$, and principal axis $S_{z-yaw}$ may be spatially fixed either with $D_{z-yaw}$ or with $V_{z-yaw}$. A relative displacement of non-conformal symbol 1420 with respect to symbology display area 1212 due to the spatial fixing of $S_{y-pitch}$ (Sα) with respect to $V_{y-pitch}$ is schematically illustrated by arrow R2. A position in which non-conformal symbol 1420 would be if $S_{y-pitch}$ (Sα) was not fixed with respect to $V_{y-pitch}$ is schematically illustrated in FIG. 8A by the broken lines of rectangle 1420. A negative pitch rotation is herein expressed by angle −φ. Optionally, principal axis $S_{x-roll}$ may be spatially fixed to either $D_{x-roll}$ or $V_{x-roll}$, and principal axis $S_{z-yaw}$ may be spatially fixed to either $D_{z-yaw}$ or $V_{z-yaw}$.

Further referring to FIGS. 9A and 9B, GTAD system may be configured so that at least roll orientation $S_{x-roll}$ (Sα) of symbol coordinate system $S_{xyz}$ is spatially fixed with the principal x-roll axis Vx of vehicle 500. As a result, at least the roll orientation of symbol 1400 may remain fixed with respect to $V_{xyz}$, despite a change in a roll angle of display device 1200 relative to vehicle coordinate system $V_{xyz}$ by θ. A relative displacement of non-conformal symbol 1420 with respect to symbology display area 1212 due to the spatial fixing of $S_{x\text{-}roll}$ (Sα) with respect to $V_{x\text{-}roll}$ is schematically illustrated by broken rotation arrow M1.

Optionally, the principal pitch axis (also: $S_{y\text{-}pitch}$) of non-conformal symbol 1420 can be orientationally fixed either with the $V_{y\text{-}pitch}$ axis of vehicle principal axes $V_{xyz}$ or with $D_{y\text{-}pitch}$ axis of $D_{xyz}$, and the principal yaw axis (also: $S_{z\text{-}yaw}$) of non-conformal symbol 1420 can be orientationally fixed either with the $V_{z\text{-}yaw}$ axis of vehicle principal axes $V_{xyz}$ or with $D_{z\text{-}yaw}$ axis of $D_{xyz}$.

Figures 10A, 10B:
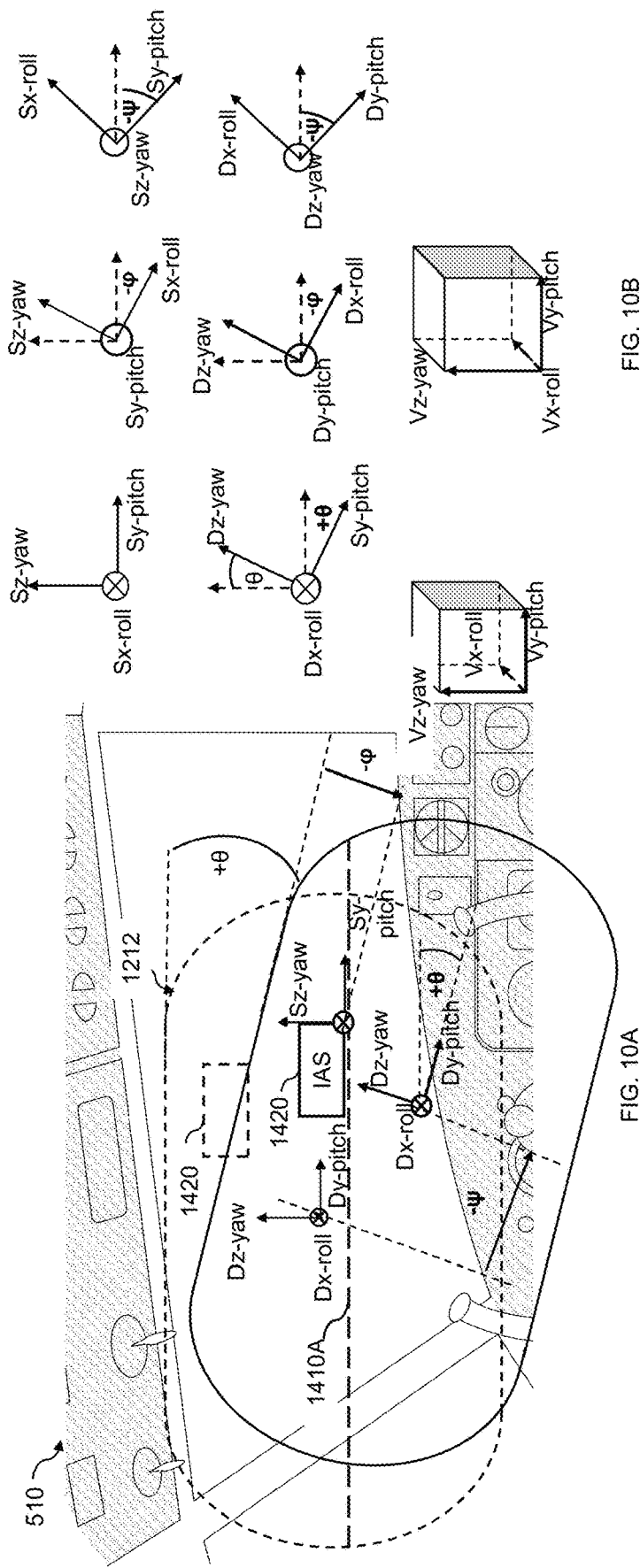
FIGS. 10A and 10B schematically illustrate a position of the symbol after traversing the display device both in a positive roll and negative pitch direction relative to the situation shown in FIGS. 8A and 8B, according to some embodiments.

Further reference is made to FIGS. 10A and 10B, which schematically exemplify a tilted orientation for display device 1200 for a scenario in which principal axis $S_{x\text{-}roll}$ is spatially fixed relative to $V_{x\text{-}roll}$, while both $S_{y\text{-}pitch}$ and $S_{z\text{-}yaw}$ are spatially fixed to $D_{y\text{-}pitch}$ and $D_{z\text{-}yaw}$, respectively.

Referring to Table 1, the first row lists the vehicle's principal axes $V_{x\text{-}roll}$, $V_{y\text{-}pitch}$ and $V_{z\text{-}yaw}$, and rows 1 to 14 list various options for orientationally fixing principal axes of rotation $S_{xyz}$ of non-conformal symbol 1420 to axes $V_{x\text{-}roll}$, $V_{y\text{-}pitch}$ and $V_{z\text{-}yaw}$. In addition, the options for translationally fixing of non-conformal symbol 1420 with respect to FPV are listed as well. It is noted that only pitch and yaw of non-conformal symbol 1420 may be translationally fixed with the FPV, but not the symbol's rotational orientation. A change in pitch of non-conformal symbol 1420 can be considered to be equivalent up/down movement, and a change in yaw of non-conformal symbol 1420 can be considered to be equivalent to a left/right movement on display device 1200.

TABLE 1

| | $V_{x\text{-}roll}$ | $V_{y\text{-}pitch}$ | $V_{z\text{-}yaw}$ | FPV | Exemplified in FIGS.: |
|---|---|---|---|---|---|
| 1. | $S_{x\text{-}roll}$ | N/A | N/A | N/A | FIGS. 9A-9B, and FIGS. 10A-10B |
| 2. | $S_{x\text{-}roll}$ | $S_{y\text{-}pitch}$ | N/A | N/A | Not shown |
| 3. | $S_{x\text{-}roll}$ | $S_{y\text{-}pitch}$ | $S_{z\text{-}yaw}$ | N/A | Not shown |
| 4. | N/A | N/A | $S_{z\text{-}yaw}$ | N/A | FIGS. 7A-7B |
| 5. | N/A | $S_{y\text{-}pitch}$ | $S_{z\text{-}yaw}$ | N/A | Not shown |
| 6. | $S_{x\text{-}roll}$ | N/A | $S_{z\text{-}yaw}$ | N/A | Not shown |
| 6. | N/A | $S_{y\text{-}pitch}$ | N/A | N/A | FIGS. 8A-8B |
| 7. | $S_{x\text{-}roll}$ | N/A | N/A | $S_{y\text{-}pitch}$ \| up/down | Not shown |
| 8. | $S_{x\text{-}roll}$ | N/A | $S_{z\text{-}yaw}$ | $S_{y\text{-}pitch}$ \| up/down | Not shown |
| 9. | N/A | N/A | $S_{z\text{-}yaw}$ | $S_{y\text{-}pitch}$ \| up/down | Not shown |
| 10. | $S_{x\text{-}roll}$ | N/A | N/A | $S_{z\text{-}yaw}$ \| left/right | Not shown |
| 11. | $S_{x\text{-}roll}$ | $S_{y\text{-}pitch}$ | N/A | $S_{z\text{-}yaw}$ \| left/right | Not shown |
| 12. | N/A | $S_{y\text{-}pitch}$ | N/A | $S_{z\text{-}yaw}$ \| left/right | Not shown |
| 13. | N/A | N/A | N/A | $S_{y\text{-}pitch}$ & $S_{z\text{-}yaw}$ | Not shown |
| 14. | $S_{x\text{-}roll}$ | N/A | N/A | $S_{y\text{-}pitch}$ & $S_{z\text{-}yaw}$ | Not shown |

Figure 11:
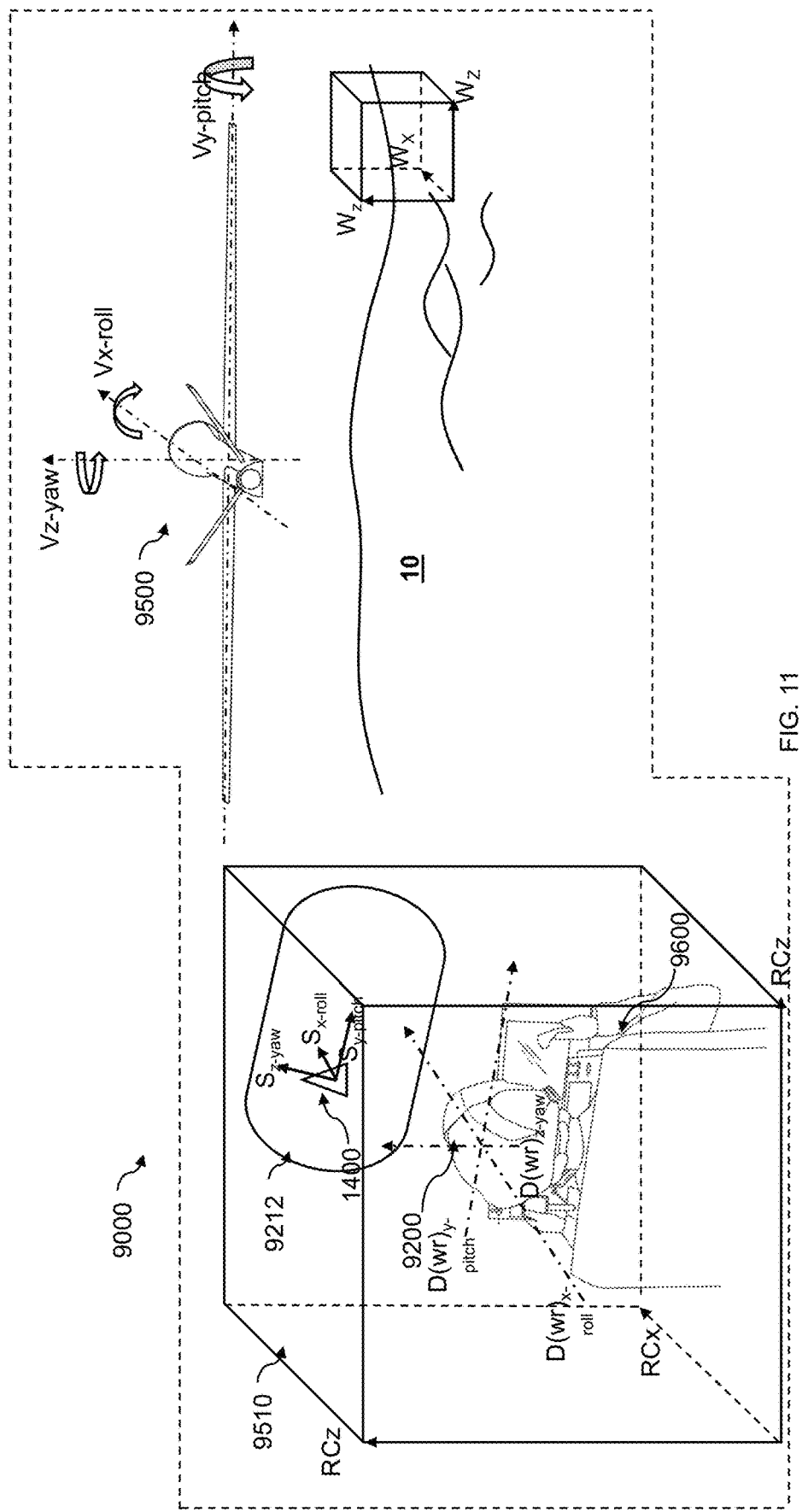
FIG. 11 is a schematic illustration of a remote control GTAD system, according to a first embodiment.
Figure 12:
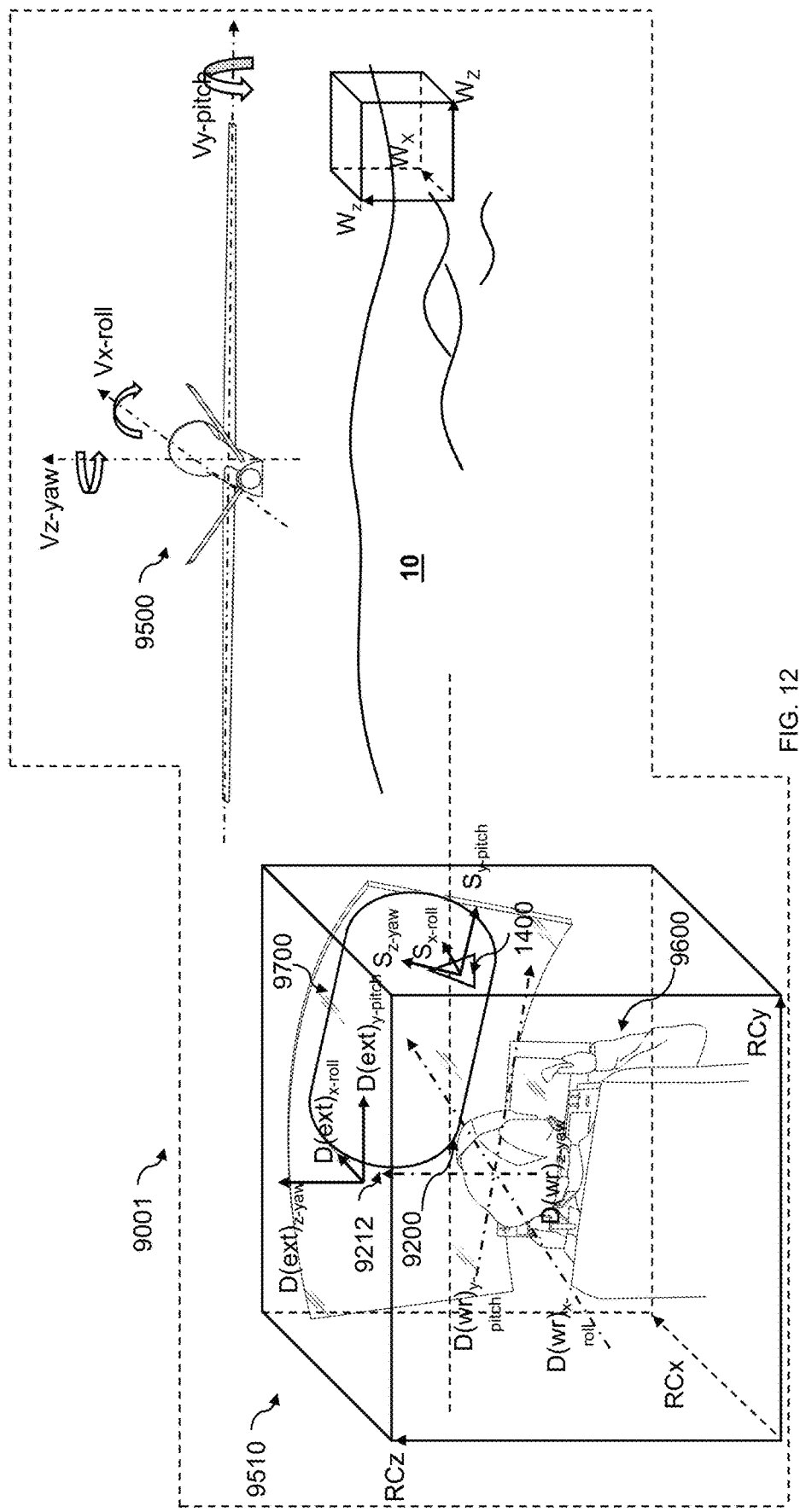
FIG. 12 is a schematic illustration of a remote control GTAD system, according to a second embodiment.

Additional reference is made to FIGS. 11 and 12. Corresponding features are generally indicated by reference numerals with the digit "9". Aspects of embodiments concern also systems and methods which are employable for the remote controlling or piloting of remote controllable vehicles 9500. In an embodiment, a remote control GTAD system 9000 may comprise one or more display devices which are located remotely from remote controllably vehicle 9500 in a location 9510. In the discussion that follows, location 9510 may also be referred to as "remote control station 9510".

Remote control GTAD system 9000 is operable to convey to a user 9600 located at remote control station 9510, via the one or more display devices, a digital image of an emulated view of the exterior of remote controllable vehicle 9500 from a perspective of remote controllable vehicle 9500.

Coordinate system $RC_{xyz}$ is a Cartesian representation of the principal axes of remote control station 9510. Coordinate system $V_{xzy}$ defines an orientation of remote controllable vehicle 9500 with respect to World coordinate system $W_{xyz}$. Coordinate system D(wearable)$_{xyz}$ (also: D(wr)$_{xyz}$) defines an orientation of external wearable display device 9200 (comprising a symbology display are 9212) with respect to remote control station 9510. Optionally, external wearable display device 9200 may move freely in remote control station 9510. Symbol coordinate system $S_{xyz}$ defines an orientation of a symbol that is displayed to user 9600.

In the embodiment shown in FIG. 12 schematically illustrating a remote control GTAD system 9001, the one or more display devices may include, in addition to external wearable display device 9200, a non-wearable, external display device 9700. Coordinate system D(ext)$_{xyz}$ defines an orientation of external wearable display device 9200 relative to a remote control station 9511.

In an embodiment, a remote control station (e.g, first remote control station 9510 or second remote control station 9511) is spatially fixed relative to world reference frame $W_{xyz}$. In an embodiment, orientation and/or position of a remote control station can change relative to world reference frame $W_{xyz}$. Optionally, a remote control station is comprised in another vehicle such as a ship, an aircraft, a truck, and/or the like. Optionally, a remote control station can be mounted on a moving platform (not shown) which may comprise mounts (not shown), and which may be operable to controllably change the position and/or orientation of the remote control station such that an orientation of the remote control station is fixed with respect to an attitude of remote controllable vehicle 9500. More specifically, the orientation of a remote control station and remote controllable vehicle 9500 relative to world reference frame $W_{xyz}$ may be synchronized with each other and (substantially) identical.

In some embodiments, external wearable display device 9200 may be spatially (e.g., orientationally) fixed with respect to the attitude of remote controllable vehicle 9500, while remote control station 9510 is spatially (e.g., orientationally) fixed with respect to world reference frame $W_{xyz}$. In some embodiments, both external wearable display device 9200 and the remote control station are either spatially (e.g., orientationally) fixed with respect to world reference frame $W_{xyz}$ or to remote controllable vehicle 9500.

Accordingly, a method for providing information to user 9600 for remote monitoring and/or remote controlling a vehicle 9500 that is located in a reference world space 10 via one or more display devices that are located remotely from the vehicle in a remote control station, may comprise providing a vehicle coordinate system ($V_{xyz}$) that defines an attitude of the vehicle relative to a world coordinate system ($W_{xyz}$) of the reference world space 10; conveying by the one or more display devices a digital image of an emulated view of the exterior of the vehicle from a perspective of the vehicle. The one or more display devices may comprise, at least, a head-mounted display device that is wearable by the pilot 600. The method may further comprise providing a symbol coordinate system ($S_{xyz}$) that is spatially associated with a symbol to be displayed on the head-mounted display device. The symbol coordinate system ($S_{xyz}$) defines three symbol rotation axes that are orthogonal to each other. The method may also comprise spatially fixing at least one of the symbol rotation axes ($S_α$) to a principal axis of rotation of remote controllable vehicle 9500. Optionally, the method may include selectively spatially fixing at least one further symbol rotation axis ($S_\beta$) to one of the following: at least one other principal axis of rotation of remote controllable vehicle 9500; and at least one principal axis of the head mounted display device coordinate system. Optionally, a translational position of symbol 1400 that is displayed on display device 1200 may be adjusted according to the vehicle state vector.

Figure 13:
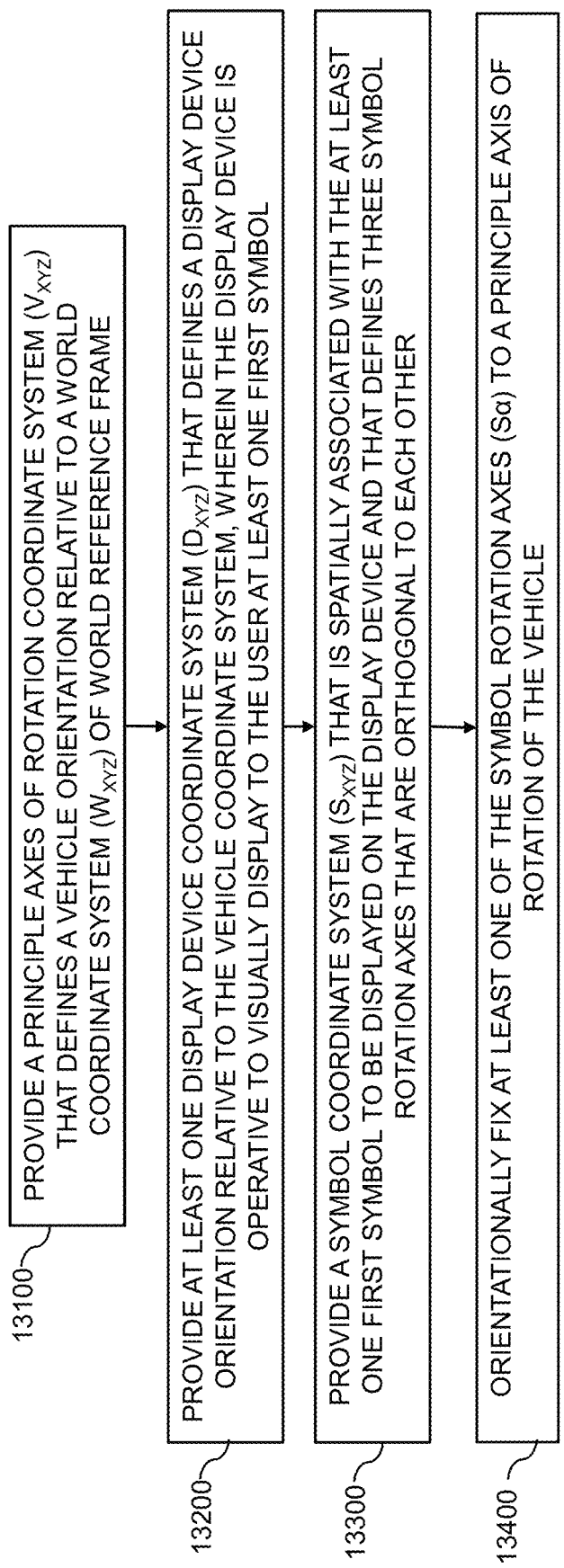
FIG. 13 is a flow chart illustration of a method for displaying symbol by a head-mounted display (HMD) device, according to some embodiments.

Further referring to FIG. 13, a method for providing information to user 600 of vehicle 500 (or remote controllable vehicle 9500) via a display device 1200 (or wearable external display device 9200) that is worn by user 600 may comprise, in an embodiment, providing a principal axes of rotation coordinate system ($V_{XYZ}$) that defines a vehicle orientation relative to a world coordinate system ($W_{xyz}$) of the reference world space 10 (step 13100).

The method may in an embodiment further comprise providing at least one display device coordinate system ($D_{xyz}$) that defines a display device orientation relative to the vehicle coordinate system, wherein display device 1200 is operable to visually display to user 600 at least one first symbol (step 13200).

In an embodiment, the method may comprise providing a symbol coordinate system ($S_{xyz}$) that is spatially associated with the at least one first symbol to be displayed on display device 1200 and that defines three symbol rotation axes that are orthogonal to each other (step 13300).

In an embodiment, the method may comprise spatially fixing at least one of the symbol rotation axes ($S_\alpha$) to one of a principal axis of rotation of $V_{xyz}$, (step 13400). At least one further symbol rotation axis ($S_\beta$) may be correspondingly selectively spatially fixable to one of at least one other principal axis of rotation of $V_{xyz}$; and at least one principal axis of the display device coordinate system $D_{xyz}$.

It is noted that GTAD system 1000 is configured such that orientationally fixing a symbol rotation axes to either a principal rotation axes of the vehicle or a rotation axis of the display device as described herein, can be accomplished without requiring installation and/or arrangement of dedicated markers and/or sensors in the control station and/or on or in the display device in order to provide a reference.

As specified above, the pilot's view of the outside world that can be seen through display device 1200 can include, for example, a view of the aircraft's cockpit 510 and/or a view of the exterior of the aircraft 500 (cf. for instance to FIG. 5A). The view of the outside world may depend on the current orientation and position of display device 1200 relative to cockpit 510.

Moreover, as already indicated herein, the TFOV refers to the view for a complete range of rotation and translation in cockpit 510 by the user's 600 head wearing display device 1200. In an embodiment, the user's 600 TFOV may be divided (e.g., classified by a classifier) into at least two cockpit viewing regions, e.g., as disclosed herein. Additionally referring to FIGS. 14A and 14B, a "region" of a TFOV may be defined in accordance with pilot's 600 gaze direction as determined by gaze tracker engine 1310 (FIG. 4). A control station such as cockpit may be spatially divided into various viewing regions of the pilot's TFOV.

Exemplarily, the boundaries of various cockpit viewing regions may be defined in a (e.g., registration) procedure in which gaze directions are operatively associated with symbology rendering engine 1320, so that information conveyed via display component 1210 may depend on the cockpit viewing region the pilot 600 is gazing at. It is noted that a hysteresis interval may also be applied for determining if gaze is directed towards one or another cockpit viewing region.

It is noted that the expression "conveying information", as well as grammatical variations thereof, may not only refer to altering a displayed symbol as a result of the pilot's gaze direction, but also to making a computer-based decision regarding display or non-display of a symbol, e.g., as outlined herein below in more detail.

In an embodiment, a gaze direction of pilot 600 may be determined based on the orientation of display device 1200. Additionally or alternatively, a pilot's 600 gaze direction may be determined using an eye tracker (not shown), which may for example be comprised in display device 1200.

Figure 14B:
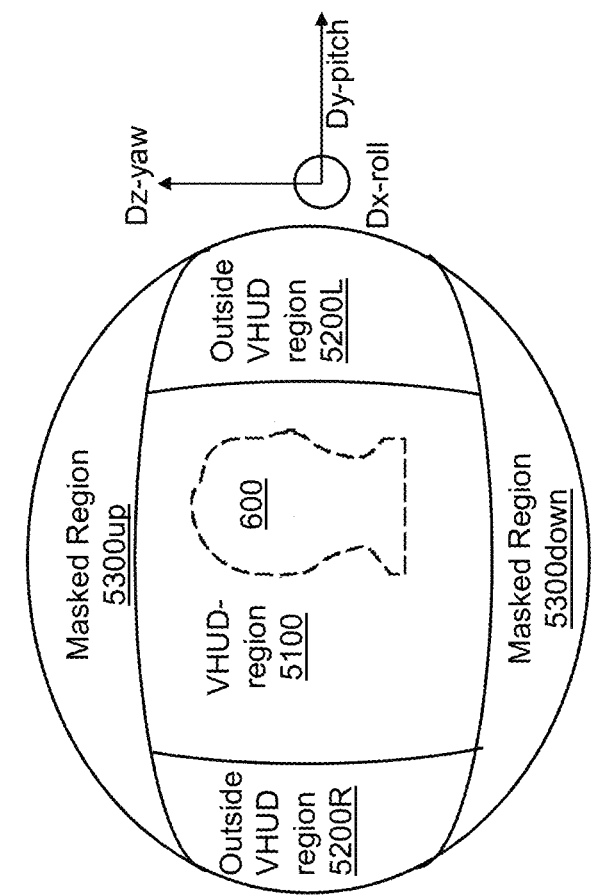
FIG. 14B is a schematic rear-view illustration of the regions of the TFOV, according to some embodiments.
Figure 14A:
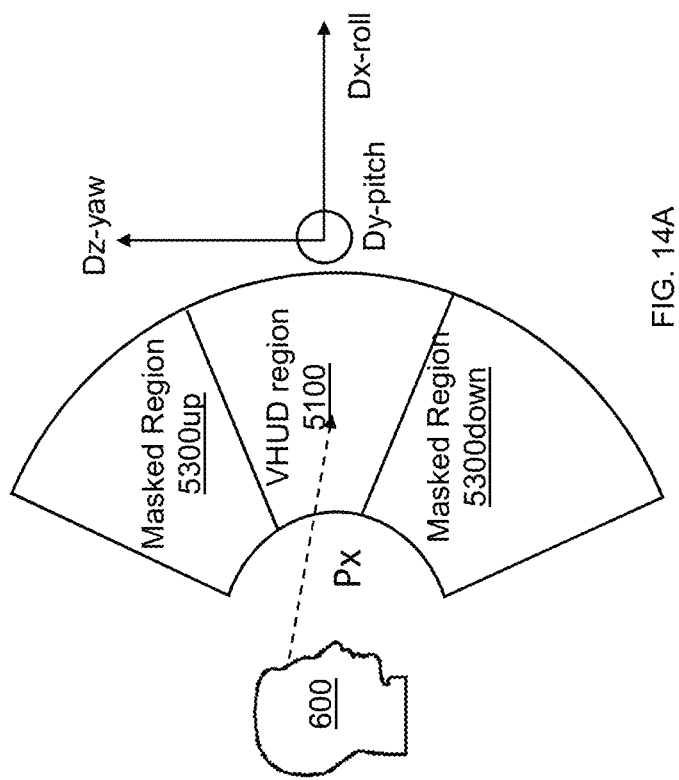
FIG. 14A is a schematic side-view illustration of the regions of a total field of view (TFOV), according to some embodiments.

As schematically illustrated in FIGS. 14A and 14B, at least two cockpit viewing regions of a TFOV may optionally comprise one or more "VHUD regions" 5100, one or more "outside VHUD regions" 5200, and one or more "masked regions" 5300. In some embodiments, VHUD region may be further subdivided into a conformal and non-conformal VHUD region (not shown). Conformal VHUD region may be defined such to allow the display of conformal, non-conformal and partially conformal symbology. In the non-conformal VHUD region, only non-conformal symbology may be displayed. Exemplarily, the non-conformal VHUD region may refer to viewing angles which cover areas of cockpit 510 which neither comprise instrumentation nor provide a view of the exterior of the vehicle. Such non-conformal VHUD region may herein exemplified by frame element 550.

In an embodiment, GTAD system 1000 may be configured so that if gaze is directed towards VHUD region 5100, symbols 1400 are displayed like on a "real" head-up display. Optionally, GTAD system 1000 may be configured so that if gaze is directed towards outside VHUD regions 5200, then at least one orientation and/or translational position of symbols 1400 is spatially fixed with respect to at least one of the axes $D_{xyz}$ of display component 1210, instead of being spatially fixed with respect to the corresponding at least one of principal axes $V_{xyz}$ of vehicle 500 when gazing towards VHUD region 5100. For example, after a transition of a gaze direction from a VHUD region 5100 to an outside VHUD region 5200, at least one further symbol rotation axis ($S_\beta$) that was before the transition spatially fixed with one of the principal axes $V_{xyz}$, may become spatially fixed with a corresponding or rotation axis of display $D_{xyz}$.

In an embodiment, GTAD system 1000 may be configured so that when gaze is directed towards a masked region 5300, comparatively fewer and/or different, or no symbols 1400 may displayed by display component 1210. In an embodiment, such masked regions 5300 may spatially coincide with instrument panels of a control station 510 (e.g., of an aircraft's cockpit). Optionally, masked region 5300 may virtually "cover" or mask all instruments of control station 510. Optionally, masked region 5300 may mask at least portions of a window of control station 510.

Figure 15:
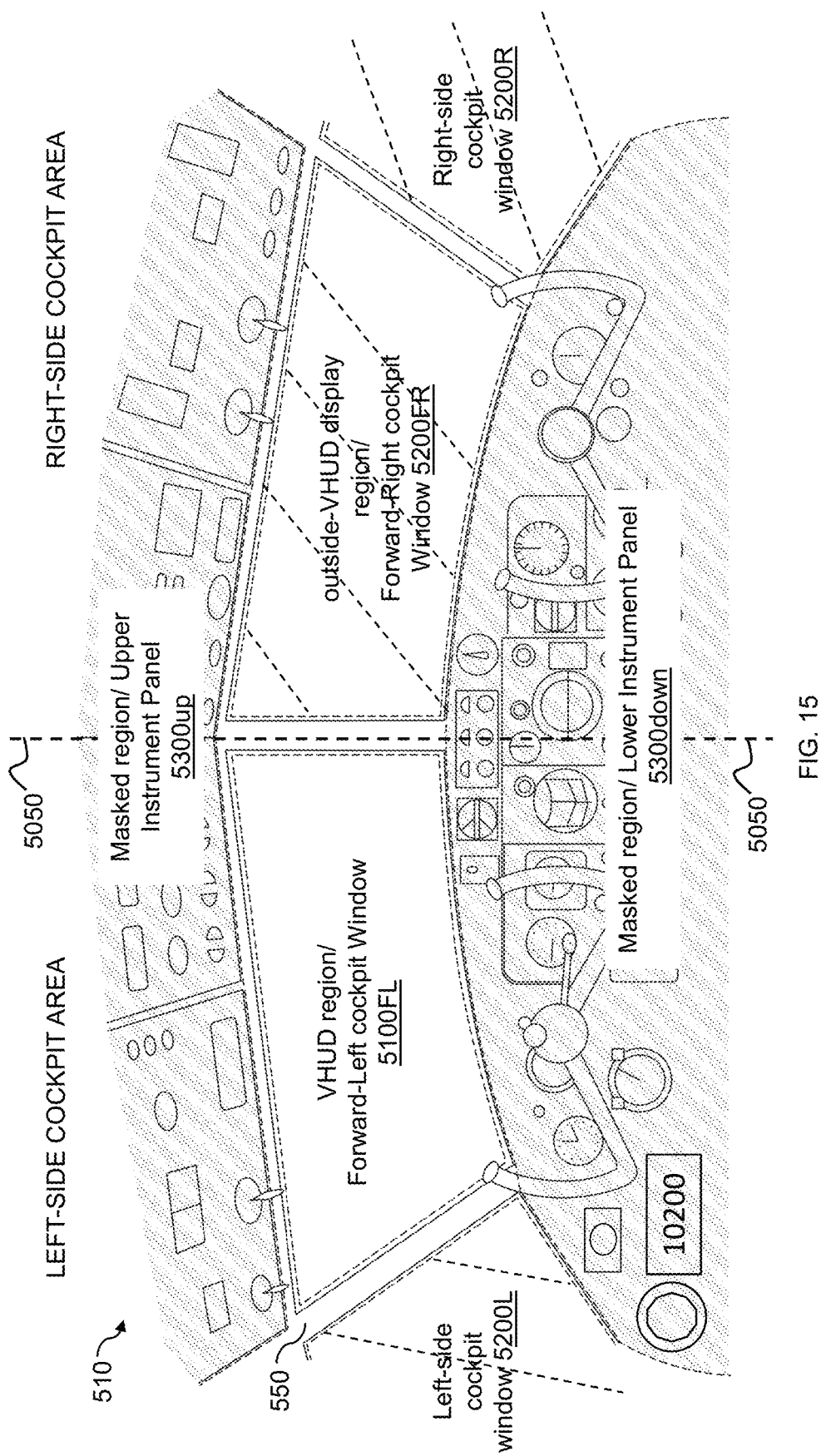
FIG. 15 is a schematic illustration of viewing regions of an aircraft cockpit, according to some embodiments.

Additional reference is made to FIG. 15. In the following description, the terms "right" and "left" are used to describe a position in cockpit 510 with respect to an imaginary symmetry plane 5050 that lies in the plane spanned by $V_{x\text{-}roll}$ and $V_{x\text{-}yaw}$, when gazing in direction of $V_{x\text{-}roll}$. In the scenario exemplified by FIG. 15 in which display device 1200 is considered to be positioned left of imaginary symmetry plane 5050 (when e.g., a pilot sitting in the left seat (not shown) of cockpit 510), then any gaze direction of pilot 600 that may substantially coincide with a forward-left cockpit window 5100FL may be defined, for the same display device 1200, as VHUD region 5100FL. Moreover, any one of pilot's 600 gaze direction that may substantially intersect either with a forward-right cockpit window 5200FR, a right-side cockpit window 5200R, or with a left-side cockpit window 5200L, may correspondingly define outside VHUD regions 5200FR, 5200R and 5200L, respectively. Furthermore, any gaze direction that may intersect with critical instrument panels such as, for example, upper instrument panel 5300up and lower instrument panel 5300down may be correspondingly define masked regions 5300up and 5300down.

Additional reference is now made to FIG. 16A. A current gaze direction is herein illustrated by vector $P_x$. It is noted that gaze direction vector $P_x$ does not necessarily have to be normal to the inner or outer surface of display component 1210. The "inner" surface of display component 1210 is proximal, and the "outer" surface is distal to pilot 600 wearing display device 1200. Optionally, gaze direction vector $P_x$ may be orientationally and translationally fixed with respect to display device 1200 so that $P_x$ can be considered to be spatially fixed with respect to $D_x$. Optionally, gaze direction vector $P_x$ may be orientationally and translationally fixed with respect to the pilot's eye-gaze direction in which case the gaze direction vector Px may not be normal to the surfaces of display component 1210.

In the example shown in FIG. 16A, gaze tracker engine 1310 may determine that the current gaze direction vector $P_x$ is towards VHUD region 5100FL. Symbology rendering engine 1320 may, accordingly, cause symbol 1400, to be displayed by display component 1210.

Referring now to FIG. 16B, gaze tracker engine 1310 may determine that another gaze direction vector $P_x$ of pilot 600 is towards lower masked region 5300down. Accordingly, symbology rendering engine 1320 may discontinue displaying symbol 1400 that was displayed while gazing towards VHUD region 5100FL. Such discontinuation of symbol display is in FIG. 16B schematically illustrated by a transition of continuous lines to broken lines for symbol 1400. Optionally, when gazing towards a masked region, the display of one or more symbols may be discontinued while continuing the display of one or more other symbols. For example, vertical altitude and speed scales (also: columns) 1420B1 and 1420B2 (cf. FIG. 2A) may still be displayed, e.g., in a roll-compensated manner which is exemplified in FIG. 3A) when gazing towards a masked region (e.g., masked region $5300_{down}$).

In some embodiments, the type of symbol displayed to the pilot may change from one category to another when changing gaze from a VHUD region to a masked region, and vice versa. For instance, when gazing towards a masked region, alternative symbols may be displayed instead of the discontinued symbol(s). The alternative symbols shown when gazing towards a masked region may for example provide an augmented view of the real-world control objects of the masked region (e.g., masked region 5300down). The alternative symbols may for example complement information provided by and/or enhance visibility of the real-world control objects of a masked region. The alternative symbols may, for instance, provide the pilot with a visual feedback (e.g., a digital symbol superimposed on the real-life control object) to indicate towards which control object he is gazing at. In another example, a value that is associated with a control object may be displayed to the pilot as long as the pilot is gazing at it. For instance, a symbol descriptive of a radio volume may be displayed by display device 1200 as long as the pilot is gazing at the respective real-life volume control of the control panel.

Further reference is made to FIGS. 17A and 17B. After traversing gaze direction $P_x$ from a VHUD region 5100 to an outside VHUD display region 5200 and as long as gaze direction vector $P_x$ intersects with outside-VHUD display region 5200, one or more orientations of $S_{xyz}$ of symbol 1400 may become spatially fixed with respect to $D_{xyz}$ of display component 1210 instead of being spatially fixed to a principal axis of rotation of $V_{xyz}$ when the wearer is gazing towards VHUD region 5100.

In some embodiments, the type of symbol displayed to the pilot may change from one category to another when changing gaze from a VHUD region to an outside-VHUD region, and vice versa. For example, as shown in FIGS. 17C and 17D, information (e.g., aircraft pitch) that is conveyed by a conformal symbol 1410 pilot 600 when gazing towards VHUD region 5100FL (FIG. 17C), may be conveyed to the pilot by a non-conformal symbol 1420 when the pilot is gazing towards outside VHUD display region 5200FR (FIG. 17D). In some embodiments, when gazing towards outside VHUD region 5200FR, an arrow Q may be displayed to indicate the pilot a direction towards he/she should traverse his/her gaze direction for viewing VHUD region 5100FL again.

In an embodiment, after gaze direction vector $P_x$ has traversed back from outside VHUD region 5200FR towards VHUD region 5100FR, then at least one orientation may again become spatially fixed with respect to a principal axis Vxyz, instead of being spatially fixed with respect to $D_{xyz}$ when gazing towards the outside VHUD region 5200FR. Optionally, a translational position of symbol 1400 may again become spatially fixed with respect to the vehicle state vector instead of being spatially fixed with respect to $D_{xyz}$ when gazing towards the outside VHUD region 5200FR. Optionally, information that is conveyed to pilot 600 gazing towards an outside VHUD region 5200 (e.g., 5200FR) in a non-conformal manner may be conveyed in a conformal manner when pilot 600 is gazing again towards VHUD region 5100.

In an embodiment, gaze tracker engine 1310 and/or symbology rendering engine 1320 are operable to determine the position of a symbol 1400 relative to a boundary of a cockpit viewing region. Optionally, the translational position of a symbol may be altered depending on the gaze direction.

Figure 18A:
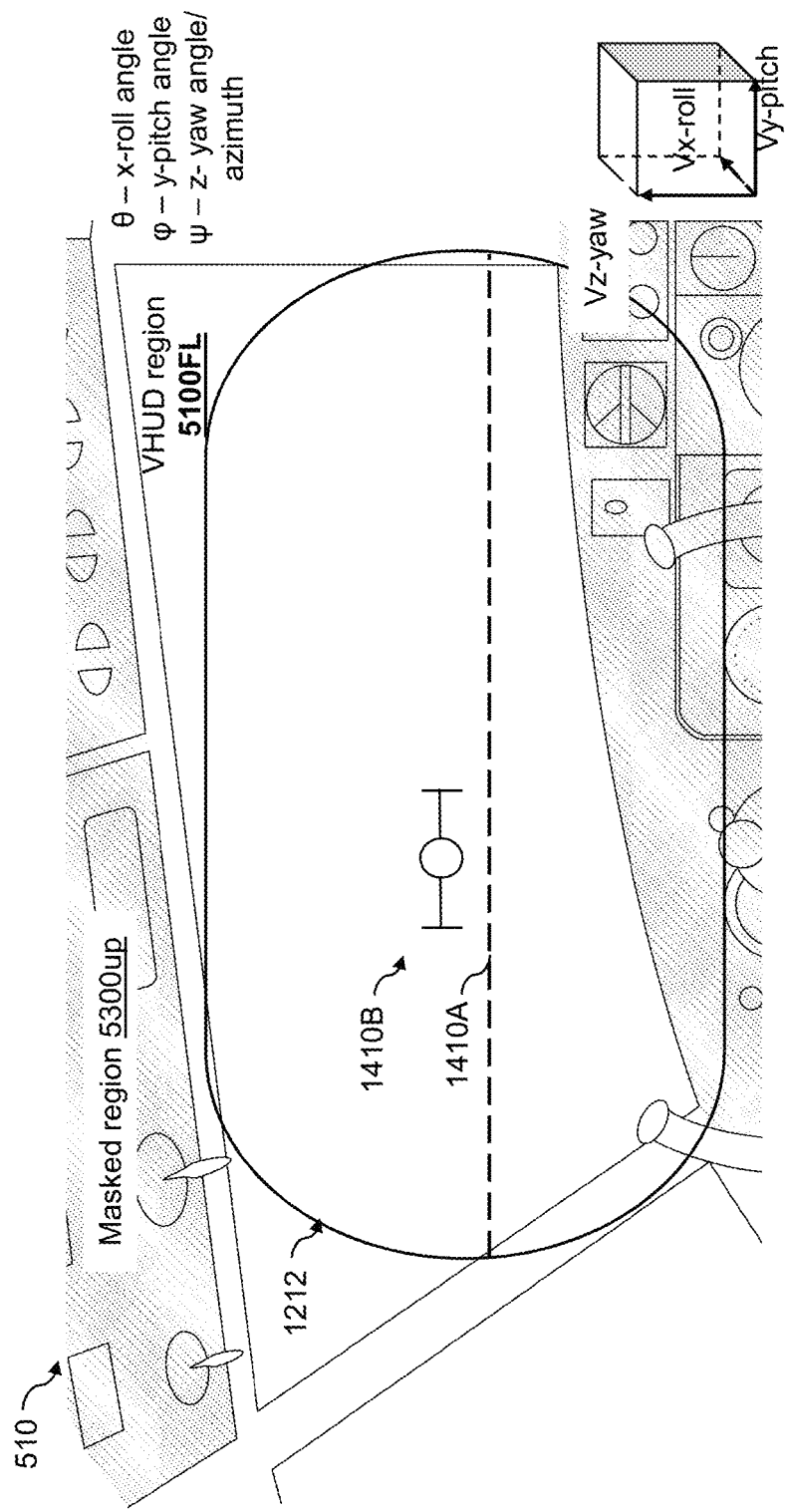
FIGS. 18A and 18B are schematic illustration of a regular and ghosted display mode of a vehicle state vector, according to some embodiments.
Figure 18B:
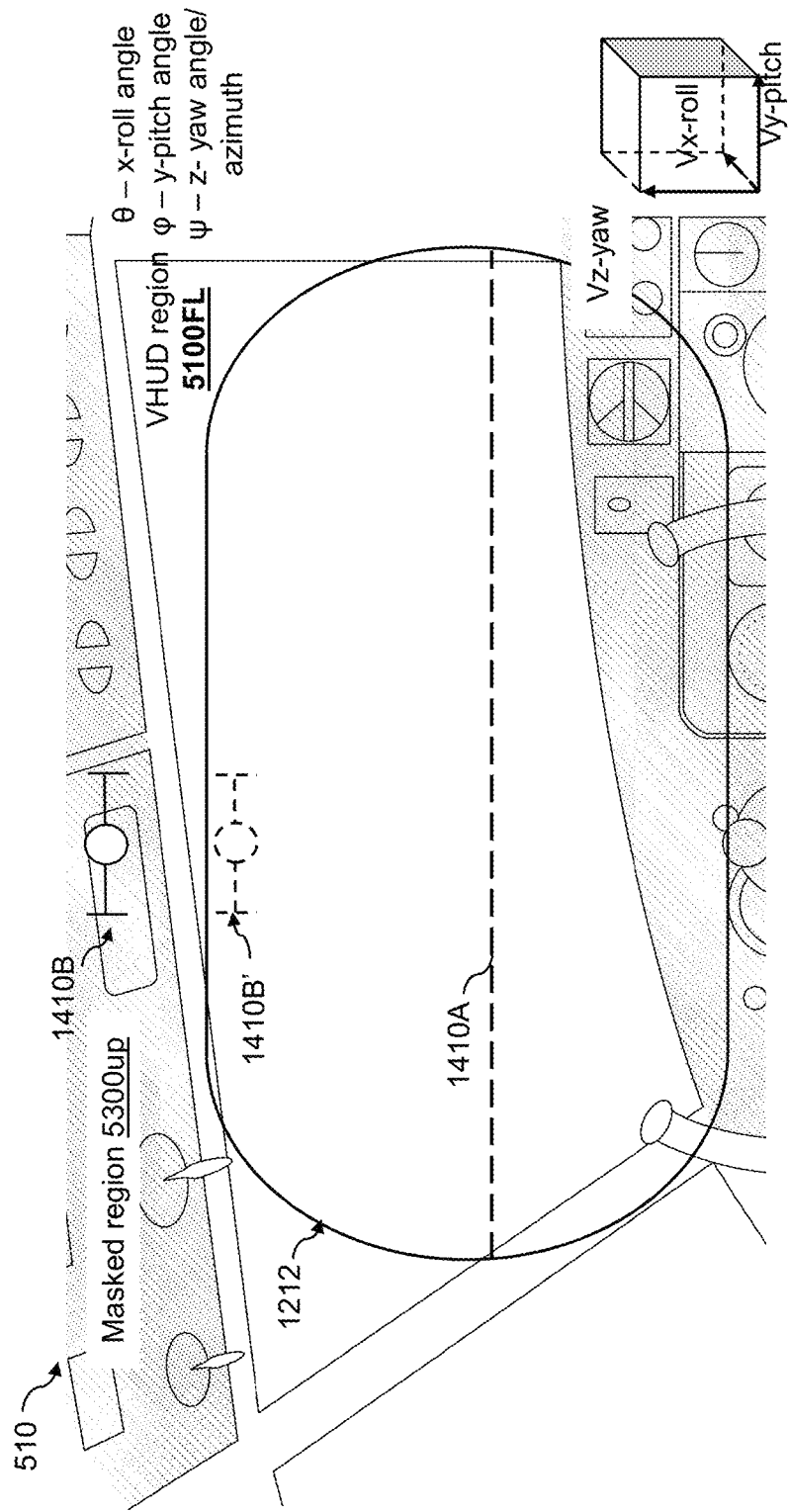

Additional reference is made to FIGS. 18A and 18B. As already specified herein, symbol 1400 can represent a vehicle state vector, such as the FPV. In the discussion that follows, such symbol may referred to as "direction symbol". A translational position of direction symbol 1400 may be adjusted in accordance change of the vehicle state vector.

As long as the symbol representing the vehicle state vector can be displayed to the pilot by display device 1200 in a directionally conformable manner within a given field of view (e.g., VHUD region 5100), direction symbol 1400 may be displayed in a first or regular display mode. Otherwise stated, in the regular display mode, direction symbol 1400 is displayed in manner which conforms to the value of the direction parameter. However, if the symbol representing the vehicle state vector cannot be displayed (also: is not displayable) in a directionally conformable manner within the given field of view (e.g. when a direction parameter of the vehicle state vector would require display of the symbol outside the field of view of display device 1200), then the symbol may be displayed in a ghosted display mode.

Considering for example FPV 1410B as the vehicle state vector symbol, it may be displayed in one of a regular and ghosted mode depending on the amount or magnitude of (angular) drift of aircraft 500 (FIG. 1A) and the orientation of display device 1200. The position of FPV 1410B relative to artificial horizon 1410A can indicate whether the aircraft is ascending or descending. Since the FPV may, in some embodiments, be displayed in one of a regular and ghosted mode, the FPV may be categorized as a partially-conformal symbol.

If FPV 1410B is above artificial horizon 1410A, aircraft 500 is ascending, and if below artificial horizon 1410A, aircraft 500 is descending. The higher FPV 1410B above artificial horizon 1410A, the steeper the aircraft's ascent. The lower FPV 1410B drops below artificial horizon 1410A, the steeper the descent. FIG. 18A schematically illustrates FPV 1410B a scenario in which it is displayed in the regular display mode. That is, the distance between FPV 1410B and artificial horizon 1410A corresponds to the rate of ascent of the aircraft.

In some scenarios, the magnitude of the aircraft's ascent or descent may exceed a certain displaying threshold such that FPV 1410B cannot be displayed in a translationally conformal manner within the boundaries of VHUD region 5100. In that case, FPV 1410 may be displayed in a second, "ghosted" mode, which is schematically illustrated in FIG. 18B by the dashed lines of ghosted FPV 1410B'. The ghosted display is to indicate to pilot 600 that the position of ghosted FPV 1410B' is not where it actually should be. The position where FPV 1410B actually should be displayed if it was translationally conformal, is shown in FIG. 18B to be within masked region 5300up.

In correspondence with the aforesaid, aspects of embodiments may concern a method that comprises selectively displaying the vehicle state vector symbol relating to a directional parameter value in one of the following display modes: in a first, regular display mode, as long as the vehicle state vector symbol can be displayed to the user by the display device in a directionally conformable manner within a given field of view; and in a second, ghosted display mode, if the vehicle state vector symbol cannot be displayed by the display device in a directionally conformable manner within the given field of view.

In the ghosted display mode, the vehicle state vector is displayed differently than in the regular display mode. For example, line thickness, line style, line color and/or the like, may be different in the regular and the ghosted display mode. Without be construed limiting, the regular display mode of FPV 1410B is represented in FIG. 18A by its continuous lines, and the ghosted display mode of FPV 1410B is represented in FIG. 18B by its broken lines.

Figure 18C:
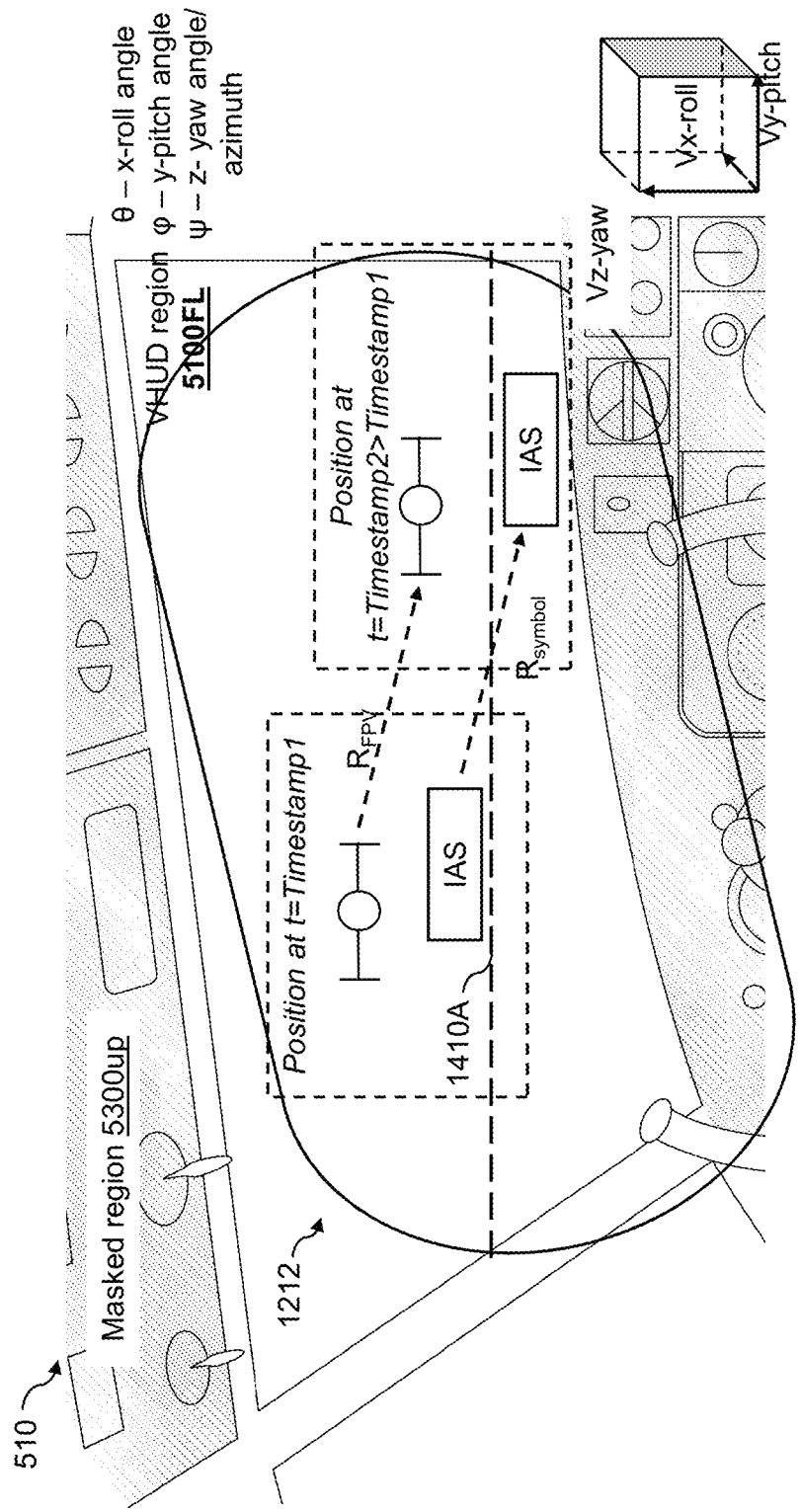
FIG. 18C is a schematic illustration of displaying a non-conformal symbol in accordance with a position of a vehicle state vector displayed on the display area, according to some embodiments.

Additional reference is made to FIG. 18C. As already briefly mentioned herein above, a translational position of symbol 1400 (e.g., translational position of non-conformal symbol 1420) as displayed by display device 1200 may be adjusted (e.g., translationally positioned on symbology display area 1212) in accordance with a position of a vehicle state vector. In FIG. 18C, arrow $R_{symbol}$ schematically illustrates traversing non-conformal symbol 1420 in accordance with the traversing of FPV 1410B in direction of $R_{FPV}$, which may be due to a change in one or more of the values associated with FPV 1410B and/or a change in the position and/or orientation of symbology display area 1212. Optionally, the origin O of symbol coordinate system Sxyz may be translationally fixed with respect to, e.g., the position of FPV 1410B. In the embodiment exemplified by FIG. 18C, the roll orientation of non-conformal symbol 1420 may be spatially fixed with respect to the roll orientation of the vehicle.

Additional reference is made to FIGS. 19 to 24. Generally, the gaze direction of user 600 may be continuously tracked. While the gaze is tracked, it may be determined if a gaze-based object selection criterion is met. If the gaze-based object selection criterion is met, the user is provided with information (e.g., a feedback) indicating that the gaze-based object selection criterion is met.

It is noted that while embodiments discussed herein may relate to gaze-based object selection and gaze-based object selection criterion, this should by no means be construed as limiting.

In some embodiments, an object selection criterion defines the conditions for selecting a certain object by the pilot.

An object selection criterion may be based on input parameter values such as the the pilot's gaze, gesture, utterance, and/or based on any other suitable physical action. For example, a gesture tracking system (not shown) may track gestures (e.g., finger and/or hand gesturing by the user) and operable to recognize an object the pilot wants to select. Additionally or alternatively, object selection may be utterance-based (e.g., through a suitable voice command). An object selection criterion may pertain to a variety of different user inputs concurrently. For example, for an object to be selected, the conditions pertaining to both gaze-based and physical engagement inputs may have to be met simultaneously or according to a certain predetermined sequence.

A gaze-based object selection criterion may for example pertain to one or more thresholds of a difference value between a current gaze direction and a reference gaze direction towards the gaze-selectable object. It is noted that the term "reference direction" as used herein may refer to a single reference direction or to reference directions that are within a certain range. A gaze-based object selection criterion may for example be met if the difference value is below a threshold, and the gaze-based object selection criterion may not be met if the difference value is equal or above the threshold. In another example, the gaze-based object selection criterion may be met if the difference value is equal or below a threshold, and the gaze-based object selection criterion may not be met if the difference value is above the threshold.

In an embodiment, a "gaze-based object selection criterion" may take into account, inter alia, a hysteresis interval between two different thresholds, depending on the direction of change of the HMD wearer's gaze direction. The hysteresis interval may for example be defined by a selection threshold that is lower than a non-selection threshold, e.g., as outlined herein below. Analogously, a hysteresis interval may be applicable to additional or alternative object selection inputs.

In an embodiment, GTAD system 1000 may be operable to determine if the user's current gaze direction meets a gaze-based object selection criterion for allowing initiating an action associated with a gaze-selectable object. In other words, a gaze direction of an HMD's wearer may be considered to be directed at a gaze-selectable object if a "gaze-based object engagement criterion" is met. Correspondingly, if the "gaze-based object selection criterion" is not met, the gaze direction is considered as not be selectably directed at the gaze-selectable object.

GTAD system 1000 (cf. FIG. 4) may for example generate (e.g., graphically render) and display to pilot 600 a symbol that is operatively associated with a real-world control object (e.g., controls or control elements) of control station (e.g., cockpit) 510, if the object selection criterion is met.

A gaze-based object selection criterion may for example be met if an imaginary gaze vector $P_x$ representing the user's gaze direction intersects, e.g., for a certain dwell time, with a selectable virtual object which is operatively associated with a real world physical object. For example, a selectable virtual object may be operatively associated with a real world physical object and/or a vehicle operation function such as, for instance, an aircraft control element. It is noted that a "real world physical object" may include a hardware element and/or a graphical symbol displayed by a hardware element, e.g., in a masked region.

Optionally, a selectable virtual object may be defined as a virtual plane having boundaries and/or contours that correspond to and virtually "overlay" the gaze-selectable object. The operable association between a vehicle operation function and a virtual object may be such so that responsive to a gaze-based selection of the selectable virtual object, user 600 is provided with information relating to the vehicle operation function, e.g., as outlined herein below in more detail.

Methods, processes and/or procedures of gaze-based selection of a real-world control object and the display of a symbol or virtual object that is operatively associated with the vehicle operation function controllable by real-world control object may herein be referred as "actionably acquiring a real-world control object", as well as grammatical variations thereof. Optionally, "actionably object a control element" may first require "selection of the control element". The selection of a real-world control object may provide the pilot with an indication that, for example, the gaze direction intersects with selectable object, yet that at least one validation input has to be provided for actionable acquisition, such that the corresponding virtual object is displayed in VHUD region 5100, or to spatially lock the virtual object with the gaze direction. Such validation input may for example comprise a physical action (e.g., push button actuation) during the dwell time of gaze direction on the selectable object, a gesture (e.g., a hand and/or finger gesture-based input), utterance of a command input, and/or the like. Validation may be confirmed by responsively providing pilot 600 with a sensory feedback (e.g., audible feedback). It is noted that the terms "virtual object", "virtual control element", "virtual control object" and "symbol" may herein be used interchangeably.

Non-limiting examples of real-world selectable objects can include a physical object outside the control station, e.g., as seen through a window and/or conveyed graphically via a display comprised in control station 510; a graphical object (e.g., symbol) displayed to the user, e.g., via an HMD worn by the user; and/or a physical and/or real-world control object comprised in control station 510 such as a control element.

Control elements comprised in cockpit/control station 510 may be employed for controlling various systems of aircraft 500 (FIG. 1A) including, for example, the aircraft's engines, fuel pump system, flight control hydraulics, electrical system, oxygen system, navigation system, air-conditioning system, LAN communication system, wing heating/anti-ice controls, window heating controls, radio communication system, door controls, and/or the in-flight entertainment system. It is noted that, exemplarily, only a selection of the controls may be actionably acquirable by the pilot. Optionally, only non-critical real-life control objects may be actionably acquirable by the pilot. Non-limiting examples of non-critical real-control objects may include, for example, radio frequency knobs; volume knobs; metric selection switches; environmental conditioning controls (e.g., temperature, humidity, lighting, digital panel displays); and/or the like.

Cockpit control elements can include, for example, switches, dials, knobs, push buttons, levers, indicators, wheels and/or handles. Controls may require a multiple-step actuation sequence to prevent accidental actuation of the control. Optionally, an actionable acquisition of the selectable (real-world control) object may automatically initiate an automated action of generating a symbol which is operatively associated with the selected real-world object and/or the corresponding vehicle operation function, e.g., as outlined herein below in more detail.

It may further be determined if an actionable engagement criterion is met for actionably engaging a virtual object (also: a symbol) which may be associated with the selected object and/or displayed to the user. Optionally, the gaze-based object selection criterion and actionable engagement criterion may be identical. A virtual object or symbol may be actionably engageable by a gaze-based input and/or using gesture-based, utterance-based and/or any other suitable physical action. For example, a gesture tracking system (not shown) may track gestures (e.g., finger and/or hand gesturing by the user) and operable to recognize that a symbol is actionably engaged.

In some embodiments, the actionable acquisition of real-world control objects is herein exemplified with respect to a real-world control object herein referenced by alphanumeric designation "1600A".

As shown schematically in FIG. 19, a (real-world) control object 1600A is exemplified as a rotary control knob which is employed for changing an operational scalar value (e.g., a radio communication frequency), which in the present state is set to "10200". Generally, a control such as a "rotary control knob" may be one-handed operable by the user. Optionally, a rotary control knob may be embodied by a consolidated control handle push button assembly.

Figure 20:
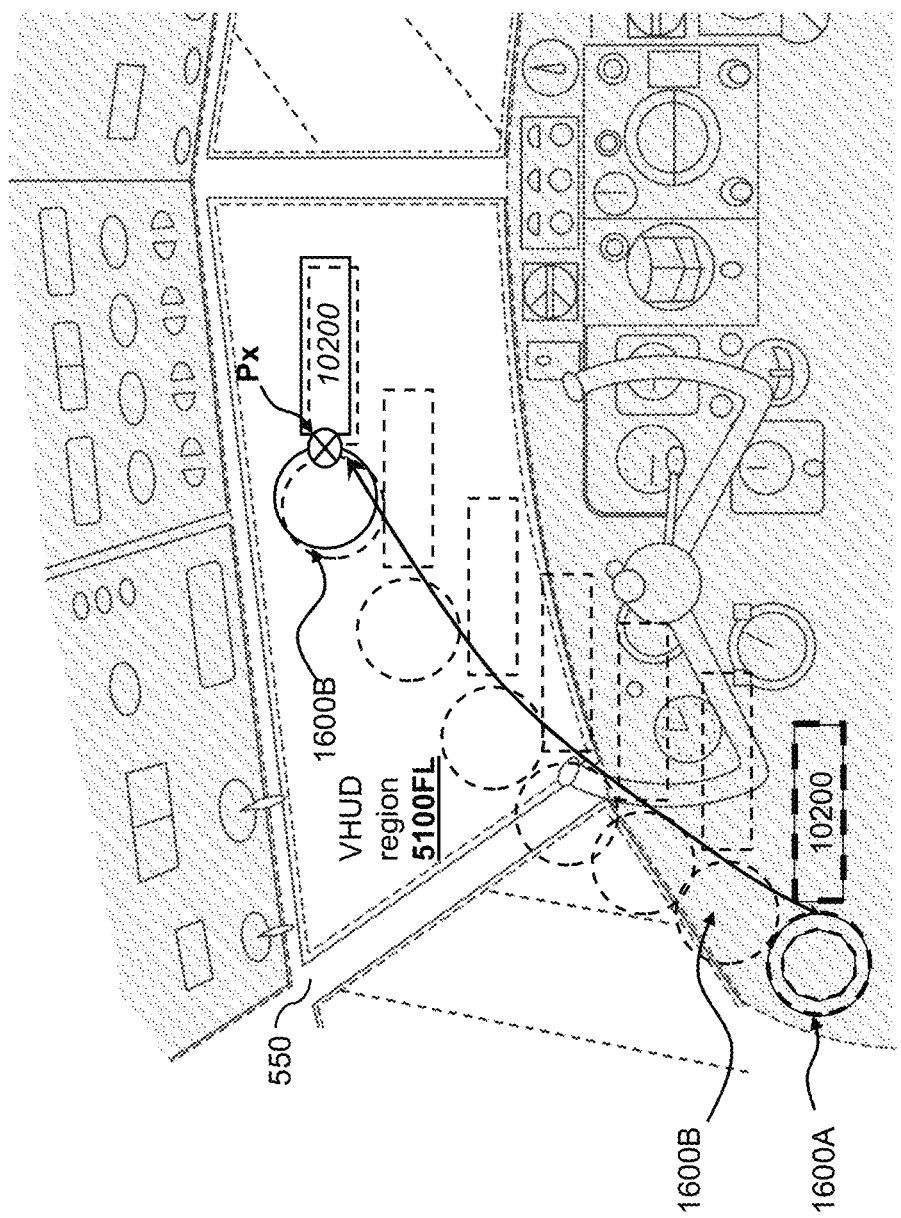
Figure 21:
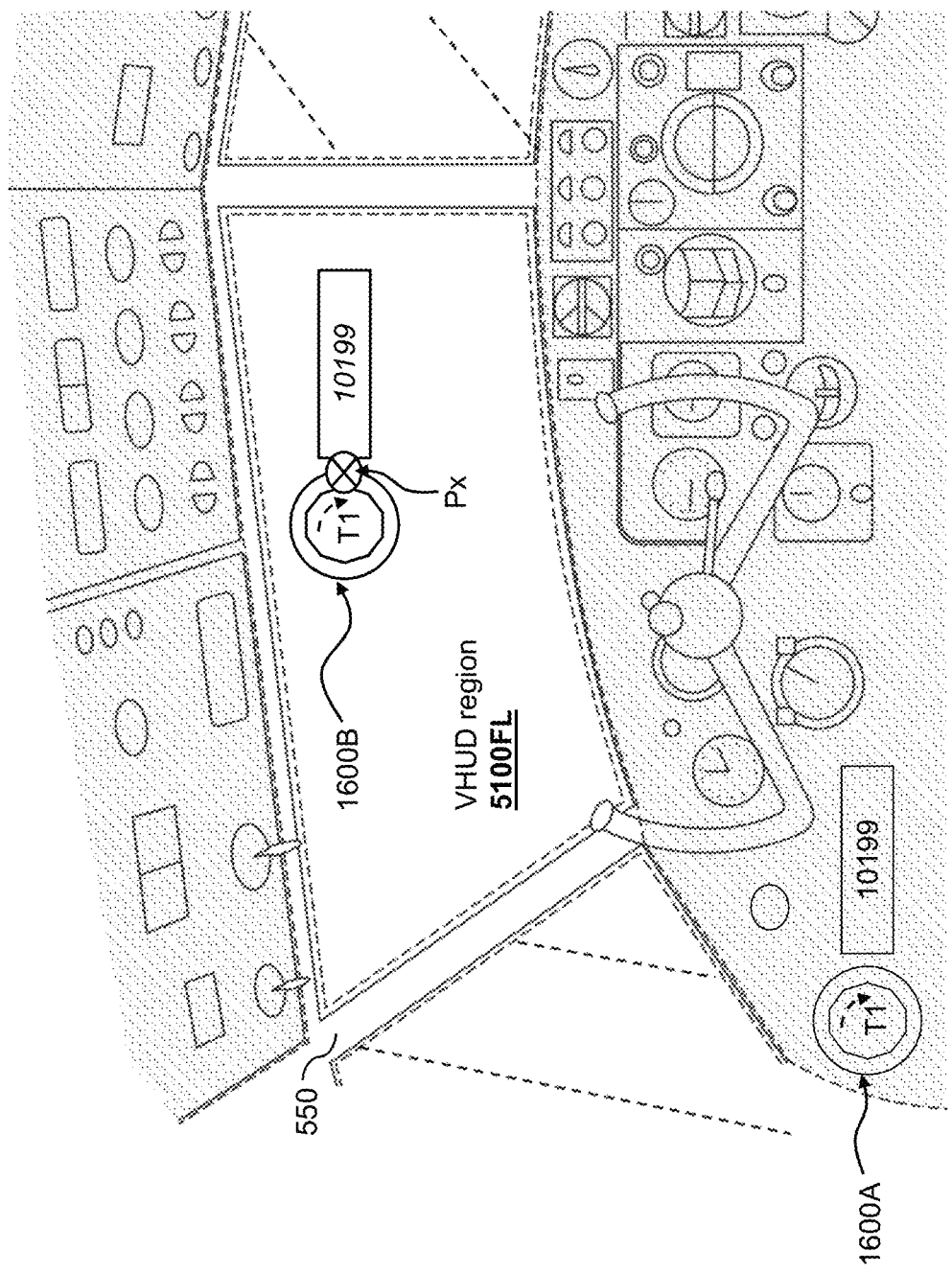
Figure 22:
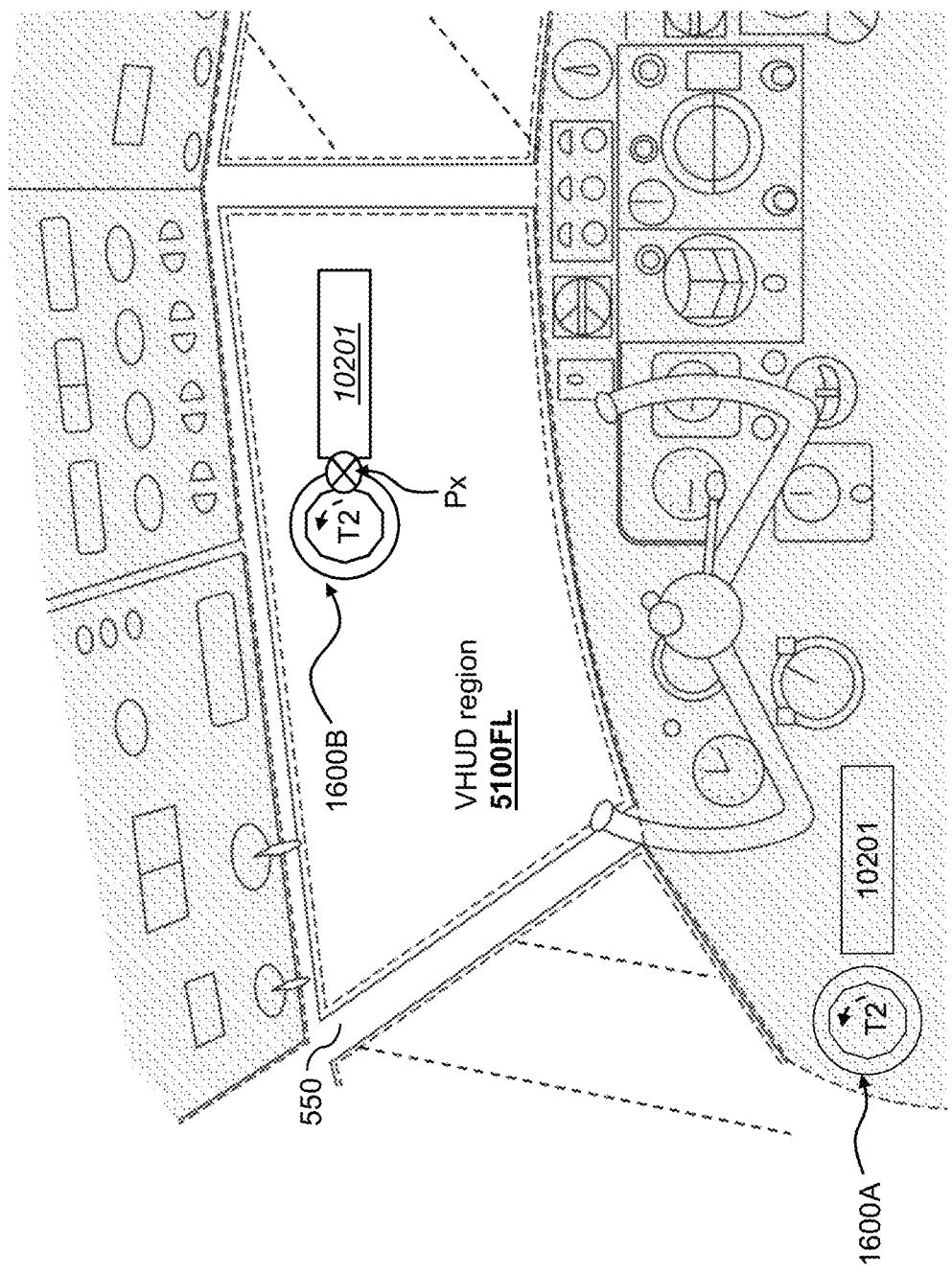

Assuming that a pilot's gaze direction vector $P_x$ meets the gaze-based object selection criterion for actionably acquiring real-world control knob 1600A (e.g., the gaze direction vector $P_x$ intersects with the said virtual object 1600B for a predetermined dwell time), a symbol may be displayed indicating pilot 600 that gaze-based selection criterion is met. Optionally, the symbol may be spatially associated with the real-world control object. Optionally, the displayed symbol may represent virtual control object 1600B. Virtual control object 1600B may for example be mixed with or superimposed onto real-world rotary control knob 1600A to convey to pilot 600 a combined imagery of the real-world rotary control knob 1600A and virtual control object 1600B. In FIG. 20, virtual control object 1600B is shown as dashed lines extending along the contour edges of real-world rotary control knob 1600A. A symbol coordinate system $S_{xyz}$ is spatially associated with a virtual control object 1600B, which may represent a virtual rotary control knob. To simplify the discussion that follows, the terms "virtual control object 1600B" and "virtual control knob 1600B" may herein be used interchangeably. Virtual control knob 1600B can include the scalar display that is associated therewith.

In an embodiment, once the actionable acquisition is completed, the virtual control objects may be displayed on symbology display area 1212 (cf. for instance to FIG. 5A) in a spatially fixed relationship with the pilot's gaze direction (e.g., spatially fixed with the orientation and position of display device 1200 or with the pilot's eye-gaze direction). Merely for the sake of clarity, illustration of symbology display area 1212 is omitted from FIGS. 19-22. The spatial fixing of virtual control objects (e.g., virtual rotary control knob 1600B) with respect to the pilot's gaze direction may in an embodiment be accomplished as schematically shown in FIG. 20 by a progression of broken lines representing the traversing of the virtual control objects in correspondence with gaze direction $P_x$ which is tracked by GTAD system

1000. Optionally, the pilot's gaze direction may always intersect with a geometric center of a virtual control objects such as rotary control knob 1600B. Optionally, a virtual control object such as virtual rotary control knob 1600B may be displayed to pilot 600 at some predetermined or dynamically adjustable position relative to the pilot's current gaze direction.

In an embodiment, an actionable acquired virtual control object that is displayed in accordance with the pilot's gaze direction vector $P_x$, may be "handed over" to become, at least partially, translationally and/or orientationally fixed with respect to another reference coordinate system. For example, after completion of the object-handoff procedure (described in more detail), display of the virtual control objects may be confined within VHUD region 5100. Optionally, a virtual control object (e.g., control object 1600B) may become translationally fixed with a pilot-selected intersection point of the gaze direction vector $P_x$ with VHUD region 5100.

Optionally, at least one first selected symbol rotation axis ($S_\alpha$) of the virtual control object may become orientationally fixed, correspondingly, to at least one principle axis of the vehicle. Optionally, at least one further symbol rotation axis ($S_\beta$) may be selectively spatially fixable to one of: at least one at least one further principle axis of the vehicle; and at least one axis of the display device coordinate system. Optionally, the translational position of a symbol may be displayed in accordance with an operational state of aircraft 500.

A procedure of handing over an actionably acquired virtual control object may be initiated responsive to receiving a suitable input at GTAD system 1000 meeting an object handoff criterion. The object handoff criterion may for example relate to the pilot's gaze direction towards VHUD region 5100FL and/or a physical action performed by the pilot. For example, the object handoff criterion may be met if pilot 600 gazes at a certain area of VHUD region 5100FL for a predetermined dwell time to designate the area as a "locked-in area" (not shown). Optionally, display of the virtual object may then be spatially fixed with respect to a geometric center of the locked-in area. Optionally, display of the virtual object may be spatially fixed with respect to a virtual intersection point between a current gaze direction $P_x$ with VHUD region 5100FL at the time the object handoff criterion is met. In some embodiments, the virtual intersection point may be displayed to pilot 600 in the form of a specific (e.g. pointer) symbol (not shown).

In another embodiment, once the actionable acquisition is completed, a virtual control object (e.g., virtual rotary control knob 1600B) may be displayed immediately at a predetermined position of VHUD region 5100FL, without requiring pilot 600 to change his/her gaze direction towards VHUD region 5100FL for spatially associating the virtual control object with VHUD region 5100FL. For example, virtual rotary control knob 1600B may be substantially immediately displayed in a spatially fixed manner relative to VHUD region 5100FL after the actionable acquisition of the real-world control object is completed.

In an embodiment, after the virtual symbol is handed off (e.g., positionally confined within VHUD region 5100), its display may change in accordance with an input provided at the real-world control object with which the virtual symbol is operatively coupled with. Hence, information conveyed by the virtual control object to user 600 is selectable based on an input provided by the user via the real-world control object. For example, as shown schematically in FIGS. 21 and 22, imparting a rotary motion on real-world rotary control knob 1600A may cause GTAD system 1000 to animate a corresponding rotary motion of virtual rotary control knob 1600B. Additionally or alternatively, the computerized display of information associated with real-world control object 1600B may be altered in accordance with the rotary input provided at real-world control object 1600A, e.g., by pilot 600. For example, as shown schematically in FIG. 21, rotating real-world rotary control knob 1600A in clockwise direction T1 may cause animation of virtual rotary control knob 1600B by GTAD system 1000 to simulate a corresponding rotary motion thereof. Further, the value associated with real-world control knob may change accordingly. A change in a displayed value responsive to imparting a clockwise rotary motion T1 on real-world rotary control knob 1600A is herein exemplified by a change from "10200" in FIG. 20 to "10199" in FIG. 21. A change in a displayed value responsive to imparting a counter-clockwise rotary motion T2 on real-world rotary control knob 1600A is herein exemplified by a change from "10200" in FIG. 20 to "10201" in FIG. 22.

In an embodiment, a virtual symbol that is operatively associated with an actionably acquired real-world control object may be operatively selectable or engagable if, e.g., a corresponding gaze-based virtual object selection criterion is met. According to one option, responsive to actionably engaging the virtual object, a state of a vehicle operation function (e.g., radio frequency or volume level) associated with the virtual object may be changed, e.g., without requiring performing a physical action on the acquired real-world control object. For example, actionably engaging virtual object 1600B to change, for example, display of "10200" to "10199" on VHUD region 5100FL can cause a corresponding change in the value (also from "10200" to "10199") displaye by the real-world display associated with real-world control knob 1600A.

In some embodiments, actionably acquirable real-world may include rotary control knobs which can change values or states (e.g., "ON"/"OFF") irrespective of the knobs' initial orientation. In some embodiments, only rotary control knobs may be actionably acquirable by the pilot which can change values or states (e.g., "ON"/"OFF") irrespective of the knobs' initial orientation.

According to some embodiments, the same virtual object can be selectively operatively associated with different real-world control objects. In the FIGS. 21 and 22, virtual rotary control knob 1600B is exemplified as being operatively associated with real-world rotating control knob 1600A (e.g., for selecting radio frequencies). Virtual object 1600B may subsequently be operatively associated by the pilot with another real-world rotating knob (not shown) which may for example be employed to select the cabin's temperature. A series of suitable inputs that collectively meet a "symbol association-change criterion" may be predefined and/or provided by the pilot. Optionally, the pilot may change the operable association of a virtual object from one real-world control object to another real-world control object.

In some embodiments, where applicable, a virtual object that is operatively associated with an actionably acquired real-world control object may be selectively displayed in a conformal or a non-conformal manner.

In some embodiments, the display of a virtual object that is operatively associated with an actionably acquired real-world control object may be discontinued, e.g., responsive to receiving a corresponding input from the pilot.

Figure 23:
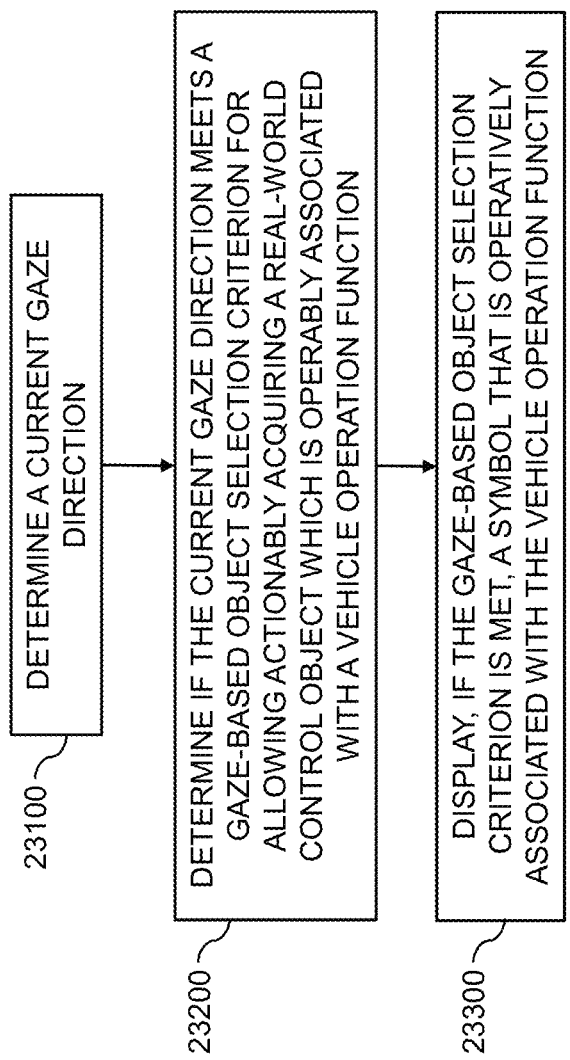
FIG. 23 is a flowchart of a method for generating and displaying to the pilot a symbol that is operatively associated with a real-world control object, according to some embodiments.

Additional reference is made to FIG. 23. Generating and displaying to the pilot a symbol that is operatively associated with a real-world control object may involve a method that comprises determining a current gaze direction or tracking a pilot's gaze direction (step 23100). The method may then further comprise determining if the current gaze direction meets a gaze-based object selection criterion (step 23200) for actionably acquiring a real-world control object. The method may additionally comprise displaying, if the gaze-based object selection criterion is met, a symbol that is operatively associated with the real-world control object (step 23300).

In one example, if HMD wearer 600 (cf. FIG. 1B) changes his gaze direction towards the object, a gaze-based object criterion selection may met if and as long the wearer's gaze direction intersects with a first area of a virtual selectable object, defining the selection threshold. On the other hand, the gaze-based object selection criterion stops to be met if the current gaze direction seizes to intersect with a second area of the virtual selectable object which is enlarged compared to the first area of the virtual selectable object and which defines the non-selection threshold.

In another example, if the HMD wearer (e.g., a pilot) (cf. FIG. 1B) changes his gaze direction towards the object, a gaze-based object selection criterion may be met if and as long as the difference value (e.g., the angle) between the current and a virtual gaze direction towards the object drops below, or becomes equal or drops below the selection threshold. On the other hand, the gaze-based object selection criterion seizes to be met if the difference value exceeds, or becomes equal to or exceeds the non-selection threshold which is higher than the selection threshold.

The term "virtual gaze direction" refers to a possible future gaze direction of pilot 600 (cf. FIG. 1B), as opposed to a current or actual gaze direction of pilot 600 (cf. FIG. 1B) at a particular time instance, as determined by GTAD system 1000.

Optionally, the selection threshold may be set to be lower than the non-selection threshold by a magnitude of 0.05 radians or less, by 0.04 radians or less, by 0.03 radians or less, by 0.02 radians or less, or by 0.01 radians or less.

Figure 24B:
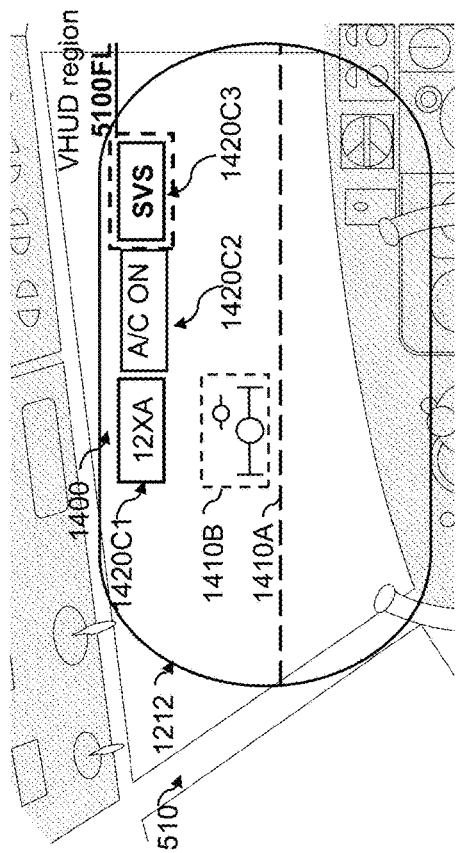
FIGS. 24A and 24B are schematic illustrations of controlling a vehicle operation, according to some embodiments.
Figure 24A:
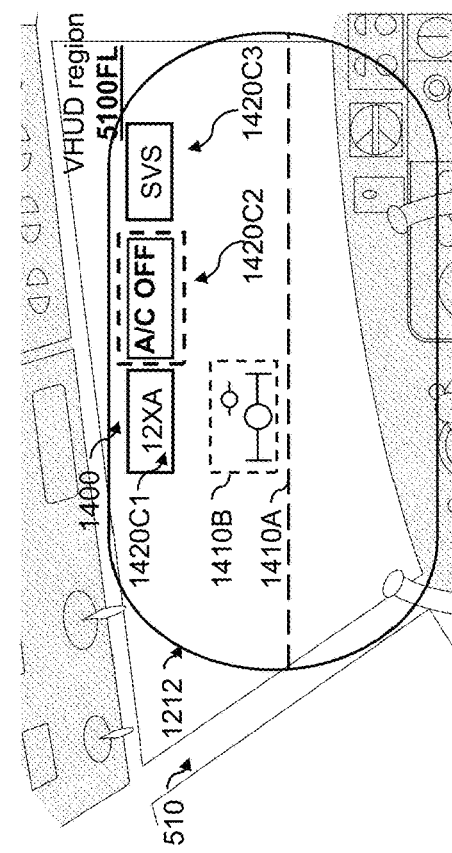

Additional reference is made to FIGS. 24A and 24B. According to some embodiments, a plurality of (e.g., non-conformal) symbols 1400 may be displayed in VHUD region 5100. At least two of the plurality of symbols 1400 may be different from one another. That is, the at least two symbols may, for example, pertain to different operating parameters of vehicle 500, display device 1200 and/or vital signs of user 600. Accordingly, the at least two symbols may have different functionalities and pertain, for example, to different vehicle operation functions.

Optionally, the number of non-conformal symbols 1400 to be displayed in VHUD region 5100 and their corresponding functionality may be customizable, e.g., per each user, vehicle and/or display device. Optionally, the non-conformal symbols 1400 are automatically displayed, at least once display device 1200 is worn by user 600 and operationally coupled with vehicle 500. In other words, pilot-initiated actionable instrument acquisition as described with respect to FIGS. 19-22 may not be required in order for the non-conformal symbols 1400 to be displayed in VHUD region 5100 in symbology display area 1212.

Optionally, the symbols 1400 may be gaze-, gesture-, utterance-based and/or otherwise selectable and/or actionably engageable by user 600, if a selection criterion and/or actionably engagement criterion is met, respectively.

Optionally, symbols 1400 may be selectable through a physical action (e.g., gesture-based selection, gaze-based selection, utterance-based selection, push button and/or control knob actuation) by user 600. A non-conformal symbol 1420 for instance may, for example, first preselected by scrolling sequentially from left to right (or vice versa) over non-conformal symbols 1420, which may be stationary with respect to VHUD region 5100. The scrolling may be accomplished in a one-handed manner by user 600 using, e.g., a rotary control knob (not shown) which moves a "selector", exemplified herein by dashed box, over the stationary non-conformal symbols 1420. In another embodiment, the selector may be stationary with respect to VHUD region 5100, and the symbols 1420 may be moved relative to the selector. While FIGS. 24A and 24B exemplify embodiments with respect to non-conformal symbols 1420, this should not be construed in a limiting manner.

A symbol 1400 such as a non-conformal symbol 1420 may be highlighted, colored and/or otherwise indicated as "selected". The selected non-conformal symbol 1420 may then be actionably engaged, e.g., using a push button (not shown), using gaze-based selection, gesture-based selection, and/or any other physical action. Responsive to actionable engaging a non-conformal symbol 1420 by user 600, a corresponding command input may be provided to vehicle 500. Moreover, the display of the symbol may change accordingly. For instance, non-conformal symbol 1420 may concern the activation ("ON") or deactivation ("OFF") of an air-conditioning (also: "A/C") system. In FIG. 24A, the A/C system (non-conformal symbol 1420C2) is shown as turned to "OFF" and actionably engaged (schematically indicated by dashed box and the bold fonts), such to be turned "ON" (FIG. 24B). Moreover, in FIG. 24A, the synthetic vision system (SVS) is shown to be unselected, whereas in FIG. 24B, the SVS is shown as being actionably engaged, schematically illustrated by the bold fonts and the dashed box around non-conformal symbol 1420C3. In both FIGS. 24A and 24B, the "12XA" symbol (non-conformal symbol 1420C1) is shown as being unselected.

In an embodiment, the same control (not shown) can be used to actionably engage a selected non-conformal symbols 1420A-C. For example, the same real-world control knob 1600A schematically shown in FIG. 22 may be used to actionably engage any one of non-conformal symbols 1420A-C selected by pilot 600.

In accordance with the embodiments outlined herein with respect to FIGS. 19-24B, display device 1200 is adapted to receive an input from user 600 for selecting and/or controlling various systems of vehicle 500. Accordingly, display device 1200 may be modified from a device which merely conveys information to user 600, to a device which is can receive inputs from user 600.

Figure 25:
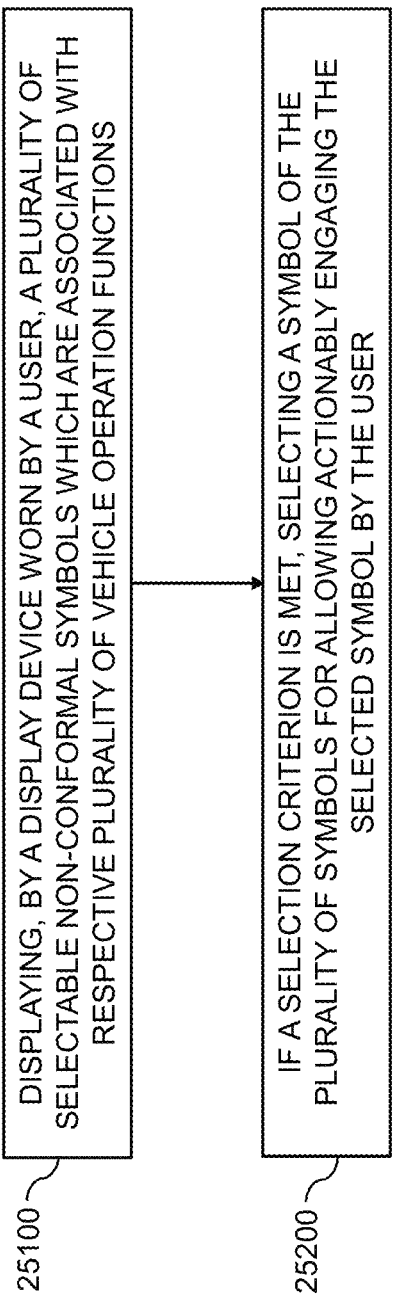
FIG. 25 is a flowchart of a method of controlling vehicle operation functions, according to some embodiments.

Additional reference is made to FIG. 25. A method of controlling a vehicle operation function may include displaying, by display device 1200 worn by user 600, a plurality of selectable non-conformal symbols which are associated with respective plurality of vehicle operation functions (step 25100).

As indicated by step 25200, the method of controlling a vehicle operation function may further include selecting a symbol of the plurality of symbols for allowing actionably engaging the selected symbol by user 600. A symbol may be selected if the object selection criterion is met.

ADDITIONAL EXAMPLES

Example 1 concerns a method for providing information to a user of a vehicle via a display device that is worn by the user, the method comprising: providing a vehicle coordinate system ($V_{xyz}$) representing the principle axes of rotation of the vehicle for defining a vehicle orientation relative to a world coordinate system ($W_{xyz}$) of a reference world space; providing at least one display device coordinate system ($D_{xyz}$) that defines a display device orientation relative to the vehicle coordinate system, wherein the display device is operable to visually display to the user at least one first symbol; and providing a symbol coordinate system ($S_{xyz}$) that is spatially fixed with the at least one first symbol to be displayed on the display device and that defines three symbol rotation axes that are orthogonal to each other; spatially fixing (e.g., during display of the at least one first symbol) at least one of the symbol rotation axes ($S_\alpha$) to a vehicle principal axis of rotation descriptive of an orientation of the vehicle. Optionally, at least one further symbol rotation axis ($S_\beta$) is correspondingly selectively spatially fixable or fixed (e.g., during display of the at least one first symbol) to one of: at least one other principal axis of rotation of the vehicle; and at least one display rotation axis of the display device coordinate system Example 2 includes the subject matter of example 1 and, optionally, translationally adjusting a position of the displayed at least one first symbol in accordance with a vehicle state vector.

Example 3 includes the subject matter of example 2 and, optionally, wherein the vehicle state vector pertains to one or more of the following: a flight path vector; and engine thrust direction and/or magnitude thereof.

Example 4 includes the subject matter of example 3 and, optionally, further comprises selectively displaying a symbol of the at least one first symbol that represents the vehicle state vector in one of the following display modes: in a first, regular display mode, as long as the symbol representing the vehicle state vector can be displayed to the user by the display device in a directionally conformable manner within a given field of view; and in a second, ghosted display mode, if the symbol representing the vehicle state vector cannot be displayed by the display device in a directionally conformable manner within the given field of view.

Example 5 includes the subject matter of any one of the examples 1 to 4 and, optionally, wherein providing the symbol coordinate system ($S_{xyz}$) on the display device is operable at all and any orientation of the symbol coordinate system ($S_{xyz}$) relative to vehicle coordinate system ($V_{xyz}$).

Example 6 includes the subject matter of any one of the examples 1 to 5 and, optionally, wherein the at least one of the symbol rotation axes ($S_\alpha$) is a roll orientation that is spatially fixed, correspondingly, to the roll orientation of the vehicle coordinate system ($V_{xyz}$); and wherein the at least one further symbol rotation axis ($S_\beta$) is a pitch and/or yaw orientation of the symbol coordinate system ($S_{xyz}$) that is spatially fixed or fixable, correspondingly, to a pitch and/or yaw orientation of the display device coordinate system ($D_{xyz}$) relative to the vehicle coordinate system ($V_{xyz}$).

Example 7 includes the subject matter of any one of the examples 1 to 6 and, optionally, providing a pointer symbol coordinate system ($P_{xyz}$) that is spatially associated with a pointer symbol to be displayed on the display device and that defines at least two pointer symbol translational axes (y-z) that are orthogonal to each other.

Example 8 includes the subject matter of example 7 and, optionally, determining a first current gaze direction of the user; and displaying on the display device the pointer symbol concurrently with the at least one first symbol, wherein the pointer symbol indicates the first current gaze direction of the user.

Example 9 includes the subject matter of any one of the examples 1 to 8 and, optionally, wherein the displayed at least one first symbol comprises a user interface object that is selectively actionably engageable by the user.

Example 10 includes the subject matter of example 8 or 9 and, optionally, tracking gaze of the user; determining if a gaze-based object selection criterion is met; and if the gaze-based object selection criterion is met, providing the user with information indicating that the gaze-based object selection criterion is met.

Example 11 includes the subject matter of example 10 and, optionally, determining if an actionable engagement criterion is met for actionably engaging a virtual object that is associated with the selected user interface object.

Example 12 includes the subject matter of example 11 and, optionally, wherein the selection criterion refers to any one of the following: a dwell time of the first current gaze direction within a predetermined interval; and/or a physical action performed by the user.

Example 13 include the subject matter of example 7 and, optionally, determining a second current gaze direction of the user; determining a second difference value between the second current gaze direction and at least one virtual direction; and if the second difference value exceeds a second difference threshold, spatially fixing the at least one further symbol rotation axis ($S_\beta$) of the symbol coordinate system ($S_{xyz}$) to the display device coordinate system ($D_{xyz}$).

Example 14 includes the subject matter of example 13 and, optionally, spatially fixing the at least one of the symbol rotation axes ($S_\alpha$) to the display device coordinate system ($D_{xyz}$).

Example 15 includes the subject matter of examples 13 or 14 and, optionally, displaying at least one second symbol in correspondence with and instead of the at least one first symbol.

Example 16 includes the subject matter of example 15 and, optionally, determining a third difference value between a third current gaze direction and the at least one virtual gaze direction; and if the third difference value is below a third difference threshold value: spatially fixing, at least one of the symbol rotation axes ($S_\alpha$) to at least one of the axes of the vehicle coordinate system ($V_{xyz}$) for displaying the at least one first symbol.

Example 17 includes the subject matter of any one of the examples 1 to 16 and, optionally, wherein the at least one first symbol relates to any one of the following: a non-conformal symbol; and a conformal symbol; wherein the conformal symbol relates to any one of the following: a fully conformal symbol; and a partially conformal symbol.

Example 18 includes the subject matter of example 17 and, optionally, wherein a symbol that is displayed in a conformal manner can be adapted to be displayed in a manner to suit a non-conformal representation setting, and vice versa.

Example 19 includes the subject matter of examples 17 or 18 and, optionally, wherein the non-conformal symbol is descriptive of any one of the following: a value relating to a parameter describable by a scalar; ordinal; categorical; and/or interval parameter.

Example 20 includes the subject matter of any one of examples 17 to 19 and, optionally, wherein the non-conformal symbol comprises user-selectable values.

Example 21 concerns a method for providing a user with information about a remotely operated vehicle via one or more display devices of a remote control station which is located remotely from the remotely operated vehicle, the one or more display devices comprising a head-mounted display (HMD) device, the method comprising: providing a vehicle coordinate system ($V_{xyz}$) that defines an orientation of the remotely operated vehicle relative to a world coordinate system ($W_{xyz}$) of a reference world space; providing an HMD device coordinate system ($D_{xyz}$) defining an orientation of the HMD device relative to the remote control station; conveying to the user, by the one or more display devices comprising the HMD device, a digital image of an emulated view of the exterior of the remotely operated vehicle from a perspective of the remotely operated vehicle; providing a symbol coordinate system ($S_{xyz}$) that is spatially associated with a symbol to be displayed by the HMD device, wherein the symbol coordinate system ($S_{xyz}$) defines three symbol rotation axes that are orthogonal to each other; spatially fixing at least one of the symbol rotation axes ($S_\alpha$) to a principal axis of rotation of the remotely operated vehicle; and, during display of the symbol, selectively spatially fixing at least one further symbol rotation axis ($S_\beta$) to one of: at least one other principal axis of rotation of the remotely operated vehicle; and at least one principal rotation axis of the HMD coordinate system ($D_{xyz}$).

Example 22 includes the subject matter of example 21 and, optionally, wherein the one or more display devices further comprise a non-wearable display device which is stationary with respect to the remote control station.

Example 23 includes the subject matter of examples 21 or 22 and, optionally, wherein the remote control station is orientationally fixed to one of the following: the reference world space; the vehicle coordinate system $V_{xyz}$ of the remotely operated vehicle; and a control station carrier platform which is movable relative to the reference world space and which comprises the remote control station.

Example 24 includes the subject matter of example 23 and, optionally, wherein the control station carrier platform comprises one of the following: a command and control aircraft; a naval vessel ship; and a motion platform assembly.

Example 25 concerns a method for generating and displaying by a display device that is worn by a user located in a control station, a symbol that is operatively associated with an operation function of the vehicle, the method comprising: determining a first gaze direction of the user; determining a first difference value between the first gaze direction and a first virtual gaze direction towards a real-world control object comprised in the control station and associated with a vehicle operation function; determining, while the first difference value is within a predetermined interval for a certain time period, if a gaze-based object selection criterion is met; and displaying by the display device a symbol that is operatively associated with the vehicle operation function relating to the real-world control object, if the gaze-based object selection criterion is met.

Example 26 includes the subject matter of example 25 and, optionally, determining a second difference value between a second gaze direction and a second virtual gaze direction towards a field-of-view (FOV) region of another real-world control object of the vehicle; and spatially fixing at least one of the symbol rotation axes ($S_\alpha$) of the symbol, correspondingly, to at least one of the axes of the vehicle coordinate system ($V_{xyz}$) defining an orientation of the vehicle relative to a reference world space, if the second difference value meets an object handoff criterion.

Example 27 includes the subject matter of example 26 and, optionally, spatially fixing at least one further symbol rotation axis ($S_\beta$) to one of: at least one other principal axis of rotation of the vehicle; and at least one display rotation axis of a display device coordinate system ($D_{xyz}$) defining an orientation of the display device relative to the vehicle.

Example 28 includes the subject matter of examples 26 or 27 and, optionally, wherein the object-handoff criterion refers to any one of the following: a dwell time during which the second difference value is within a predetermined interval; and/or a physical action performed by the user.

Example 29 includes the subject matter of any one of the examples 26 to 28 and, optionally, determining a third difference value between a third gaze direction and a third virtual gaze direction towards the displayed symbol; and providing the user with information indicative of a difference between the third gaze direction and the third virtual gaze direction towards the displayed symbol, if a third level difference value is within a predetermined interval for at least a certain time period.

Example 30 includes the subject matter of example 29 and, optionally, determining if an object selection criterion is met for selecting the displayed symbol.

Example 31 includes the subject matter of example 30 and, optionally, wherein the object selection criterion refers to any one of the following: a dwell time of the third gaze direction within the predetermined interval; and/or a physical action performed by the user.

Example 32 includes the subject matter of example 30 or 31 and, optionally, wherein, if the selection criterion is met, an operational state of the vehicle can be altered responsive to actionably engaging the symbol.

Example 33 includes the subject matter of example 32 and, optionally, wherein actionably engaging the symbol comprises engaging another control that is operatively associated with the displayed symbol for controlling a corresponding vehicle operation function.

Example 34 includes the subject matter of example 33 and, optionally, wherein the other control comprises a rotary control knob requiring a multiple-step actuation sequence to prevent accidentally actionably engaging the displayed symbol.

Example 35 includes the subject matter of example 34 and, optionally, wherein the rotary control knob comprises a push button rotary knob.

Example 36 includes the subject matter of any one of the examples 25 to 35 and, optionally, wherein the vehicle operation function pertains to displaying information about an operational state of the vehicle and/or vital signs of the user.

Example 37 includes the subject matter of any one of the examples 25 to 36 and, optionally, wherein the displayed symbol can be selectively operatively associated with different operating functions of the vehicle.

Example 38 concerns a method for controlling a vehicle by a user, the method comprising: displaying, by a display device worn by the user, a plurality of selectable non-conformal symbols which are associated with a respective plurality of vehicle operation functions; and if a selection criterion is met, selecting a symbol of a plurality of symbols for allowing actionably engaging the selected symbol by the user.

Example 39 includes the subject matter of example 38 and, optionally, further comprises actionably engaging the symbol if an actionable engagement criterion is met.

Example 40 includes the subject matter of example 38 or 39 and, optionally, wherein selecting and/or actionably engaging the symbol comprises physically engaging a control.

Example 41 includes the subject matter of example 41 and, optionally, wherein the control is one-handed operable by the user.

Example 42 includes the subject matter of examples 40 or 41 and, optionally, wherein the control comprises a push button rotary control knob assembly that is consolidated in a single control knob.

Example 43 concerns a gaze tracking and display (GTAD) system operable to provide information to a user of a vehicle via a display device that is worn by the user, the system comprising: one or more processors; and one or more memories storing software code portions executable by the one or more processors to cause the GTAD system to perform the following steps: providing a vehicle coordinate system ($V_{xyz}$) that defines a vehicle orientation relative to a world coordinate system ($W_{xyz}$) of a reference world space; providing at least one display device coordinate system ($D_{xyz}$) that defines a display device orientation relative to the vehicle coordinate system, wherein the display device is operable to visually display to the user at least one first symbol; and providing a symbol coordinate system ($S_{xyz}$) that is spatially fixed with the at least one first symbol to be displayed on the display device and that defines three symbol rotation axes that are orthogonal to each other; spatially fixing (e.g., at least during the display of the at least one first symbol), at least one of the symbol rotation axes ($S_\alpha$) to a vehicle principal axis of rotation descriptive of an orientation of the vehicle.

Example 44 includes the subject matter of example 43 and, optionally, wherein (e.g., during the display of the at least one first symbol), at least one further symbol rotation axis ($S_\beta$) is correspondingly selectively spatially fixable or fixed to one of: at least one other principal axis of rotation of the vehicle; and at least one display rotation axis of the display device coordinate system.

Example 45 concerns a computer program product operable to provide information to a user of a vehicle via a display device that is worn by the user, the computer program product comprising a non-transitory tangible storage medium and/or a transitory storage medium readable by one or more processing circuits and storing instructions for execution by the one or more processing circuit for performing a method comprising: providing a vehicle coordinate system ($V_{xyz}$) that defines a vehicle orientation relative to a world coordinate system ($W_{xyz}$) of a reference world space; providing at least one display device coordinate system ($D_{xyz}$) that defines a display device orientation relative to the vehicle coordinate system, wherein the display device is operable to visually display to the user at least one first symbol; and providing a symbol coordinate system ($S_{xyz}$) that is spatially fixed with the at least one first symbol to be displayed on the display device and that defines three symbol rotation axes that are orthogonal to each other; spatially fixing at least one of the symbol rotation axes ($S_\alpha$) to a vehicle principal axis of rotation descriptive of an orientation of the vehicle; and wherein at least one further symbol rotation axis ($S_\beta$) is correspondingly selectively spatially fixable or fixed to one of: at least one other principal axis of rotation of the vehicle; and at least one display rotation axis of a display device coordinate system (Dxyz).

Example 46 concerns a gaze tracking and display (GTAD) system operable to provide information to a user of a vehicle via a display device that is worn by the user, the GTAD system comprising: a gaze tracker subsystem of a control station for controlling a vehicle, the gaze tracker subsystem comprising station gaze tracker components; a wearable display device comprising display gaze tracking components; a gaze tracker engine for tracking gaze of the user wearing the wearable display device, wherein the gaze of the user is tracked based on information provided by the gaze tracker subsystem and the wearable display device; and a symbology rendering engine for causing display of at least one first symbol to the user via the wearable display device; wherein, a symbol coordinate system ($S_{xyz}$) is spatially fixed with the at least one first symbol and defines three symbol rotation axes that are orthogonal to each other; wherein (e.g., at least during the display of the at least one first symbol and the tracking of the user's gaze), at least one of the symbol rotation axes ($S_\alpha$) is spatially fixed by the symbology rendering engine to a vehicle principal axis of rotation descriptive of an orientation of the vehicle.

Example 47 includes the subject matter of example 46 and, optionaly, wherein at least one further symbol rotation axis ($S_\beta$) is correspondingly selectively spatially fixed or fixable by the symbology rendering engine to one of: at least one other principal axis of rotation of the vehicle; and at least one display rotation axis of a display device coordinate system (Dxyz).

Example 48 concerns a computer program product directly loadable into an internal memory of a digital computer, the computer program product comprising software code portions for performing the steps of any one of the examples 1 to 42 when the computer program product is run on a computer.

It is noted that, where applicable, embodiments exemplified herein are analogously employable in remote control applications.

It is noted that the expressions "concurrently", "simultaneously", "in real-time", "constant" as used herein may also encompass, respectively, the meaning of the expression "substantially concurrently", "substantially simultaneously", "substantially in real-time" and "substantially constant".

Any digital computer system, module and/or engine exemplified herein can be configured or otherwise programmed to implement a method disclosed herein, and to the extent that the system, module and/or engine is configured to implement such a method, it is within the scope and spirit of the disclosure. Once the system, module and/or engine are programmed to perform particular functions pursuant to computer readable and executable instructions from program software that implements a method disclosed herein, it in effect becomes a special purpose computer particular to embodiments of the method disclosed herein. The methods and/or processes disclosed herein may be implemented as a computer program product that may be tangibly embodied in an information carrier including, for example, in a non-transitory tangible computer-readable and/or non-transitory tangible machine-readable storage device. The computer program product may directly loadable into an internal memory of a digital computer, comprising software code portions for performing the methods and/or processes as disclosed herein.

Additionally or alternatively, the methods and/or processes disclosed herein may be implemented as a computer program that may be intangibly embodied by a computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer or machine-readable storage device and that can communicate, propagate, or transport a program for use by or in connection with apparatuses, systems, platforms, methods, operations and/or processes discussed herein.

The terms "non-transitory computer-readable storage device" and "non-transitory machine-readable storage device" encompasses distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by one or more communication networks.

These computer readable and executable instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable and executable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable and executable instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

"Coupled with" means indirectly or directly "coupled with".

It is important to note that the method may include is not limited to those diagrams or to the corresponding descriptions. For example, the method may include additional or even fewer processes or operations in comparison to what is described in the figures. In addition, embodiments of the method are not necessarily limited to the chronological order as illustrated and described herein.

Discussions herein utilizing terms such as, for example, "processing", "computing", "calculating", "determining", "establishing", "analyzing", "checking", "estimating", "deriving", "selecting", "inferring" or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. The term determining may, where applicable, also refer to "heuristically determining".

It should be noted that where an embodiment refers to a condition of "above a threshold", this should not be construed as excluding an embodiment referring to a condition of "equal or above a threshold". Analogously, where an embodiment refers to a condition "below a threshold", this should not to be construed as excluding an embodiment referring to a condition "equal or below a threshold". It is clear that should a condition be interpreted as being fulfilled if the value of a given parameter is above a threshold, then the same condition is considered as not being fulfilled if the value of the given parameter is equal or below the given threshold. Conversely, should a condition be interpreted as being fulfilled if the value of a given parameter is equal or above a threshold, then the same condition is considered as not being fulfilled if the value of the given parameter is below (and only below) the given threshold.

It should be understood that where the claims or specification refer to "a" or "an" element and/or feature, such reference is not to be construed as there being only one of that element. Hence, reference to "an element" or "at least one element" for instance may also encompass "one or more elements".

Terms used in the singular shall also include the plural, except where expressly otherwise stated or where the context otherwise requires.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made, and may be used interchangeably with the expressions "at least one of the following", "any one of the following" or "one or more of the following", followed by the list of options.

It is appreciated that certain features of the invention, which are, for clarity, described in the context of separate embodiments or example, may also be provided in combination in a single embodiment. Conversely, various features of the invention, which are, for brevity, described in the context of a single embodiment, example and/or option, may also be provided separately or in any suitable sub-combination or as suitable in any other described embodiment, example or option of the invention. Certain features described in the context of various embodiments, examples and/or optional implementation are not to be considered essential features of those embodiments, unless the embodiment, example and/or optional implementation is inoperative without those elements.

It is noted that the term "exemplary" is used herein to refer to examples of embodiments and/or implementations, and is not meant to necessarily convey a more-desirable use-case.

The number of elements shown in the Figures should by no means be construed as limiting and is for illustrative purposes only.

As used herein, if a machine (e.g., a processor) is described as "configured to" "operable to" perform a task (e.g., configured to cause application of a predetermined field pattern), then, at least in some embodiments, the machine may include components, parts, or aspects (e.g., software) that enable the machine to perform a particular task. In some embodiments, the machine may perform this task during operation. Similarly, when a task is described as being done "in order to" establish a target result (e.g., in order to apply a plurality of electromagnetic field patterns to the object), then, at least in some embodiments, carrying out the task may accomplish the target result.

Throughout this application, various embodiments may be presented in and/or relate to a range format. It should be understood that the description in range format is merely for convenience and brevity and should not be construed as an inflexible limitation on the scope of the embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Where applicable, whenever a numerical range is indicated herein, it is meant to include any cited numeral (fractional or integral) within the indicated range.

The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

While the invention has been described with respect to a limited number of embodiments, these should not be construed as limitations on the scope of the invention, but rather as exemplifications of some of the embodiments.

What is claimed is:

1. A method for providing information to a user of a vehicle via a display device that is worn by the user, the method comprising:
    providing a vehicle coordinate system ($V_{xyz}$) representing the principle axes of rotation of the vehicle for defining a vehicle orientation relative to a world coordinate system ($W_{xyz}$) of a reference world space;
    providing at least one display device coordinate system ($D_{xyz}$) representing the principle axes of rotation of a display device for defining a display device orientation relative to the vehicle coordinate system (Vxyz), wherein the display device is operable to visually display to the user at least one symbol; and
    providing at least one symbol coordinate system ($S_{xyz}$) representing, respectively, the principle axes of rotation of the at least one symbol to be displayed for defining an orientation of at least one symbol relative to the display device, each one of the at least one symbol coordinate system ($S_{xyz}$) being defined by three symbol rotation axes that are orthogonal to each other;
    spatially fixing at least one of the symbol rotation axes ($S_\alpha$) of the least one symbol coordinate system ($S_{xyz}$) to a vehicle principal axis of rotation descriptive of an orientation of the vehicle; and
    wherein at least one further symbol rotation axis ($S_\beta$) of the at least one symbol coordinate system ($S_{wyz}$) is correspondingly selectively spatially fixable to one of:
    at least one other principal axis of rotation of the vehicle; and
    at least one display rotation axis of the display device coordinate system.

2. The method of claim 1, further comprising translationally adjusting a position of the at least one symbol in accordance with a vehicle state vector.

3. The method of claim 2, wherein the vehicle state vector pertains to one or more of the following: a flight path vector; and engine thrust direction and/or magnitude thereof.

4. The method of claim 2, further comprising selectively displaying a first symbol of the at least one symbol that represents the vehicle state vector, in one of the following display modes:
    in a first, regular display mode, as long as the first symbol representing the vehicle state vector can be displayed to the user by the display device in a directionally conformable manner within a given field of view; and
    in a second, ghosted display mode, if the first symbol representing the vehicle state vector cannot be displayed by the display device in a directionally conformable manner within the given field of view.

5. The method of claim 1, wherein the at least one of the symbol rotation axes ($S_\alpha$) is a roll orientation that is spatially fixed, correspondingly, to the roll orientation of the vehicle coordinate system ($V_{xyz}$); and
    wherein the at least one further symbol rotation axis ($S_\beta$) is a pitch and/or yaw orientation of the symbol coordinate system ($S_{xyz}$) that is spatially fixed, correspondingly, to a pitch and/or yaw orientation of the display device coordinate system ($D_{xyz}$) relative to the vehicle coordinate system ($V_{xyz}$).

6. The method of claim 1, wherein the displayed at least one symbol comprises a user interface object that is selectively actionably engageable by the user.

7. The method of claim 1, further comprising:
    determining a first current gaze direction of the user;
    determining if a gaze-based object selection criterion is met; and
    if the gaze-based object selection criterion is met, providing the user with information indicating that the gaze-based object selection criterion is met.

8. The method of claim 7, further comprising:
    determining if an actionable engagement criterion is met for actionably engaging a virtual object that is associated with the selected user interface object.

9. The method of claim 1, further comprising:
    determining a current gaze direction of the user;
    determining a difference value between the current gaze direction and at least one virtual gaze direction that is different from the current gaze direction; and
    if the difference value exceeds a difference threshold, spatially fixing the at least one further symbol rotation axis ($S_\beta$) of the symbol coordinate system ($S_{xyz}$) to the display device coordinate system ($D_{xyz}$).

10. The method of claim 9, further comprising:
    spatially fixing the at least one of the symbol rotation axes ($S_\alpha$) to the display device coordinate system ($D_{xyz}$).

11. The method of claim 9, further comprising displaying at least one other symbol in correspondence with and instead of the at least one symbol.

12. The method of claim 1, further comprising:
    determining a first gaze direction of the user;
    determining a first difference value between the first gaze direction and a first virtual gaze direction towards a real-world control object comprised in a control station and associated with a vehicle operation function;
    determining, while the first difference value is within a predetermined interval for a certain time period, if a gaze-based object selection criterion is met; and displaying by the display device a second symbol that is operatively associated with the vehicle operation function relating to the real-world control object, if the gaze-based object selection criterion is met.

13. The method of claim 12, further comprising:
determining a second difference value between a second virtual gaze direction and a second gaze direction that is different from the first gaze direction; and
spatially fixing at least one of the symbol rotation axes ($S_\alpha$) associated with the second symbol, correspondingly, to at least one of the axes of a vehicle coordinate system ($V_{xyz}$) defining an orientation of the vehicle relative to a reference world space, if the second difference value meets an object-handoff criterion.

14. The method of claim 13, further comprising:
spatially fixing at least one further symbol rotation axis ($S_\beta$) of the second symbol to one of: at least one other principal axis of rotation of the vehicle; and
at least one display rotation axis of a display device coordinate system ($D_{xyz}$) defining an orientation of the display device relative to the vehicle.

15. The method of claim 12, wherein the second symbol can be selectively operatively associated with different operating functions of the vehicle.

16. A gaze tracking and display (GTAD) system operable to provide information to a user of a vehicle via a display device that is worn by the user, the system comprising:
one or more processors; and
one or more memories storing software code portions executable by the one or more processors to cause the GTAD system to perform the following steps:
providing a vehicle coordinate system ($V_{xyz}$) that defines a vehicle orientation relative to a world coordinate system ($W_{xyz}$) of a reference world space;
providing at least one display device coordinate system ($D_{xyz}$) that defines a display device orientation relative to the vehicle coordinate system, wherein the display device is operable to visually display to the user at least one symbol; and
providing at least one symbol coordinate system ($S_{xyz}$) that defines, respectively, a symbol orientation of the at least one symbol relative to the display device, each one of the at least one symbol coordinate system ($S_{xyz}$) being defined by three symbol rotation axes that are orthogonal to each other;
spatially fixing, during display of the at least one symbol, at least one of the symbol rotation axes ($S_\alpha$) of the at least one symbol coordinate system ($S_{xyz}$) to a vehicle principal axis of rotation descriptive of an orientation of the vehicle.

17. The GTAD system of claim 16, during the display of the at least one symbol, at least one further symbol rotation axis ($S_\beta$) is correspondingly selectively spatially fixable to one of:
at least one other principal axis of rotation of the vehicle; and
at least one display rotation axis of the display device coordinate system.

18. The system of claim 16, wherein the steps further comprise translationally adjusting a position of the at least one symbol in accordance with a vehicle state vector.

19. The system of claim 18, wherein the steps further comprise:
selectively displaying a first symbol of the at least one symbol that represents the vehicle state vector, in one of the following display modes:

in a first, regular display mode, as long as the first symbol representing the vehicle state vector can be displayed to the user by the display device in a directionally conformable manner within a given field of view; and
in a second, ghosted display mode, if the first symbol representing the vehicle state vector cannot be displayed by the display device in a directionally conformable manner within the given field of view.

20. The system of claim 16, wherein the displayed at least one symbol comprises a user interface object that is selectively actionably engageable by the user,
wherein the steps further comprise:
tracking gaze of the user;
determining if a gaze-based user interface object selection criterion is met;
if the gaze-based user interface object selection criterion is met, providing the user with information indicating that the gaze-based user interface object selection criterion is met.

21. The system of claim 20, wherein the steps further comprise:
determining if an actionable engagement criterion is met for actionably engaging the selected user interface object; and
wherein the same symbol can be selectively operatively associated with different real-world control objects.

22. The system of claim 16, wherein the steps further comprise:
determining a first current gaze direction of the user;
determining a first difference value between the first current gaze direction and a first virtual gaze direction towards a real-world control object comprised in a control station and associated with a vehicle operation function;
determining, while the first difference value is within a predetermined interval for a certain time period, if a gaze-based object selection criterion is met;
if the gaze-based object selection criterion is met, displaying by the display device a second symbol that is operatively associated with the vehicle operation function relating to the real-world control object;
determining a second difference value between a second virtual gaze direction and a second current gaze direction, the second virtual gaze direction and the second current gaze direction being different from the first virtual gaze direction and the first current gaze direction; and
spatially fixing at least one of the symbol rotation axes ($S_\alpha$) associated with the second symbol, correspondingly, to at least one of the axes of a vehicle coordinate system ($V_{xyz}$) defining an orientation of the vehicle relative to a reference world space, if the second difference value meets an object-handoff criterion.

23. The system of claim 22, wherein a same real-world control is employable for actionably engaging one or more of at least one second symbol associated with at least one vehicle operation function.

24. The system of claim 16, wherein the steps further comprise:
determining a current gaze direction of the user;
determining a difference value between the current gaze direction and at least one virtual gaze direction that is different from the current gaze direction; and
if the difference value exceeds a second difference threshold, spatially fixing the at least one further symbol rotation axis ($S_\beta$) of the at least one symbol coordinate system ($S_{xyz}$) to the display device coordinate system ($D_{xyz}$).

25. The system of claim 24, wherein the steps further comprise displaying at least one other symbol in correspondence with and instead of the at least one symbol.

26. The system of claim 16, wherein the display device is located remotely from the vehicle for remotely operating the vehicle by a user, or wherein the display device is located within the vehicle for providing information to a user that is located within the vehicle.

* * * * *